United States Patent
Pirim

(10) Patent No.: US 7,136,842 B2
(45) Date of Patent: Nov. 14, 2006

(54) METHOD AND DEVICE FOR ADAPTING A SIGNAL FOR THE DETECTION OF THE MOVEMENT OF AN OBJECT

(75) Inventor: Patrick Pirim, Paris (FR)

(73) Assignee: Holding B.E.V. S.A., Luxembourg (LU)

( * ) Notice: Subject to any disclaimer, the term of this patent is extended or adjusted under 35 U.S.C. 154(b) by 887 days.

(21) Appl. No.: 09/877,337

(22) Filed: Jun. 8, 2001

(65) Prior Publication Data

US 2002/0156753 A1    Oct. 24, 2002

Related U.S. Application Data

(63) Continuation-in-part of application No. 09/792,436, filed on Feb. 23, 2001.

(30) Foreign Application Priority Data

Feb. 23, 2001   (FR) ............................................ 01 02530

(51) Int. Cl.
    *G06N 5/02*        (2006.01)

(52) U.S. Cl. ......................................... 706/45; 704/230
(58) Field of Classification Search ................... 706/45; 704/230; 375/240
    See application file for complete search history.

(56) References Cited

U.S. PATENT DOCUMENTS

| | | |
|---|---|---|
| 4,783,828 A | 11/1988 | Sadjadi |
| 5,109,425 A | 4/1992 | Lawton |
| 5,278,921 A | 1/1994 | Nakamura et al. |

(Continued)

FOREIGN PATENT DOCUMENTS

| | | |
|---|---|---|
| EP | 0 046 110 A1 | 2/1982 |
| EP | 0 380 659 A1 | 8/1990 |
| EP | 0 394 959 A2 | 10/1990 |

(Continued)

OTHER PUBLICATIONS

Kenichi Yamada, et al; "Image Understanding Based on Edge Histogram Method for Rear–End Collision Avoidance System", Vehicle Navigation & Information Systems Conference Proceedings; (1994), pp. 445 450 published Aug. 31, 1994; XP 000641348.
Stephane G. Mallat, "A Theory for Multiresolution Signal Decomposition: The Wavelet Representation", IEEE Transactions on Pattern Analysis and Machine Intelligence, vol. 11, No. 7, Jul. 1989, pp. 674–693.

(Continued)

*Primary Examiner*—Wilbert L. Starks, Jr.
(74) *Attorney, Agent, or Firm*—Townsend and Townsend and Crew LLP; Gerald T. Gray

(57) ABSTRACT

Systems and methods for adjusting a signal used for the detection of the movement of an object in a space represented by a set of data $A_{ij}$, associated with pixels forming a multidimensional space i, j, evolving with time, and represented at a succession of instants T, wherein the data are associated with the parameter A in the form of a digital signal DATA(A), composed of a sequence $A_{ijt}$ of binary numbers of n bits associated with synchronization signals defining the instant T of the space, and the position i, j in this space, in which the signals $A_{ijt}$ are received, in which the threshold and the gain in detection sensitivity of the parameter A are adapted.

The detection sensitivity of the parameter variation is also adapted.

14 Claims, 31 Drawing Sheets

U.S. PATENT DOCUMENTS

| | | | |
|---|---|---|---|
| 5,384,865 | A | 1/1995 | Loveridge |
| 5,488,430 | A | 1/1996 | Hong |
| 5,565,920 | A * | 10/1996 | Lee et al. ............... 375/240.11 |
| 5,592,226 | A * | 1/1997 | Lee et al. ............... 375/240.14 |
| 5,694,495 | A | 12/1997 | Hara et al. ................... 382/324 |
| 5,712,729 | A | 1/1998 | Hashimoto ................. 359/562 |
| 5,774,581 | A | 6/1998 | Nakagawa et al. |
| 5,793,888 | A | 8/1998 | Delanoy ...................... 382/219 |
| 6,256,608 | B1 * | 7/2001 | Malvar ........................ 704/230 |
| 6,304,187 | B1 | 10/2001 | Pirim |
| 6,486,909 | B1 | 11/2002 | Pirim |
| 6,597,738 | B1 | 7/2003 | Park et al. |
| 2002/0071595 | A1 | 6/2002 | Pirim |
| 2002/0120594 | A1 | 8/2002 | Pirim |
| 2002/0169732 | A1 | 11/2002 | Pirim |

FOREIGN PATENT DOCUMENTS

| | | |
|---|---|---|
| FR | 2 611 063 A1 | 8/1988 |
| FR | 2 751 772 A1 | 1/1998 |
| JP | 06-205780 A | 7/1994 |
| WO | WO 98/05002 | 2/1998 |
| WO | WO 99/36893 | 7/1999 |
| WO | WO 99/36894 | 7/1999 |
| WO | WO 00/11609 A1 | 3/2000 |
| WO | WO 00/11610 A1 | 3/2000 |
| WO | WO 00/11610 | 3/2000 |
| WO | WO 01/63557 A2 | 8/2001 |

OTHER PUBLICATIONS

John G. Daugman, "Complete Discrete 2–D Gabor Transforms by Neural Networks for Image Analysis and Compression", IEEE Transaction on Acoustics, Speech and Signal Processing, vol. 36, No. 7, Jul. 1988, pp. 1169–1179.

Alberto Tomita, Jr., et al., "Hand Shape Extraction from a Sequence of Digitized Gray–Scale Images", IECON '94, 20th International Conference on Industrial Electronics, Control and Instrumentation, vol. 3 of 3, Special Sessions, Signal Processign and Control, pp. 1925–1930.

Giacomo Indiveri et al., "System Implementations of Analog VLSI Velocity Sensors", 1996 IEEE Proceedings of MicroNeuro '96, pp. 15–22.

Pierre–Francois Rüedi, "Motion Detection Silicon Retina Based on Event Correlations", 1996 IEEE Proceedings of MicroNeuro '96, pp. 23–29.

Revue Trimestrielle Des <<Techniques de Lingenieur>>, "Instantanés Technique" Techniques De ingénieur, Mars 1997–N°5 (40F), ISSN 0994–0758.

Es Professionnels de Linformatique En Entreprise Magazine, "Objectif Securite Des Reseaux", N° 24, Janvier, 1997.

Electroncique International Hebdo, 5 Decembre 1996–N° 245, "Premier . . . oeil", Francoise Gru svelet (with translation).

Nabeel Al Adsani, "For Immediate Release The Generic Visual Perception Processor", Oct. 10, 1997, p. 1.

Colin Johnson, "Vision Chip's Circuitry Has Its Eye Out For You", http://192.215.107.74/wire/news/1997/09/0913vision.html, pp. 1–3.

The Japan Times, : British firm has eye on the future, Business & Technology, Tuesday, Nov. 18, 1997, 4th Edition.

Inside the Pentagon's, Inside Missile Defense, an exclusive biweekly report on U.S. missile defense programs, procurement and policymaking, "Missile Technology" vol. 3, No. 16–Aug. 13, 1997, p. 5.

Electronique, "Le Mechanisme de la Vision Humaine Dans Le Silicium", Electronique Le Mensuel Des Ingenieurs De Conception, No. 68, Mars 1997, ISSN 1157–1151 (with translation).

"Elecktronik Revue" ER, Eine Elsevier–Thomas–Publikation, Jahrgang 8, Marz 1997, NR.3, ISSN0939–1134.

"Un Processor de Perception Visuelle", LehAUT pARLEUR, 25F Des solutions électroniques pour tous, N° 1856, 15 janvier 1997 (with translation).

"Realiser Un Decodeur Pour TV Numberique", Electronique, Le Mensuel Des Ingenieurs De Conception, No. 66, Janvier 1997.

Groupe Revenu Français, Air & Cosmos Aviation International, "Un Calculateur De Perceoption Visuelle", Hebdomadaire, vendredi 6 décembre 1996, 34 Année, No. 1590, 22F.

* cited by examiner

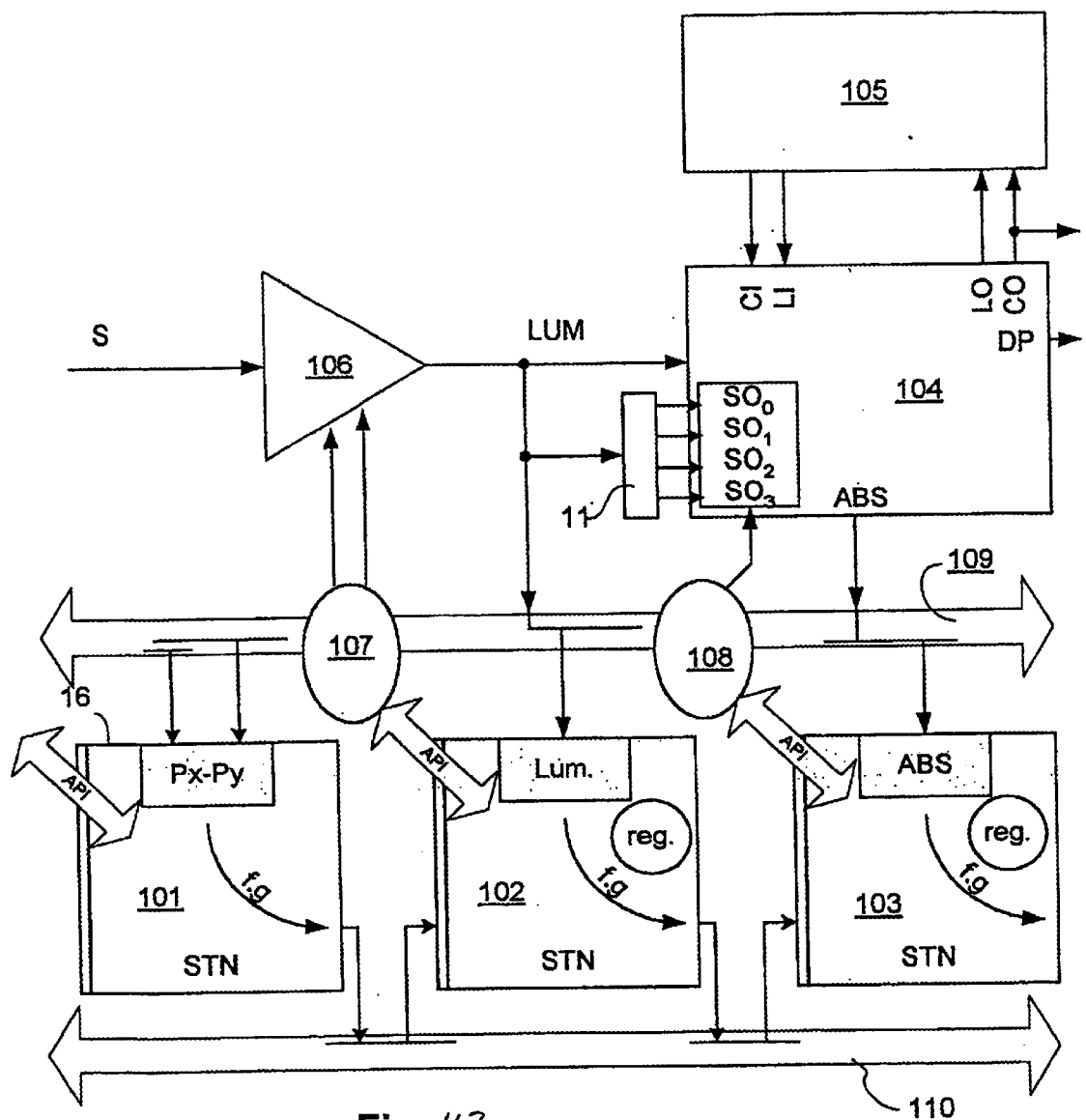
Fig. 43
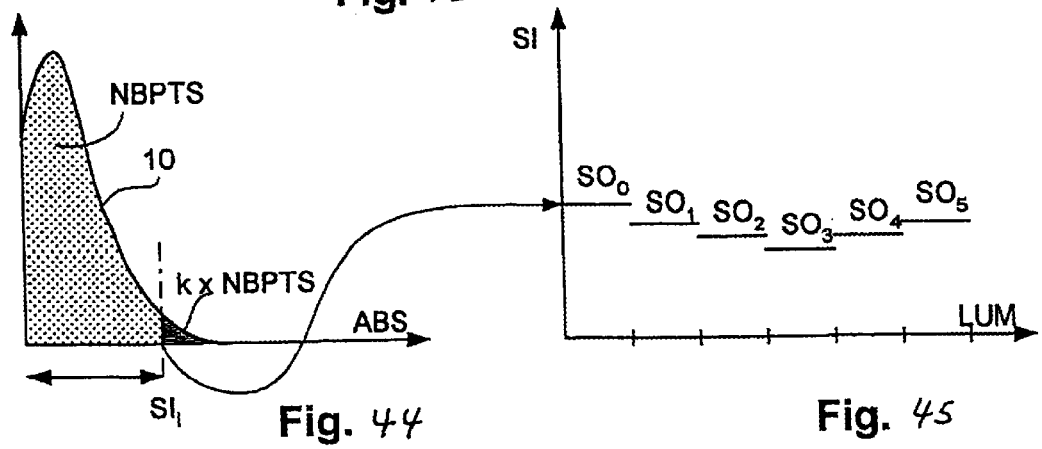
Fig. 44   Fig. 45

METHOD AND DEVICE FOR ADAPTING A SIGNAL FOR THE DETECTION OF THE MOVEMENT OF AN OBJECT

CROSS-REFERENCES TO RELATED APPLICATIONS

This application is a continuation-in-part of, and claims priority from, U.S. patent application Ser. No. 09/792,436, entitled "METHOD AND DEVICE FOR AUTOMATIC VISUAL PERCEPTION," filed Feb. 23, 2001, which is hereby incorporated by reference in its entirety for all purposes. This application also claims priority from French Patent Application No. 01 02530, filed Feb. 23, 2001, which is hereby incorporated by reference in its entirety for all purposes.

BACKGROUND OF THE INVENTION

The invention relates generally to methods and devices for automatic visual perception, and more particularly to methods and devices for adapting the detection sensitivity of a parameter carried by a signal. Such devices can be termed an electronic spatio-temporal neuron, and are particularly useful for image processing, but may also be used for processing other signals, such as audio signals.

Methods and devices are already known that have suggested statistical analysis of the points or pixels of a digital video signal coming from an observation system, for the realization of efficient devices capable of operating in real time. PCT WO 98/05002 relates to one such technique.

It is desirable to provide devices including combined data processing units of a similar nature, each addressing a particular parameter extracted from the video signal. In particular, it is desirable to provide devices including multiple units for calculating histograms, or electronic spatio-temporal neuron STN, each processing a DATA(A), ... by a function ($f_o g$) in order to generate individually an output value S, wherein these output values form together a feedback R available on a bus.

BRIEF SUMMARY OF THE INVENTION

It is thus that the present invention provides systems and methods implementing multiple histogram calculation units for the calculation of histograms or electronic spatio-temporal neuron STN, each processing a DATA(A), ... by a function ($f_o g$) in order to generate individually an output value S, wherein these output values form together a feedback R available on a bus 110. At the same time, each of these histogram calculation units feeds and updates an analysis output register $reg_a$ supplying statistical information on the corresponding parameter. The selection of the parameter processed by each histogram calculation unit, the content of the analysis output register and the function ($f_o g$) that the histogram calculation unit applies, are determined by API (Application Program Interface) software.

The present invention also provides methods and devices for adapting or adjusting the detection sensitivity of a parameter carried by a signal using a plurality of histogram calculation units.

In addition to automatically adaptating of the threshold and the gain sensitivity of the detection system, typically realized while acting on the luminance signal, the present invention defines and adapts, automatically, a detection threshold of the movement, or more precisely, of the relative movement of an object.

According to an aspect of the invention, a method is provided for adjusting a signal used for the detection of the movement of an object in a space represented by a set of data $A_{ij}$, associated with pixels forming together a multidimensional space i, j, evolving with time, and represented at a succession of instants T, whereas the said data each associated with the parameter A is in the form of a digital signal DATA(A), composed of a sequence $A_{ij}$ of binary numbers of n bits associated with synchronization signals enabling to define the instant T of the space and the position i, j in this space, with which the signals $A_{ijt}$, received at a given instant are associated, in which the threshold and the gain in detection sensitivity of the parameter A are adjusted.

According to the invention, the detection sensitivity of the parameter variation is adjusted.

This invention also relates to the following characteristics as will be evident from the following description and which should be considered individually or in all their technically possible combinations:

for detecting the variation of the signal at a given point in the space i, j, the value of each value $A_{ijt}$ is compared to a smoothed value $AI_{ijt}$ derived from the previous values in relation to a time constant $CO_{ijt}$, wherein the comparison generates an overshoot threshold $DP_{ijt}$ of $A_{ijt}$ in relation to at least one threshold S, $CO_{ijt}$ is modified in relation to $DP_{ijt}$, a histogram of $ABS_{ijt} = |A_{ijt} - AI_{ijt}|$ is prepared and the threshold S is adapted in relation to the histogram, $CO_{ijt}$ is calculated with respect to the previous value $CI_{ijt}$ of the same parameter in the following manner:

$CO_{ijt} = CI_{ijt} + 1$ for $DP_{ijt}$ false $CO_{ijt} = CI_{ijt} - 1$ for $DP_{ijt}$ true $CO_{ijt}$ being delineated: $0 \leq CO_{ijt} \leq CO_{Max}$ $CO_{Max}$ being a value predetermined by the A.P.I., the smoothed value $AO_{ijt}$ is related to its previous value $AI_{ijt}$ by the formula:

$$AO_{ijt} = AI_{ijt} + \frac{A_{ijt} - AI_{ijt}}{2^{CO_{ijt}}}$$

adaptation to the threshold is made with reference to a classification of the value $ABS_{ijt}$ of ABS and to an overshoot ratio $k_1$.

the overshoot values of $ABS_{ijt}$ are generated in relation to several thresholds $S_0$, $S_1$, $S_2$, $S_3$ each adapted to a complete frame, the parameter A is luminance L, the region of the space i, j affected is also adapted.

The invention also provides a device for adjusting a signal used for the detection of the movement of an object in a space represented by a set of data $A_{ij}$, associated with pixels forming together a multidimensional space i, j, evolving with time, and represented at a succession of instants T, whereas the said data each associated with the parameter A is in the form of a digital signal DATA(A), composed of a sequence $A_{ijt}$ of binary numbers of n bits associated with synchronization signals enabling to define the instant T of the space and the position i, j in this space, with which the signals $A_{ijt}$ received at a given instant are associated, comprising:

a level and amplitude amplifier of the signals $A_{ijt}$, a unit for calculating the CO and DP of values of a time constant CO and an overshoot value DP in which the value of each value $A_{ijt}$ is compared to a smoothed value $AI_{ijt}$ derived from the previous values in relation to the time constant $CO_{ijt}$ whereas the comparison generates a possible overshoot threshold $DP_{ijt}$ of $A_{ijt}$ in relation to at least one threshold S, CO is modified in relation to DP.

According to the invention, the CO and DP calculation unit generates a sequence $ABS_{ijt}=|A_{ijt}-AI_{ijt}|$, and the device also typically comprises:

a first histogram calculation unit that processes the sequence $A_{ijt}$ and enables adaptation of the offset and the sensitivity gain in detection of the parameter A, via a module acting on the level amplifier, and a second histogram calculation unit that processes the sequence $ABS_{ijt}$ and enables adaptation of the detection sensitivity of the variation of the parameter while acting on the threshold S via a module connected to the CO and DP calculation unit.

The device also typically comprises a third histogram calculation unit that processes the sequence $A_{ijt}$ to adapt the region of the space i, j affected, and a data input bus and a classification bus to which the histogram calculation units are attached.

The CO and DP calculation unit comprises a memory for storing several threshold values $S_0$, $S_1$, $S_2$, $S_3$.

The device also typically comprises an A.P.I. for controlling the histogram calculation units.

Reference to the remaining portions of the specification, including the drawings and claims, will realize other features and advantages of the present invention. Further features and advantages of the present invention, as well as the structure and operation of various embodiments of the present invention, are described in detail below with respect to the accompanying drawings. In the drawings, like reference numbers indicate identical or functionally similar elements.

BRIEF DESCRIPTION OF THE DRAWINGS

The invention will be described in detail with reference to the appended drawings in which:

FIG. 43 is a representation of the device according to the invention;

FIG. 44 is the statistical representation of the points implemented in FIG. 42; and FIG. 45 is a representation of the levels of the cut-off threshold of the number of points.

DETAILED DESCRIPTION OF THE SPECIFIC EMBODIMENTS

The invention is subject to numerous embodiments. The information processed can be of various natures and represent multiple data or parameters. However, one application is image processing, wherein the images make up the space considered. This space in one embodiment is two-dimensional. The following detailed description corresponds to this particular embodiment. It should be appreciated, however, that the space may be of three or more dimensions.

Figure 1:
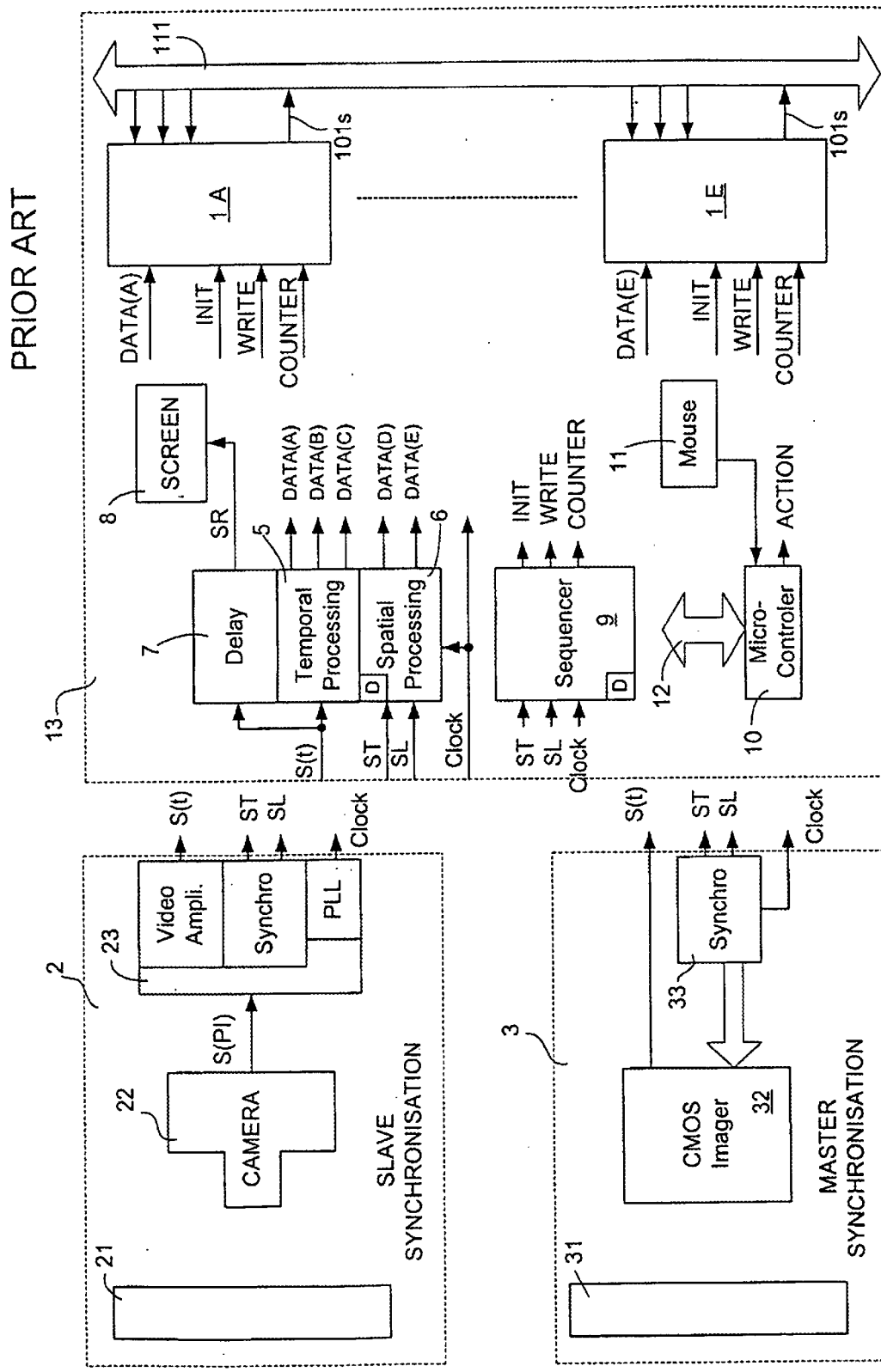
FIG. 1 is a representation of the histogram calculation unit according to the invention, in its context.
Figure 2:
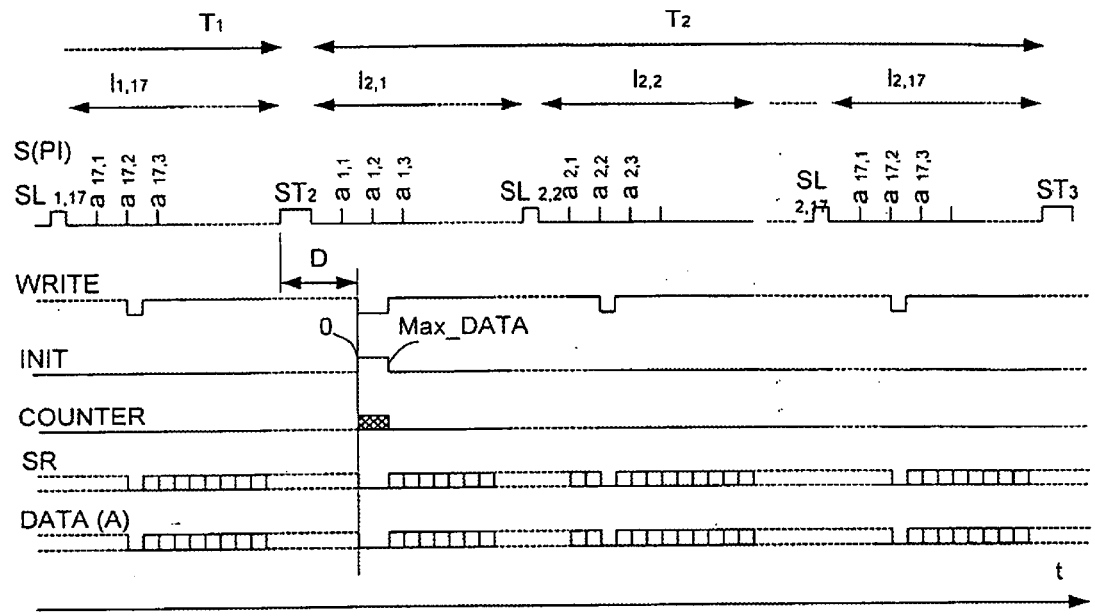
FIG. 2 is a representation of the input video signal, processed by the device and the method of the invention and of the control signals generated by a sequencer.

A histogram calculation unit 1 of the invention is represented in its context by FIGS. 1 and 2. Histogram calculation unit 1 is part of a perception unit 13 that receives and processes a signal S(t) or S(PI). The histogram calculation unit 1 processes and generates time coincidences information S'(t) on a bus 111. More precisely, FIG. 1 represents several associated histogram calculation units 1A, 1B, . . . , 1E in the same perception unit. In one embodiment, perception unit 13 is a visual perception unit that processes various signals relating to a visual scene or scenes. In other embodiments, the perception unit 13 processes signals related to the desired perception parameters, for example, sound parameters. The following will discuss the invention with respect to the visual perception domain, although it will be apparent that other perception domains may be implemented.

A sequencer 9 generates, out of the synchronisation signals ST, SL, CLOCK, sequence signals INIT, WRITE and COUNTER that control the histogram calculation unit.

As represented on FIG. 1, the input signals of the sequencer 9 (St, SL, ST, CLOCK) may come from a signal generator assembly 2 comprising a camera 22 or a signal generator assembly 3 comprising a CMOS imaging device 32. It will be apparent that input signals can be supplied by any signal generation mechanism.

Figure 7:
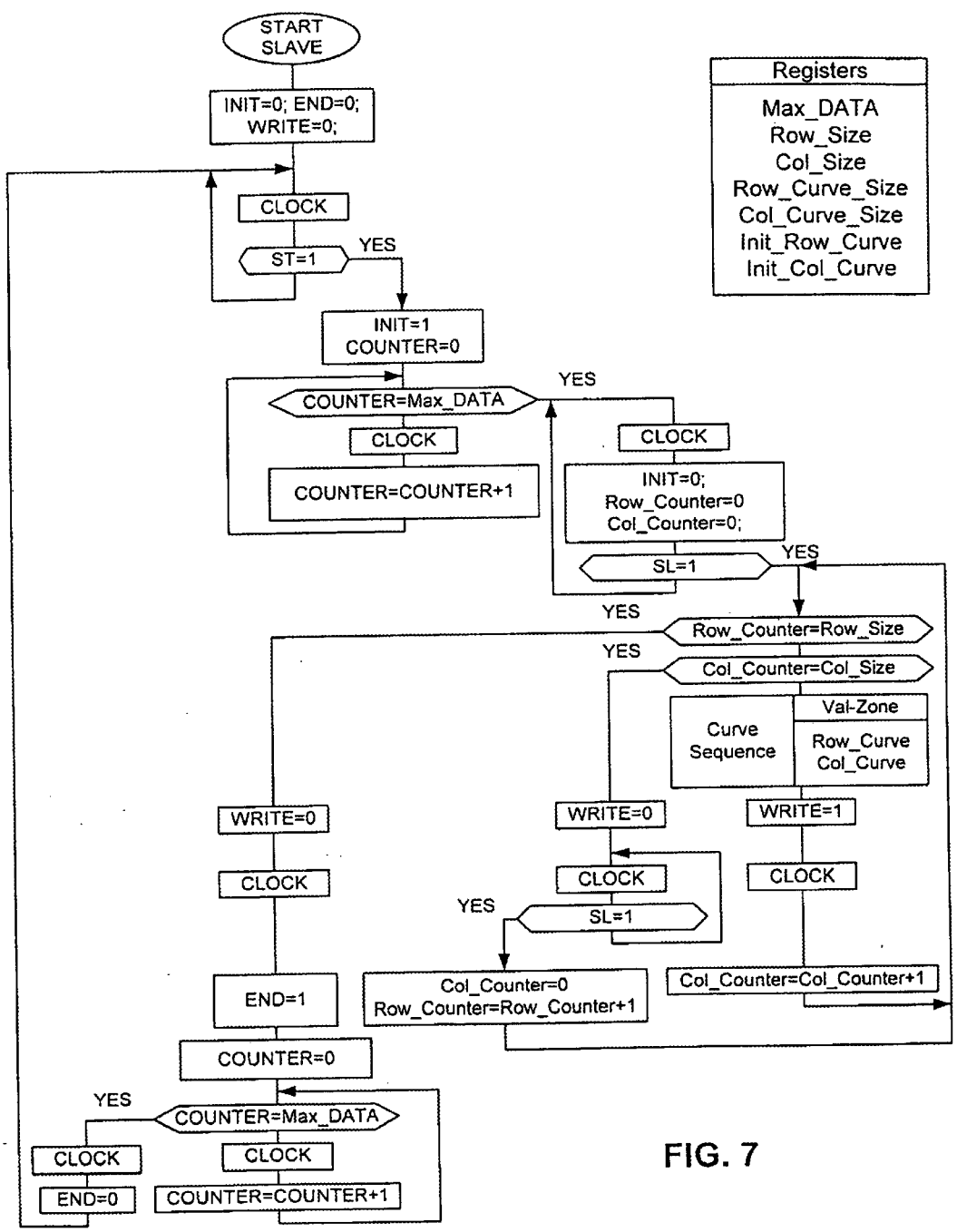
FIG. 7 is the flow chart of the software controlling the calculation unit of FIG. 4 in slave mode.

When the input signals come from an assembly 2 comprising a camera, this assembly imposes frame and line synchronisation signals so that the histogram calculation unit and its sequencer operate in a slave mode or synchronisation slave mode. FIG. 7 illustrates a flow chart representing software for controlling the histogram calculation unit and sequencer in a slave mode.

Figure 6:
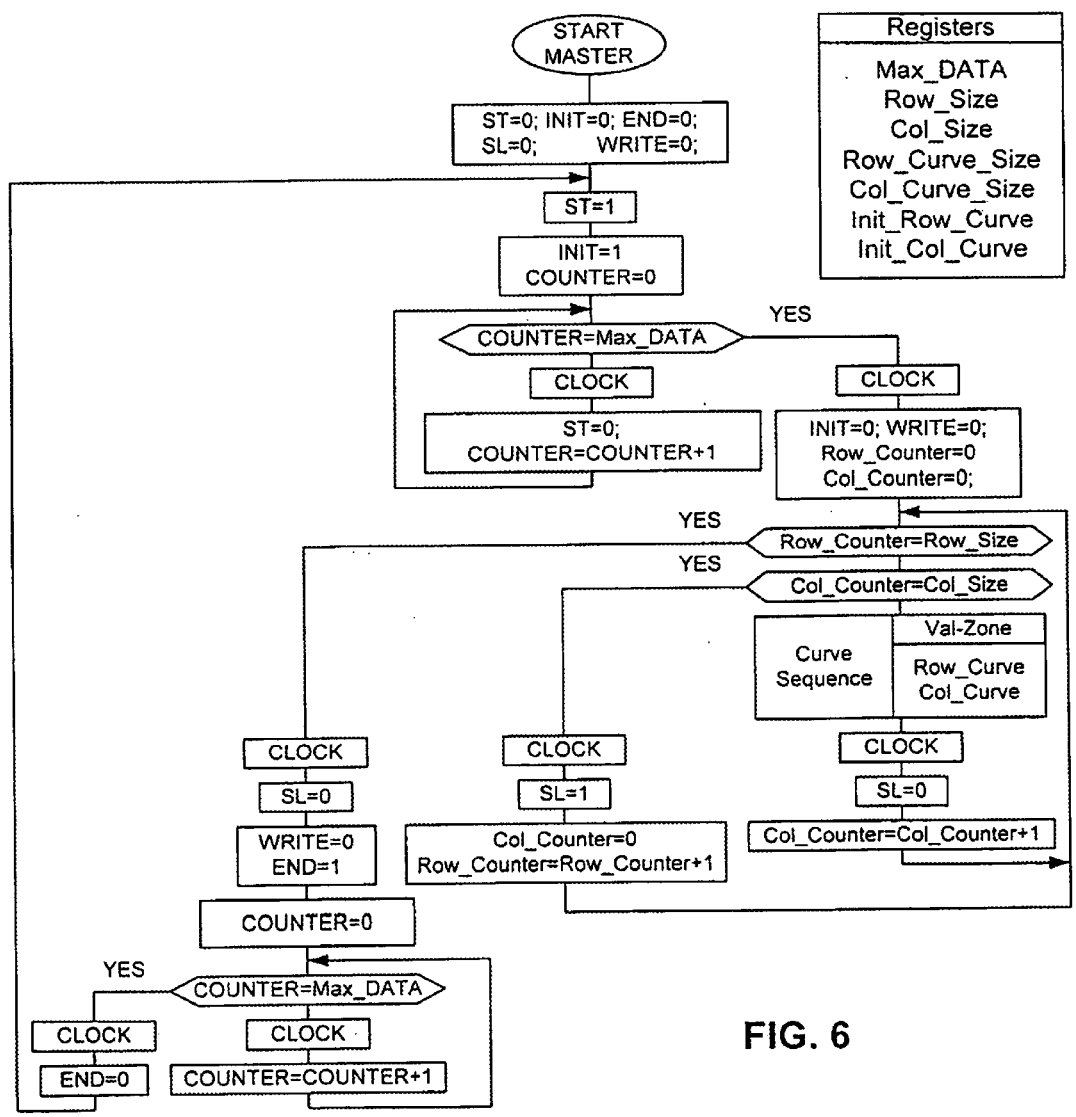
FIG. 6 is the flow chart of the software controlling the calculation unit of FIG. 4 in master mode.

Conversely, in case when these signals come from an assembly 3 comprising a CMOS imaging device, the sequencer 9 operates in a master mode and generates itself the synchronisation signals. FIG. 6 illustrates a flow chart representing software for controlling the histogram calculation unit and sequencer in a master mode.

More precisely, the assembly 2 enables acquisition of data from a scene 21 by a camera 22. The camera 22 produces a signal S(PI) whose configuration, of the type represented on FIG. 2, will be described in detail below.

The electronic control unit 23 of the camera 22 then provides the signals S(t) resulting from the extraction of S(PI), ST, SL synchronization signals and the CLOCK signal originating from a phase-lock loop, that are used by the histogram calculation unit.

In the case of an assembly 3 comprising a CMOS imaging device, this imaging device 32 is used for the acquisition of data of the scene 31, it supplies S(t) and is driven by a synchronization unit 33 that produces the frame synchronization signals ST and the line synchronization signals SL, as well as the CLOCK signal used by the CMOS imaging device 32 as well as by the other elements of the visual perception unit 13.

The histogram calculation units 1 are advantageously co-ordinated to a spatial processing unit 6 and a temporal processing unit 5 and to a delay line 7 that have been described in FR-2.611.063, and FR-2.751.772, WO-98/05002, and corresponding U.S. patent application Ser. No. 09/230,502, entitled "Image Processing Apparatus and Method," filed on Jan. 26, 1999, the contents of which are each hereby incorporated by reference in its entirety for all purposes. The spatial and temporal processing units 5 and 6 correspond to the device referred to as 11 in the patent application mentioned. It receives the signal S(PI) and generates parameters V (speed), DI (direction), each corresponding to one of the inputs identified as DATA(A) . . . DATA(E) in this application.

In one embodiment, these parameters include the spatial resolution, the image structure (multiscale contrast change in polar coordinates, etc. . . . ), as they result from a wavelet analysis by Gabor and described in Daugman's article (1988) "Complete Discrete 2D Gabor Transform . . . , IEEE Trans. Acoust. Speech Signal Process 36:1169–1179.

This assembly, composed of a plurality of histogram calculation units 1, the spatial and temporal processing units 5 and 6 and the delay line 7, supplies 'time coincidences' information, generally in digital form, that can be processed by a downstream device, or a signal enabling visualisation of information on a screen 8 via the bus 111.

Figure 3:
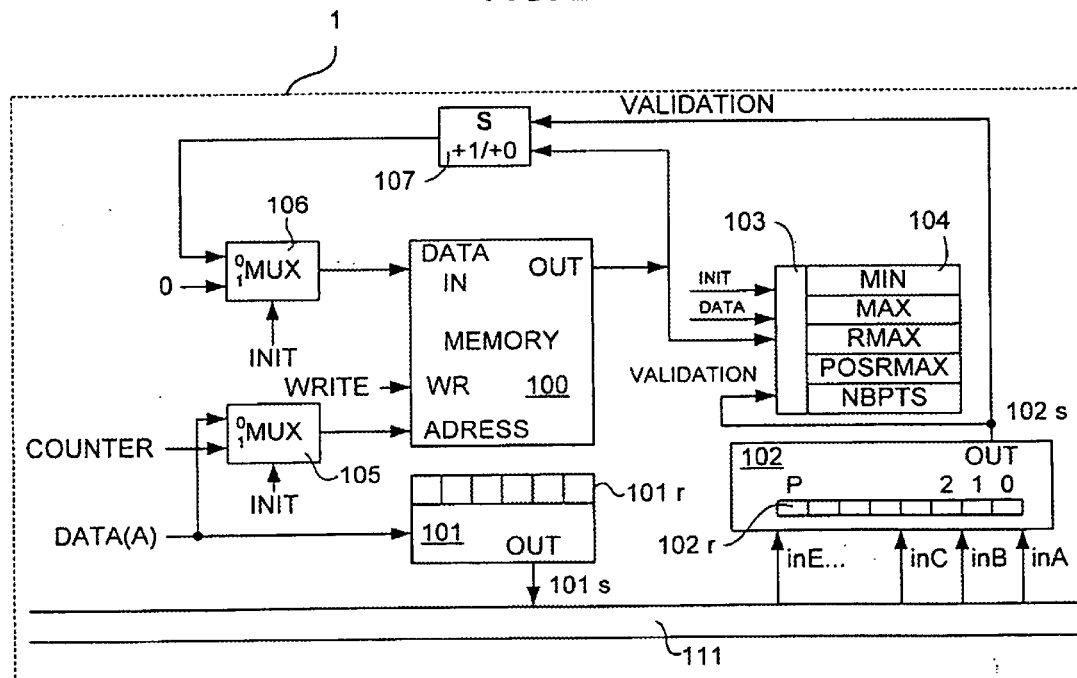
FIG. 3 is a diagram representing a passive histogram calculation unit.

A passive (non self-adapting) histogram calculation unit and without anticipation is represented on FIG. 3. This histogram calculation unit is intended for processing the values of a parameter A that are affected at each pixel in a signal $S(t)=\{a_{ijT}\}$ of the video type.

However, it will be apparent that the system is capable of processing values associated with signals other than video signals.

Video signal S is composed of a succession of frames, wherein each frame includes a succession of pixels whose assembly forms a space, for example an image for a two-dimensional space. In such a case, the frames are themselves broken down into lines and columns. This signal S(t) carries a value $a_{ij}$ of the parameter A for each pixel (i,j). The succession of the frames represents therefore the temporal succession of images. In the notation $\{a_{ijT}\}$, T represents the frame, i is the number of a line in the frame T, j is the number of the column of the pixel in this line, a is the value of the parameter A associated with the pixel ijT.

The signal S can be an analogue signal. However, it is preferably digital and composed, as represented on FIG. 2, of a succession of frames $T_1$ and $T_2$, each being formed of a succession of horizontal scanned lines such as $I_{1.1}$, $I_{1.2}, \ldots, I_{1.17}$ for $T_1$ and $I_{2.1} \ldots$ for $T_2$. Each line includes a succession of pixels or image points PI.

S(PI) comprises a frame synchronisation signal (ST) at the beginning of each frame, a line synchronisation signal (SL) at the beginning of each line that is not a beginning of frame as well. Thus, S(PI) comprises a succession of frames that represents the temporal array and, within each frame, a series of lines and of pixels arranged in columns that are significant of the spatial array.

In the temporal array, <<successive frames>> designate chronologically successive frames and <<successive pixels at the same position>> designate the successive values $a_{ij}$ associated respectively to the pixels (i,j) placed at the same location in the successive frames, i.e. for instance (1, 1) of $I_{1.1}$ in the frame $T_1$ and (1,1) of $I_{2.1}$ in the corresponding following frame $T_2 \ldots$ On the basis of the S(PI), as indicated above with reference to the application PCT/FR-97/01354, the spatial and temporal processing units 5 and 6 generate one or a plurality of signals, e.g., signals DATA(A) . . . DATA(E).

The passive histogram calculation unit 1, without anticipation, as represented in FIG. 3, processes a signal DATA(A) whose structure is represented in FIG. 2. This signal may be received directly from either a camera or any other image acquisition system, or may have been subjected previously to a first process, for example spatial and/or temporal processing as described, for example, in application PCT/FR-97/01354, the contents of which is hereby incorporated by reference in its entirety for all purposes.

Classifier 101 generates a signal 101s of similar structure that carries for each pixel a piece of information significant of the result obtained when applying recognition or selection criteria.

As shown in FIG. 3, histogram calculation unit 1 includes an analysis memory 100, an address multiplexer 105, a data input multiplexer 106, an incrementation unit 107 classifier 101, a time coincidences unit 102 and a test unit 103, the operations of which will be described below. All elements of the histogram calculation unit 1 are controlled and synchronized by a clock signal (not shown).

I. The Analysis Memory

Analysis memory 100 is preferably a conventional synchronous or asynchronous digital memory, such as a DRAM, SDRAM or the like. Analysis memory 100 includes a number, n, of addresses, d, equal to the number of possible levels for the values of the parameter A that must be discriminated. Each of these addresses preferably stores at least the number of pixels contained in a frame (i.e., in an image).

For each frame, after resetting by the command signal INIT, a signal WRITE enables, throughout the frame, the processing of the data DATA(A). Thus, the analysis memory 100 is capable of receiving the signal DATA(A). For each frame received, the pixels for which the value of the parameter A has a value $a_{ij}$=d (if they are enabled by an enabling signal 102s as will be described below), will increment the content of the address of row d of the memory 100 by a value 1. Thus, after having received a complete frame, the memory 100 comprises, at each of its addresses d, the number of pixels that are enabled and for which the parameter A bad a value d.

II. The Address and Data Input Multiplexers

The histogram calculation unit 1 also comprises an address multiplexer 105 and a data input multiplexer 106. Each multiplexer receives a binary selection control signal and two input signals and provides one output signal. The value of the output of each multiplexer corresponds to one of the inputs when the selection control signal is equal to one value, e.g., 1, and the other input when the control signal is equal to a different value, e.g., zero as shown.

As shown, when the control signal INIT is equal to zero, the address multiplexer 105 selects an address in the analysis memory 100 in relation to the level d of the signal received ($a_{ijT}$), and the data input multiplexer 106 transfers the incrementation of the value contained in this memory from incrementor 107 in relation to the status of validation signal 102s.

As shown, when the control signal INIT is equal to 1, the address multiplexer 105 transfers the signal of the counter that increments the address from zero to the maximum value of DATA(A), and the data input multiplexer 106 forces zero on the input of the memory 100.

III. The Incrementation Unit

Incrementation unit 107 in one embodiment is a controlled adder comprising one input, one enabling signal input and one output.

The output of the incrementation unit is equal to the output of the analysis memory 100 if the enabling signal 102s is equal to one value, e.g., zero; or it is equal to output of the analysis memory 100 increased by 1 if the enabling signal 102s is equal to another value, e.g., 1.

IV. The Classifier

Classifier unit 101 includes a register 101r capable of storing certain possible level values ($d_1, d_2, \ldots$) for the levels of the parameter A.

The classifier 101 receives the signal DATA(A), sorts the pixels, and provides, on its output 101s, a value 1 when the parameter A associated with the said pixel has a level corresponding to that contained in the register 101r ($d_1, d_2, \ldots$) and the zero value conversely.

The output of the classifier 101 is connected to a bus 111.

V. The Time Coincidences Unit

Time coincidences unit 102 is connected to the bus 111, and includes at least one register 102r and receives, for each pixel, the output values ($in_E, \ldots, in_B, in_A$) of the classifiers 101 of the various histogram calculation units 1 connected to the bus 111.

This time coincidences unit 102 compares the values thus received to those contained in its register 102r and transmits, on its output 102s, for each pixel, an enabling signal equal to 1 when there is a coincidence between the register values equal to 1 and the corresponding data received from the bus 111, and a zero value in the reverse case, which corresponds to the following Boolean function:

$$out = (\overline{in_0} + Reg_o) \cdot (\overline{in_1} + Reg_1) \ldots (\overline{in_n} + Reg_n)(in_o + in_1 + \ldots in_n)$$

VI. The Test Unit and the Analysis Output Register

Test unit 103 receiving the information coming from the analysis memory 100 and is connected to analysis output registers 104. The analysis output registers 104 are intended for receiving statistical information prepared on the basis of the values of the parameter A of the signal DATA(A) for each frame. This information may be, for example, minimum values (MIN) and maximum values (MAX) of the parameter A, of the number of occurrences (RMAX) of the most represented value and of the position (POSRMAX) of this value, as well as of the number (NBPTS) of points for which information has already been received. The test unit 103 updates the analysis output registers 104 in relation to the information that it receives.

The incrementation enabling unit 107 also outputs a signal addressed to the test unit 103 that enables test unit 103 to increment the analysis output register 104.

After processing a complete frame, the histogram calculation unit 1 has produced statistical information representative of this frame, available in the analysis output register 104 and processable for all intended purposes, either for operator-accessible visualisation or for processing by any other programme or automaton.

The analysis output registers 104 comprise memories for each key-feature such as the minimum (MIN) of the histogram, the maximum (MAX) of the histogram, the number of points (NBPTS) of the histogram, the position (POSRMAX) of the maximum of the histogram and the number of points (RMAX) at the maximum of the histogram. These features are determined in parallel with the formation of the histogram by the test unit 103, as follows:

For each pixel that is validated:

(a) if the value of the parameter DATA(A) of the pixel<MIN (which is initially set to the maximum possible value of DATA(A) of the histogram), then the value of the parameter is inscribed in MIN;

(b) if the value of the parameter DATA(A) of the pixel>MAX (which is initially set to the minimum possible value of DATA(A) of the histogram), then the value of the parameter is inscribed in MAX;

(c) if the content of the memory 100 at the address of the value of the parameter of the pixel>RMAX (which is initially set to the minimum possible value DATA(A) of the histogram), then i) the value of the parameter should be written into PORMAX and ii) the output of the memory should be written into RMAX;

(d) NBPTS (which is initially set to the value zero) should be increased by one unit.

Figure 10:
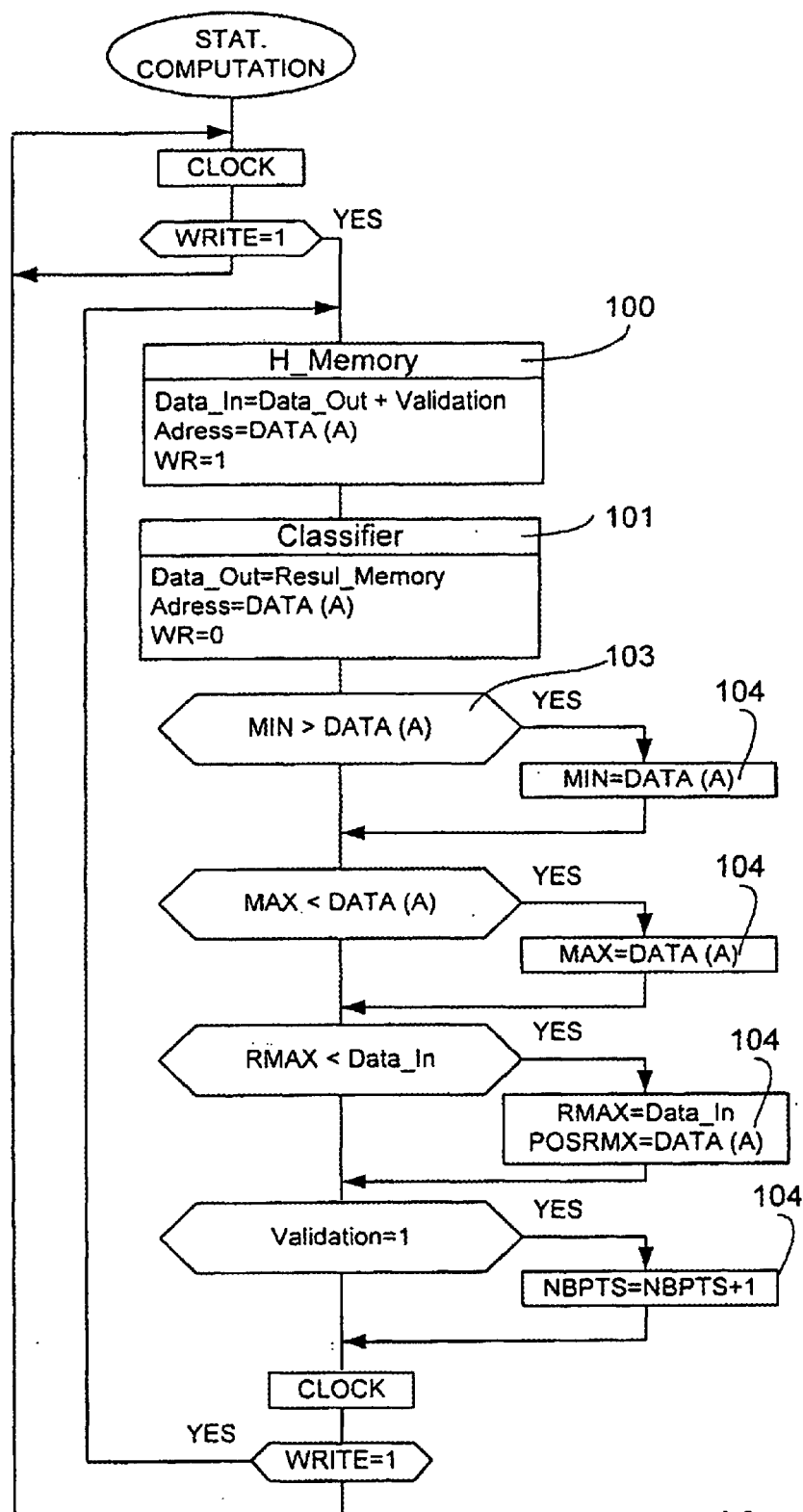
FIG. 10 is the flow chart of the statistical calculation software (use of the command 'WRITE')

FIG. 10 illustrates a flow chart of the statistical calculation software according to one embodiment of the invention.

VII. Global Operation of Passive Histogram Calculation Units

According to one embodiment of the invention, a plurality of histogram calculation units, e.g., 1A, 1B, . . . , 1E, are connected to the same time coincidences bus 111. This description refers to five histogram calculation units A to E, although extrapolation to any number of units is evident.

A. Signal Write

For each signal WRITE, the classifier unit 101 of each histogram processing unit 1 supplies to the bus 111, for each pixel, an output signal 101s and each of the histogram processing units 1 receives all these signals on the input $in_A$, . . . , $in_E$ of their time coincidences unit 102.

The parameter, for example DATA(A) for the unit 1A, is compared to the content of the register 101r of the classifier 101. The result, inA=101r, of this comparison is a binary signal 101s that is addressed at the same time as its counterparts inB . . . inE, coming from the other units, e.g., 1B . . . 1E.

Each time coincidences unit 102 compares each of these values received to the content of its register 102r constituting a time coincidences criterion, R, and generates, on its output 102s, a binary signal whose value depends on the result of the comparison.

This signal 102s controls the incrementer 107. For example, when signal 102s is equal to 1, incrementor 107 produces, via the data multiplexer 106, the incrementation by one unit of the content of the register of the memory 100 corresponding to the value of the parameter DATA(A), simultaneously the test unit 103 ensures statistical processing of the content of the memory 100 and transfers the content thereof into the analysis output register 104.

At the end of the signal WRITE, each register of the memory 100 contains as a value d, the number of pixels for which the signal DATA(A) showed the corresponding value d and that the time coincidences unit 102 has enabled.

B. Signal INIT

Figure 9:
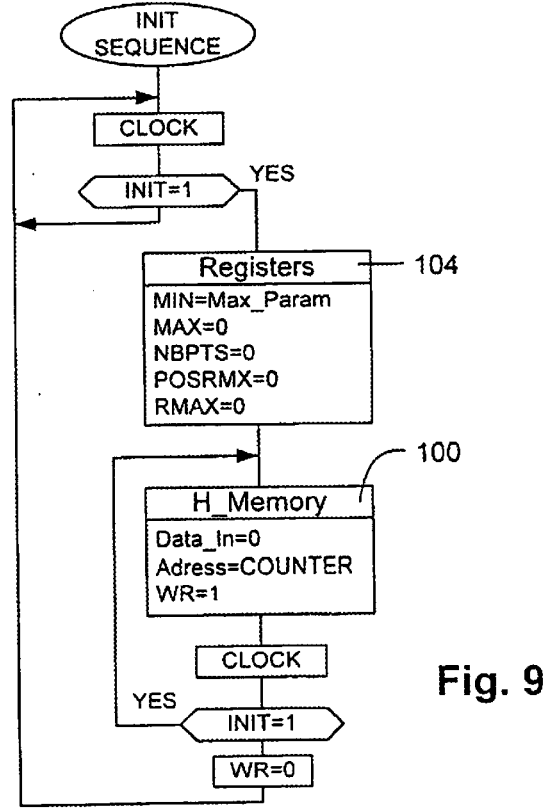
FIG. 9 is the flow chart of the initialization software (generation of the command 'INIT')

During the signal INIT, the signal COUNTER that scans the values from 0 to n (number of addresses in memory 100), resets the registers of the memory 100. FIG. 9 is a flow chart of initialisation software (e.g., generation of commend 'INIT') according to an embodiment of the invention.

VIII. Self-adaptation

In the description made until now, the memory of the classifier 101 includes a register 101r whose content determined outside the system is fixed. Such a classifier is said to be "passive".

According to one embodiment of the present invention, a self-adapting histogram processing unit 1 is provided. In this embodiment, the content of the memory of the classifier 101 is automatically updated. In one embodiment, classifier 101 includes a look up table (LUT). To fulfil the self-adapting function, i.e. real time updating of the classifier 101, the histogram calculation unit 1 of FIG. 3 is perfected in accordance with FIG. 4. Instead of having a simple register 101r written outside the system, the classifier 101 has an addressable memory whose writing is controlled by a signal END. The sequencer 9 generates this signal END represented in FIG. 5. The histogram calculation unit 1 comprises a selection circuit 110, e.g., an 'OR' gate as shown, receiving at its input the signals INIT and END and whose output is connected to the selection input of the address multiplexer 105.

The memory of the classifier 101 is controlled by the system, and its content is modifiable. In one embodiment, the classifier memory comprises a data input terminal for receiving a DATA IN signal, a write input terminal for receiving a write command WR signal, and an address input for receiving an ADDRESS signal. The address input is connected to the output of an anticipation multiplexer 108. This 'two to one'-type multiplexer 108 comprises an anticipation control input terminal connected to the output of an operator 'OR' 112 receiving as its input the signals INIT and END. The inputs of the anticipation multiplexer receive the same signals as the inputs of the address multiplexer 105 (e.g., DATA(A) and COUNTER). When the signal END is equal to 1, the memory of the classifier 101 is written by the signal resulting from the comparison between the value of the histogram memory 100 and a value derived from the analysis output register 104, e.g., RMAX/2, for the possible values of DATA(A) as will be described in more detail below.

Hence the classifier acts as a classification function $f_A$ which is the relationship that it establishes between the data DATA(A) that it receives and the output binary value (101s)A that it produces, via the memory of the classifier.

A. First Embodiment of Classifier

Figure 12:
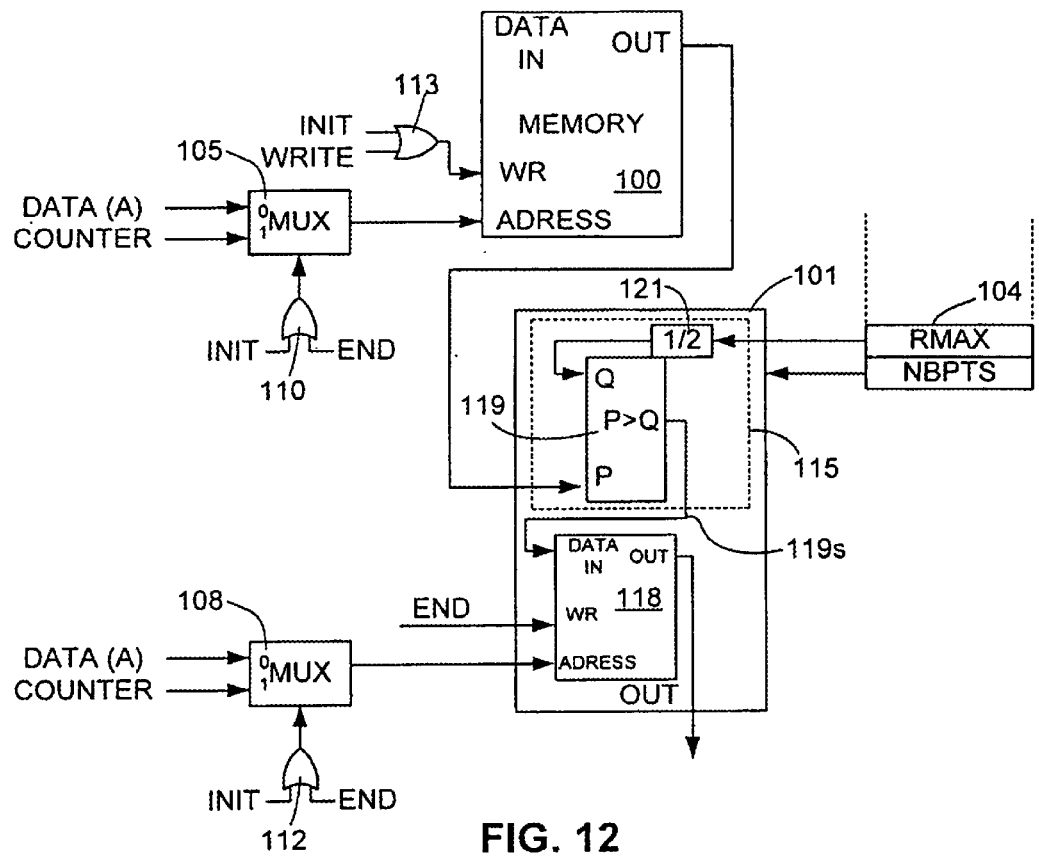
FIG. 12 is a representation of the elements of the histogram calculation unit with a self-adapting functionality according to one embodiment of the present invention.

With reference to FIG. 12, the classifier 101 fulfilling the self-adapting function comprises a memory 118 whose writing input terminal WR receives the signal END and the address input terminal ADDRESS receives the output signal of the address multiplexer 108.

Classifier 101 also includes a comparator 119 comprising two inputs and one output that is connected to the data input DATA IN of the memory 118.

The first input, Q, of the comparator 119 receives a value derived from an analysis output register 104 and its second input receives the output of the memory 100. In one embodiment, for example, the value received at the first input Q is the value RMAX/2, derived from RMAX register 104 in conjunction with divider circuit 121.

Memory 118 of the classifier 101 preferably comprises the same number of words as the analysis memory 100, but in the memory 118, each word comprises one bit only.

At the end (e.g., signal END=1) of the reception of a new data flux DATA(A) of a given frame, a writing sequence starts.

If for a given memory address d of the analysis memory 100, the value read is greater than RMAX/2, a value 1 is inscribed into the memory 118 at the corresponding position. Conversely, if the value read is less than RMAX/2, the value 0 is inscribed in this position. All the memory addresses d are scanned from 0 to n. The memory 118 of the classifier 101 is thus updated. It will be understood that values from registers 104 other than RMAX may be used.

B. Second Embodiment of Classifier

Figure 13:
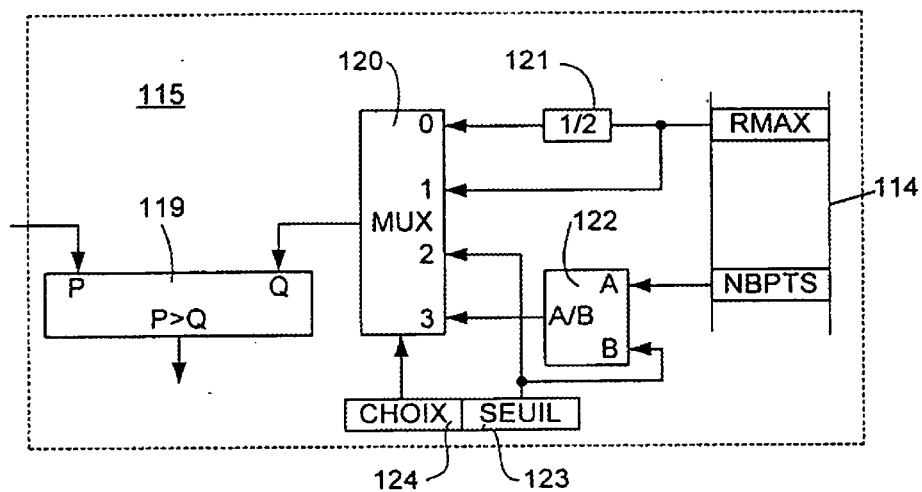
FIGS. 13 and 13c are representations of an enabling counter fitted with several adapting modules according to alternate embodiments of the present invention.

FIG. 13 represents an alternative embodiment of the classifier 101 including a multiplexer 120 that is controlled by a selection control signal 124. Classifier 101 enables comparison of the parameter P to a statistical value Q, which can be prepared in various ways in relation to the statistical parameters received on the different inputs 0, 1, 2, 3 of multiplexer 120, which are selected by the selection control signal 124, which depends on the content of the register 'SELECTION'. The input 0 of the multiplexer 120 receives the value RMAX/2 produced on the basis of the data in the analysis output register 104 by the divider circuit 121, the input 1 of the multiplexer 120 receives directly the value RMAX, the input 2 of the multiplexer 120 receives a threshold value contained in a register 'THRESHOLD' 123 whose content is programmed outside the system, and the input 3 of multiplexer 120 receives the quotient of the number of points NBPTS by the THRESHOLD 123 produced by the divider circuit 122.

Therefore, as represented on FIG. 13, the parameter P can be compared to the respective values RMAX/2, RMAX, at a threshold B input from the outside and in proportion to the number of points NBPTS attached to this threshold by the divider 122. It will be apparent that other input values may be used, e.g., any values from registers 104.

The content of the memory 118 is updated, in relation to the signals supplied by the comparator 119 similarly to the update described in the first embodiment.

C. Third Embodiment of Classifier

Figure 13A:
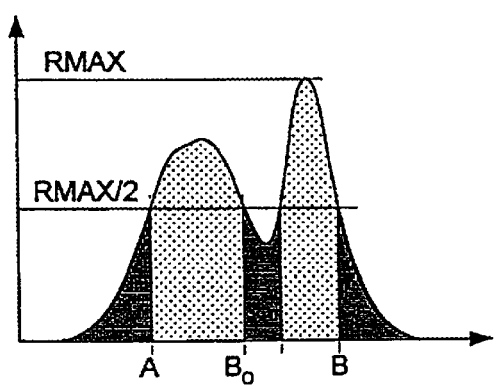
FIGS. 13a and 13b are representations of statistical distributions of a parameter and classification criteria.
Figure 13B:
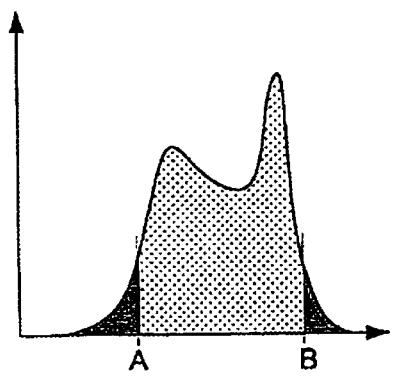
Figure 13C:
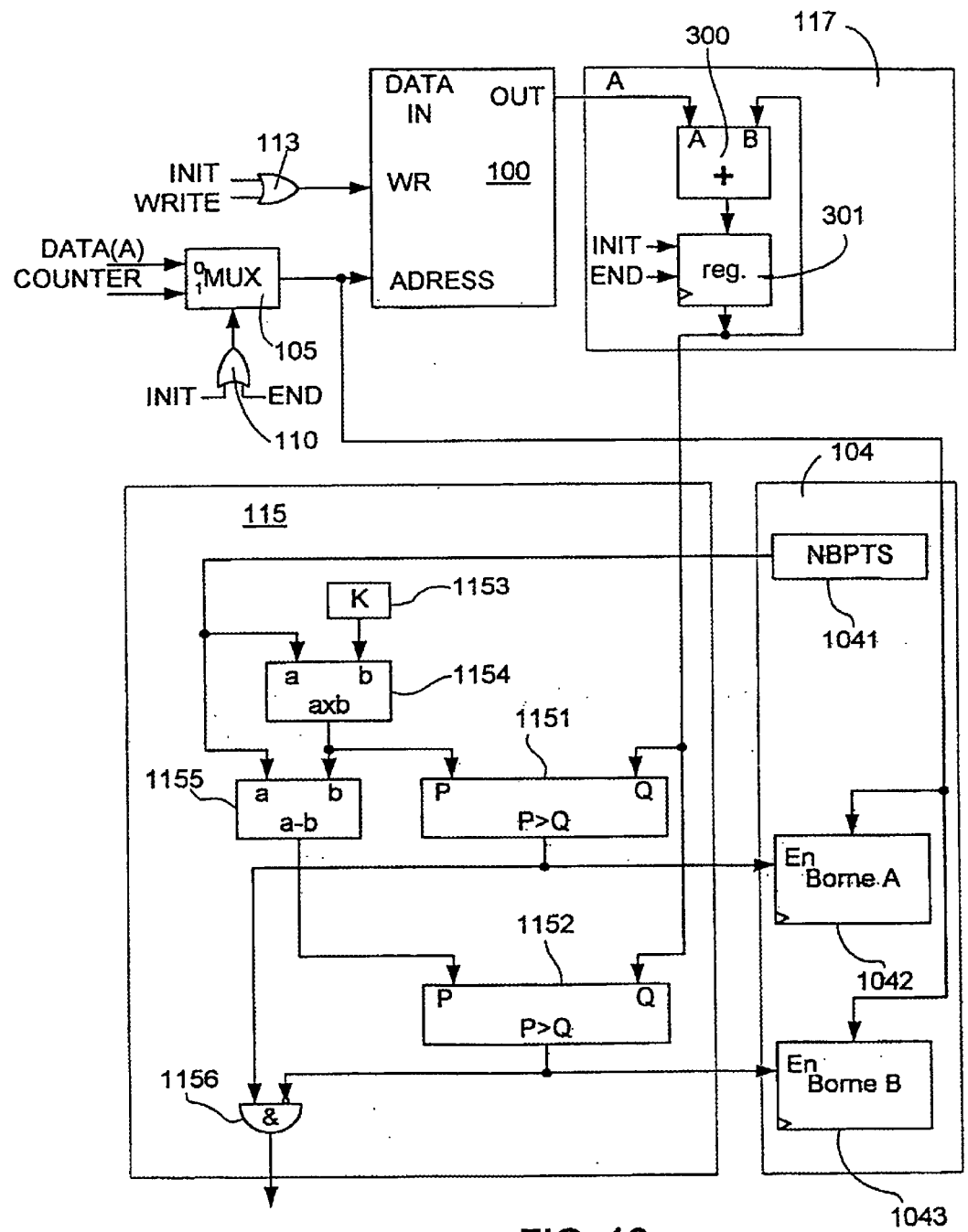

FIGS. 13a, 13b, 13c represents another embodiment of a classifier in which the cumulative total of events is used in a histogram instead of the levels. The classification boundaries are defined, for example, by the use of a register RMAX, corresponding to a maximum of events for the analyzed parameter, and in searching for the parameter values for RMAX/2. On both sides of the RMAX position, these values correspond to limit A and limit B of the classifier.

Hence, the RMAX register such as it is operated in the second embodiment of the classifier, is replaced here by the register NBPTS, corresponding to the total cumulative result of events (FIG. 13a). By removing a percentage k of NBPTS on both sides of the histogram, the limits A and B become more stable (FIG. 13b).

The device represented in FIG. 13c carries out this function.

In FIG. 13c, the analysis memory 100 and the command of the address multiplexer 105 are present. The analysis output register 104 operates as described above using the number of points NBPTS 1041 and, in general, the limit A 1042 and the limit B 1043 as well.

The learning register 117 receives the output data of the analysis memory 100 and supplies, via the register 301 fed by the adder 300, the inputs of two comparators 1151 and 1152, respectively, of the enabling calculator 115, which includes a memory 1153 storing the value k, percentage of the number of points to take into consideration.

A multiplier 1154 receives the number of points NBPTS on one of its inputs and the value k on the other, feeds, on one side, the second input of the comparator 1151 and, on the other side, one of the inputs of a subtracter 1155, which receives on its other input the number of points. The output of this subtracter 1155 feeds the second input of the comparator 1152.

The subtracter output 1155 supplies the limit A, the comparator output 1152 supplies the limit B and an operator "NON-AND" 1156 receiving on each of its inputs, respectively the value of the limit A and on the inverted input, the value of the limit B, supplies the output signal of the enabling calculator 115.

At the end of the histogram calculation, the register NBPTS is known and a signal MATRIX-END allows to know the value $\alpha=k$, NBPTS and a value $\beta=\text{NBPTS}-\alpha$.

In initializing to zero a cumulative function S, that is to say $S_o$=zero, the increment i of a counter connected to the address of the previously determined histogram memory allows to reach the contents of this memory and to supply the cumulative register $S_i$.

A first test includes assigning to limit A, the increment value i as long as $S_i$ is smaller than the previously defined $\alpha$ value.

A second test includes assigning to limit B, the increment value i as long as $S_i$ is smaller than the previously defined $\beta$ value.

Generally, the classifier may be achieved according to numerous embodiments, the essential being that it allows to place the parameter DATA(A) with respect to values or limits statistically determined over a set of former data DATA(A).

IX. The Memory 118 of the Classifier 101

Figure 16:
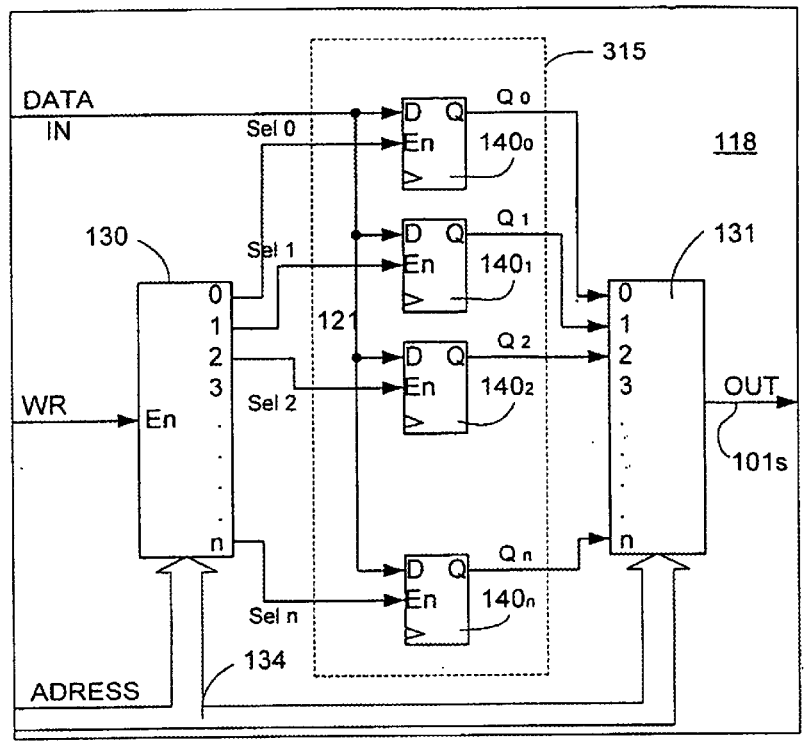
FIG. 16 is a diagram of the classifier memory according to one embodiment of the present invention.

FIG. 16 is a detailed representation of the memory 118 including an input demultiplexer with input enabling function 130 and an output multiplexer 131. The input multiplexer 130 receiving the writing signal WR is then capable of enabling the choice of the register of the memory 118, selected by the address command ADDRESS, for writing the binary value of the comparison DATA IN. The output multiplexer 131 addresses the value of a particular register, selected by the address command ADDRESS, on the output 101s of the memory 118 of the classifier.

The input demultiplexer 130 and the output multiplexer 131 are controlled via bus 134 originated from the anticipation multiplexer 108.

More precisely, the 1/n input demultiplexer 130, controlled by the address transmitted by the bus 134, sends the signal WR (WRITE), respectively in the form of the signals $Sel_0$, $Sel_1$, $Sel_2$, . . . , $Sel_n$ on the registers $140_0$, $140_1$, $140_2$, . . . , $140_n$ of order 0, 1, . . . n and determines which of its registers as addressee of the content of the information transmitted by the signal DATA IN. The information originating from these registers $140_0$, $140_1$, $140_2$, . . . , $140_n$ is sent to the multiplexer 131, which determines the output, OUT.

X. Anticipation

In a preferred embodiment, in addition to real time updating of classifier 101, the histogram processing unit 1 is configured to perform an anticipation function. Such anticipation of the self-adapting function of the classifier 101 improves the operation of this looped system and assimilates it to the operation of a biological system. The purpose of the anticipation is to anticipate the value contained in the memory 118 of the classifier 101 in order to speed up the processing and thereby to facilitate the tracing of an object or of its evolution.

To this end, the global variation of the histogram is calculated and the result is then used to apply the anticipation according to the following methods. In either case, the anticipation defines an anticipation function ($f_Aog_A$), linking the data DATA(A) and the value $(1015)_A$, characterizing the histogram calculation unit processing the parameter A.

A. Calculation of the Global Variation of the Histogram

Referring back to FIG. 4, the test unit 103 and the analysis output registers 104 generate a statistical value POSMOY whose values $POSMOY_0$ and $POSMOY_1$ for two successive frames are memorised. POSMOY is the value of a parameter, e.g., DATA(A), in relation to which, in a given frame, the parameter has a value greater than or equal to half the enabled points in the frame.

When the signal END is equal to 1, the new value $POSMOY_0$ is calculated and the previous value of $POSMOY_0$ is saved in $POSMOY_1$.

Figure 14:
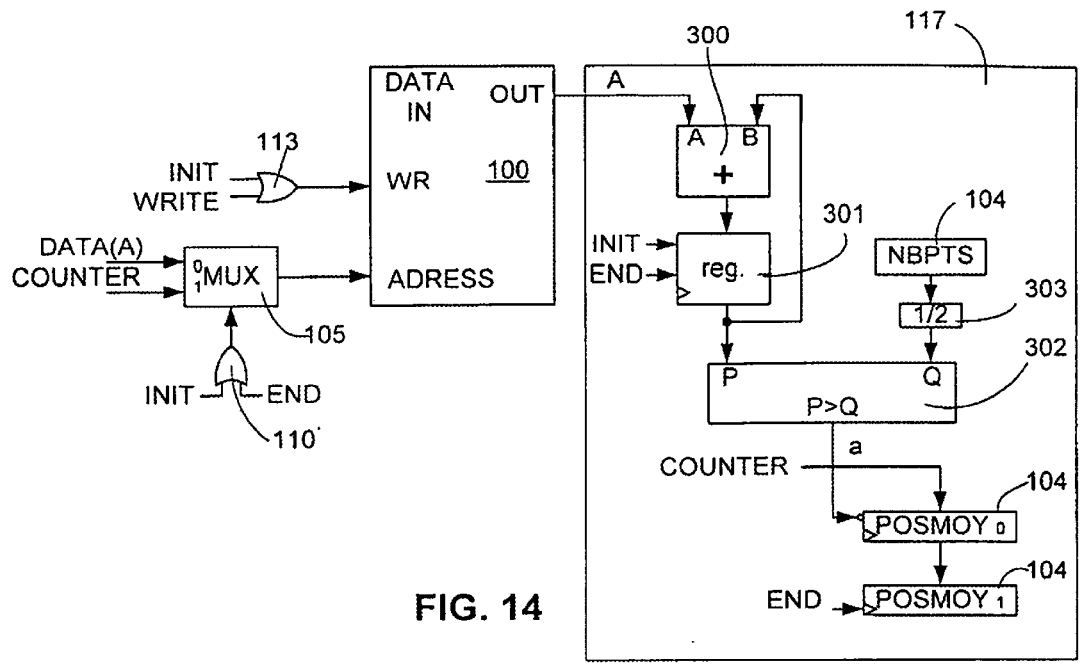
FIG. 14 is a representation of the elements of histogram calculation unit producing POSMOY values according to one embodiment of the present invention.

With reference to FIG. 14, the preparation of the variable $POSMOY_0$ will now be described. The variable $POSMOY_0$ is produced by a comparator 302, which on one of its inputs, Q, the parameter NBPTS from register 104 that is divided by two by the divider circuit 303. The second input P of comparator 302 receives the output of a register 301 that is controlled by the initialisation INIT and the end END signals, which receives as input the output of an adder 300. Adder 300 receives at one input, A, the output value of the register 301 and on its second input, B, the output value of the memory 100 that has been described previously. Thus, the register 301, reset initially, stores the cumulated content of the registers of the memory that are scanned by the signal COUNTER from zero to n. As long as this cumulated value is smaller than NBPTS/2, the value of the COUNTER is stored in $POSMOY_0$. At the end of the cycle END, $POSMOY_0$ therefore contains the last value COUNTER for which the cumulated value is smaller than NBPTS/2.

B. Application of the Histogram Variation to the Anticipation (First Method)

Figure 15:
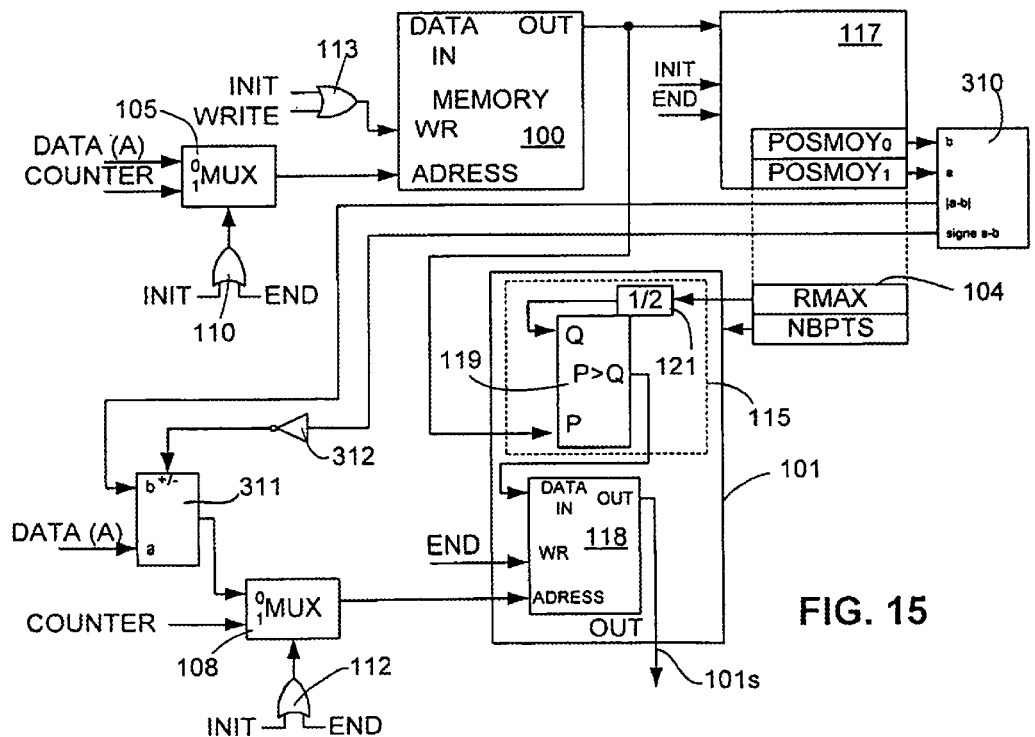
FIG. 15 is a diagram representing the elements of a self-adapting histogram calculation unit with anticipation according to a first embodiment.

FIG. 15 illustrates a circuit according to one embodiment that is configured to implement anticipation. The memory 118 is that described previously with reference to FIG. 16.

A calculation unit 310 with sign extraction capability supplies the values $|POSMOY_0$ minus $POSMOY_1|$ and the sign of this difference. These parameters control a translator 311 after reversal of the sign by the inverter 312. The value of the parameter supplying the memory 118 is thus offset by the value $|POSMOY_0$ minus $POSMOY_1|$ with respect to the passive operation, in the direction opposite the POSMOY variation calculated in the unit 310.

Figure 15A:
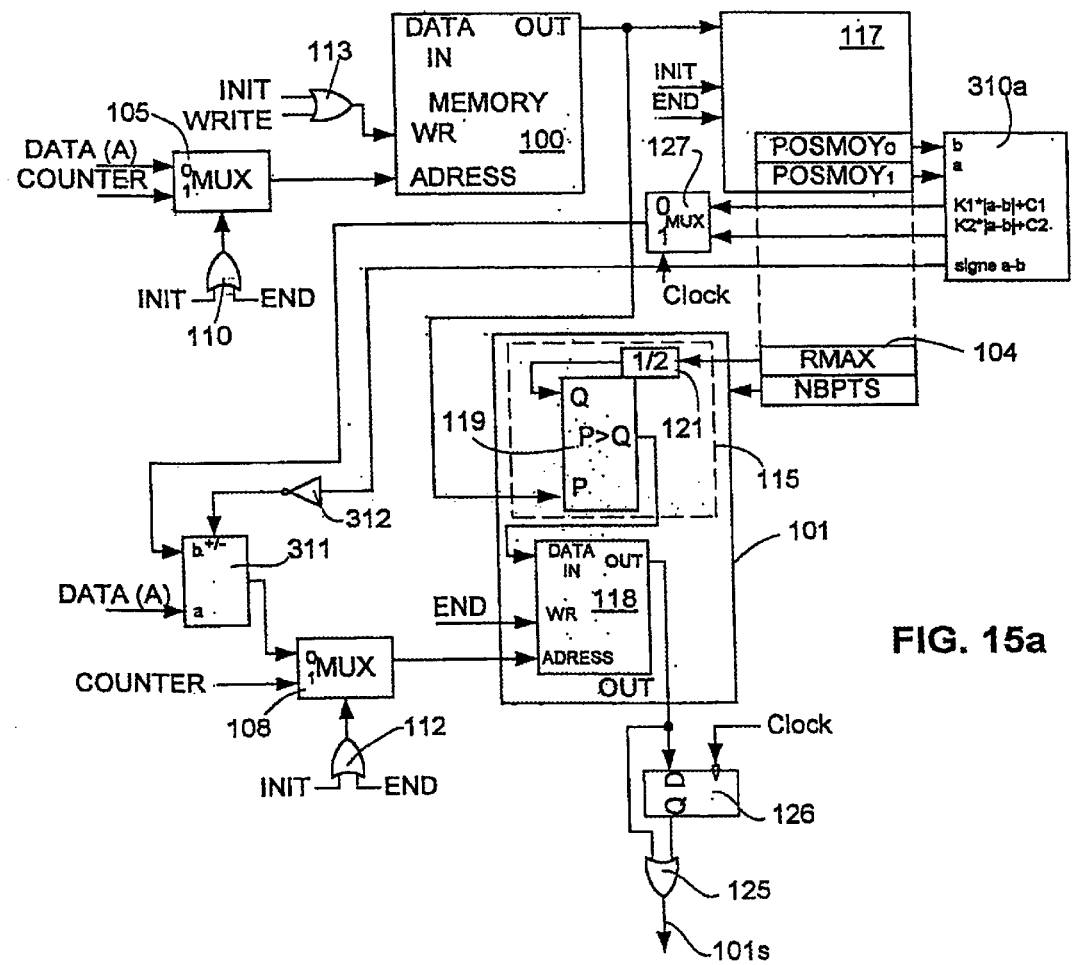
FIG. 15a is a diagram representing the elements of a self-adapting histogram calculation unit with anticipation according to an alternate embodiment.

FIG. 15a illustrates a circuit according to an alternate embodiment that is configured to implement anticipation. In this embodiment, calculation unit 310a is similar to calculation unit 310, but with improved performance by providing different functionality with respect to the offset of the value of the parameter supplying memory 118. Calculation unit 310 of FIG. 15 provides an offset determined by a function of the form y=x, where x is $|POSMOY_0$ minus $POSMOY_1|(P0-P1)$. Calculation unit 310 or $310_a$ of FIG. 15 can provide for an offset determined by functions of the form y=ax+b, where a (e.g., k1 and k2) and b (e.g., c1 and c2) are adjustable constants provided, for example, by an on-chip controller. It will, of course, be apparent that any other function of the POSMOY values can be used as desired, such as $y=ax^2$. In one embodiment, for example, a multiplexer unit can be implemented to receive as input to the two functions of POSMOY, namely k1*|P0−P1|+c1 and k2*|P0−P1|+c2, and provides one as output based on the value of the control signal "Clock" to control translator 311.

To further increase the range of classification, OR circuit 125 and delay circuit 126 are optionally provided. Delay circuit is controlled by the same signal, "Clock", that controls multiplexer 127. The output values from memory 118 related to the two different offset functions are then provided to OR gate 125, the output of which is signal 102s with an improved classification range, and therefore improved anticipation characteristics.

C. Application of the Histogram Variation to the Anticipation (Second Method)

Figure 17:
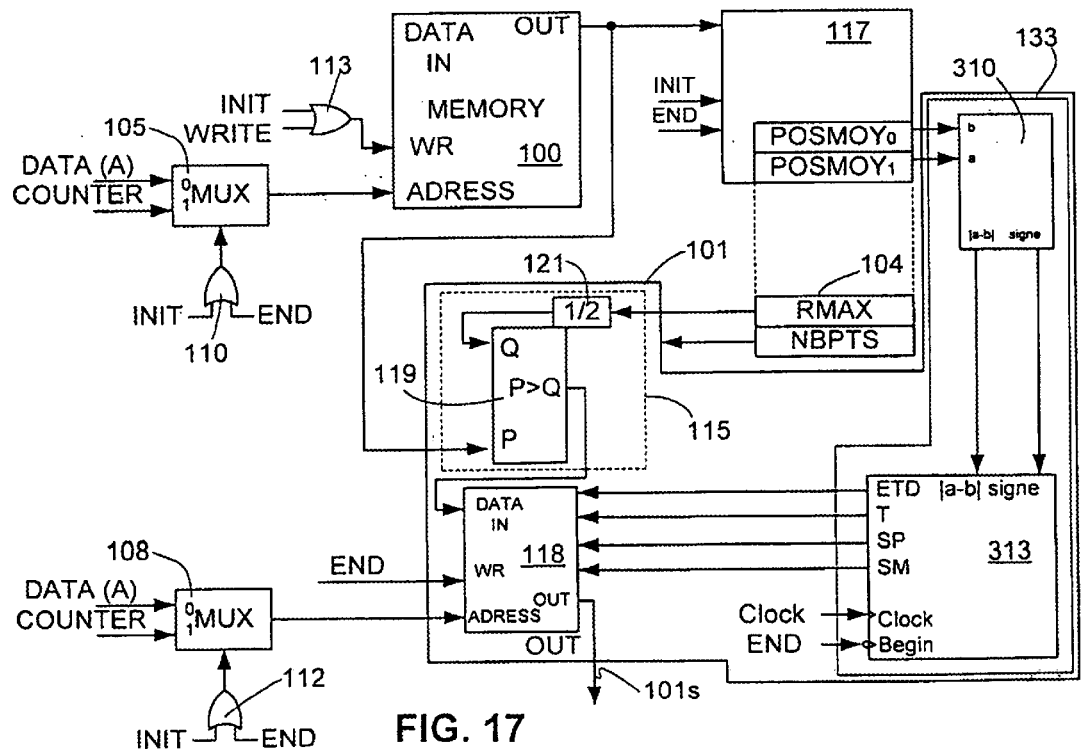
FIG. 17 is a diagram representing the elements of the self-adapting histogram calculation unit with anticipation according to a alternate embodiment.
Figure 18:
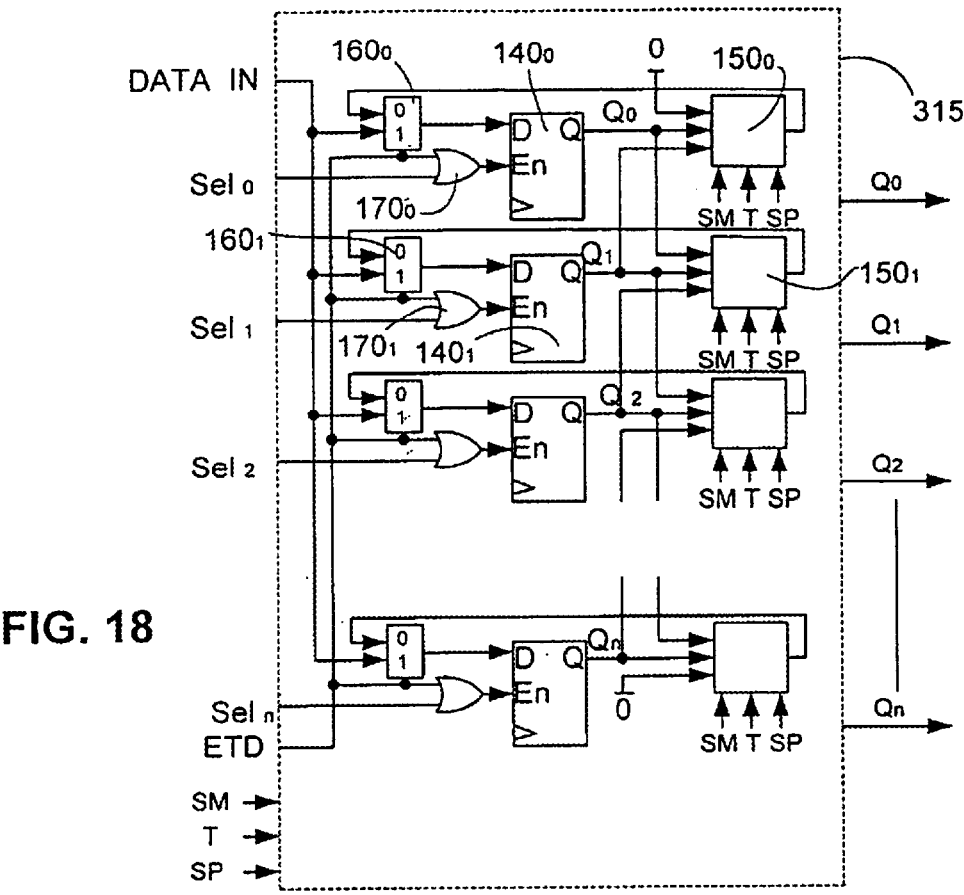
FIG. 18 is a detailed representation of the classifier memory with a bit-operated elementary calculation automaton according to one embodiment of the present invention.

FIG. 17 illustrates a circuit that is configured to implement anticipation according to another embodiment. The memory 118 is represented in FIG. 18.

The general architecture of the memory 118 has been described above. A sequence for a given bit will now be described, wherein the sequence for the other bits are analogous. The elements common to FIG. 16 bear the same reference numbers.

The register $140_1$ is associated with an input multiplexer $160_1$ that receives on one of its inputs, the binary signal (DATA IN) output from the comparator 119 and on its other input, the output signal of the anticipation calculation unit $150_1$. The input multiplexer $160_1$ is controlled by the signal ETD that also controls the writing. The writing command of the register $140_1$ is connected to an OR gate $170_1$ that receives, on one of its inputs, the signal ETD and on the other, a signal $Sel_1$.

At the output of the register $140_1$, an anticipation calculation unit $150_1$ receives as input the three output signals $Q_0$, $Q_1$ and $Q_2$, from the registers $140_0$, $140_1$, $140_2$ of order, respectively, 0, 1, 2. Unit $150_1$ is commanded by the signals SM, SP and T. In the units $150_0$, $150_1$, . . . $150_n$, anticipation is performed by the succession of expansion operations followed by erosion operations.

Figure 19:
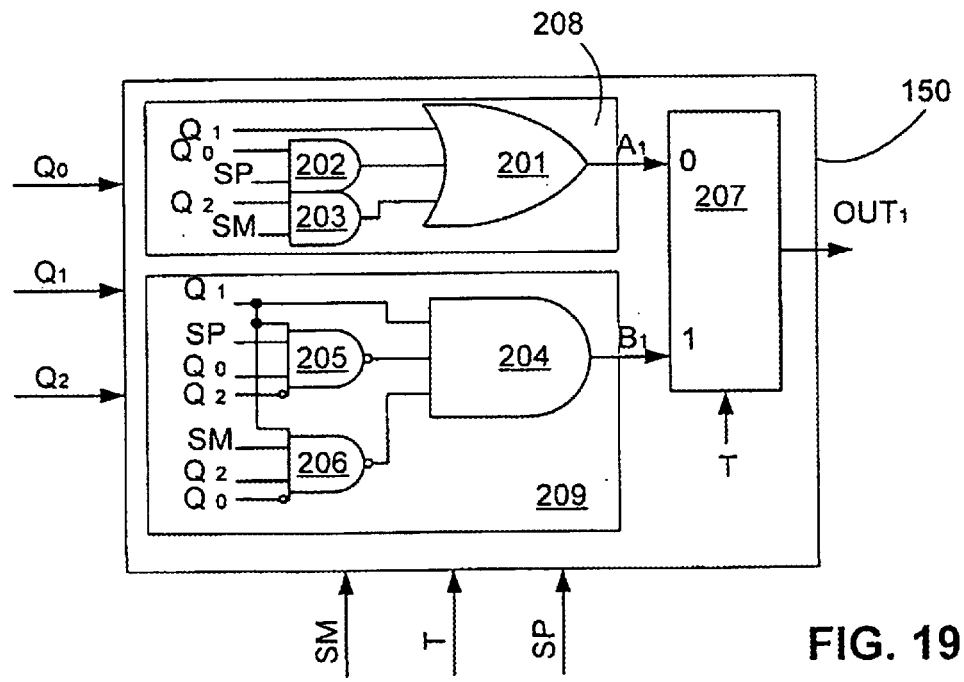
FIG. 19 is a representation of an elementary anticipation calculation automaton according to one embodiment of the present invention.

An anticipation calculation unit 150 is described in detail on FIG. 19. In one embodiment, unit 150 comprises a multiplexer 207 including one output and two inputs and is controlled by the signal T. One of the inputs of multiplexer 207 is connected to an expansion operator circuit 208, which supplies a signal $A_1$, and the other input is connected to an erosion operator circuit 209, which supplies a signal $B_1$.

The expansion operator circuit 208 comprises a three-input and one-output circuit 201, which in one embodiment is an OR gate, whose output is connected to the multiplexer 207. The first input of circuit 201 is supplied by the signal $Q_1$, the second input is supplied by the output from a two-input AND circuit 202, one of whose inputs is the signal $Q_0$ and the other input is the signal SP. The third input of the circuit 201 is supplied by the output of a two-input AND circuit 203, one of whose inputs is the signal $Q_2$ and the other the signal SM. The function fulfilled by the expansion operator 208 in this embodiment is thus:

$$A_1 = Q_1 + Q_0 \times SP + Q_2 \times SM.$$

The erosion operator circuit 209 comprises a three-input and one-output circuit 204, which in one embodiment is an AND gate. The output is connected to the multiplexer 207. The first input of circuit 204 is supplied by the signal $Q_1$, and the second input is connected to a four-input and one-output circuit NOT-AND circuit 205. The first input of NOT-AND circuit 205 is connected to the signal SP, the second to the signal $Q_1$, the third input is connected to the signal $Q_0$, and the fourth input is connected to the inverse of the signal $Q_2$. A second NOT-AND circuit 206 has four inputs and an output connected to the third input of the AND circuit 204, wherein the first of these inputs is supplied by the signal $Q_1$, the second by the signal SM, the third by the signal $Q_2$ and the fourth by the inverse of signal $Q_0$. The function fulfilled by the erosion operator 209 in this embodiment is thus:

$$B_1 = Q_1 \times \overline{(SM \times Q_2 \times \overline{Q_0})} \times \overline{(SP \times Q_2 \times Q_0)}$$

Figure 20:
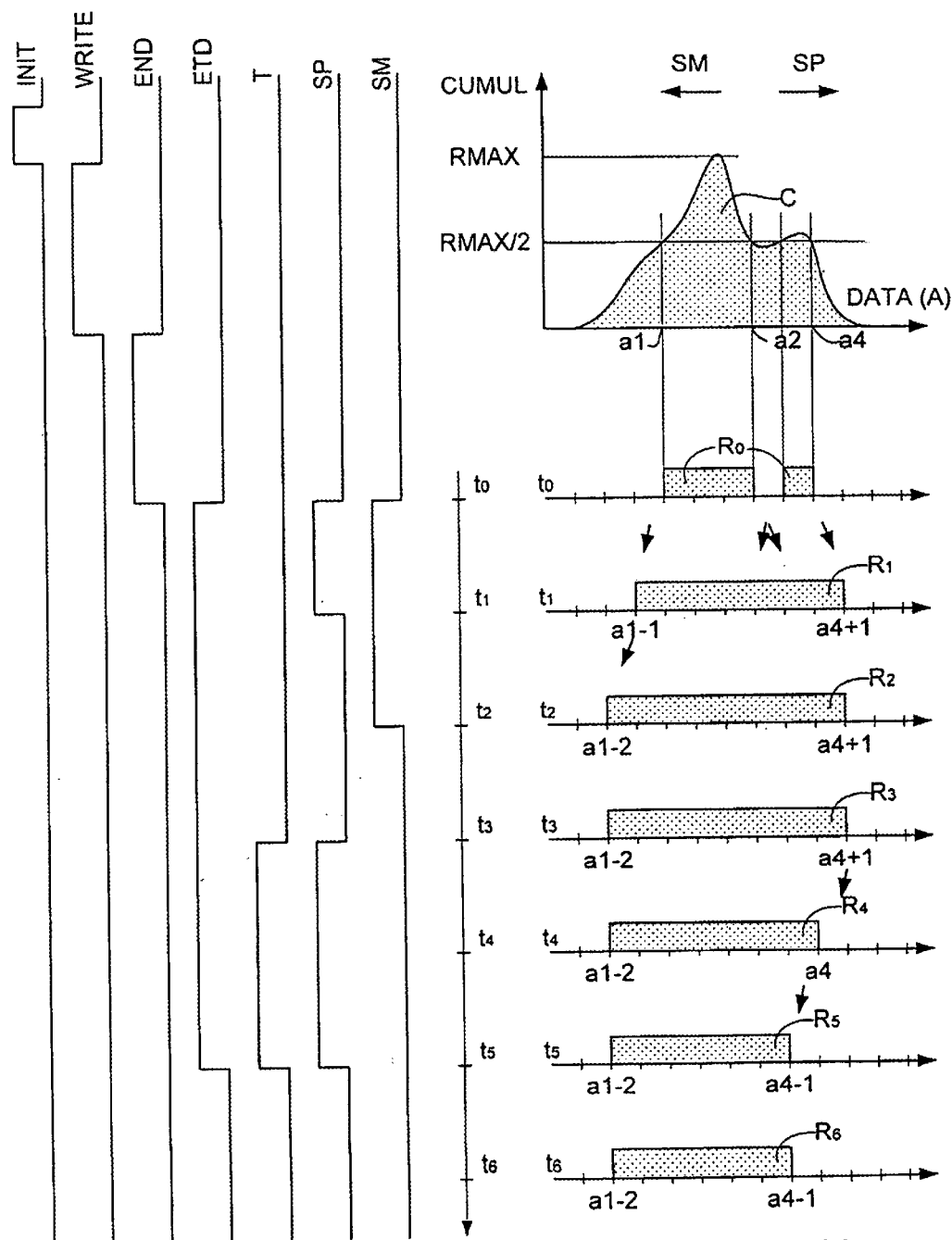
FIG. 20 is a schematic representation of the anticipation process according to one embodiment of the present invention.

An example of the anticipation operation is illustrated on FIG. 20. In this Figure, on the left with reference to the time axis t, are represented the signals INIT, WRITE, END, ETD, T, SP, SM. The signal INIT, generated by the sequencer 9, starts the processing cycle of a frame. Throughout its duration, all the memories and registers are initialised. The signal WRITE, also generated by the sequencer 9, follows the signal INIT and controls the statistical calculations for the frame considered whose data is represented by the curve C, whose axes represent in abscissa the values of the parameter and in ordinate the number of occurrences. The test unit 103 looks for the maximum number of occurrences RMAX.

Figure 11:
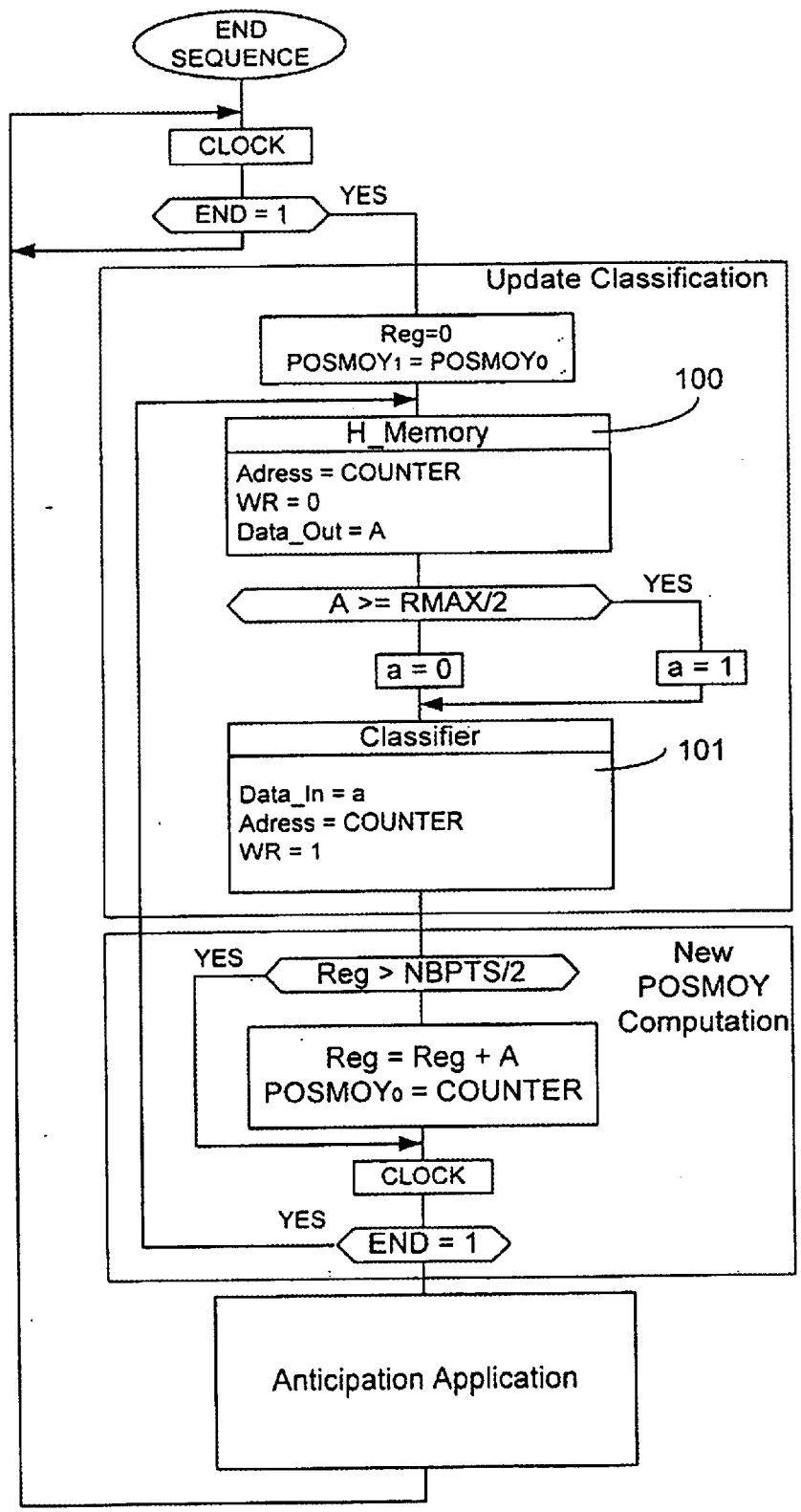
FIG. 11 is a flow chart of processing end (use of the command 'END')

At the end of the signal WRITE, the signal END, generated by the sequencer 9, enables the update of the memory of the classifier 118. The new data is generated by the comparator 119. FIG. 11 illustrates a flow chart of software for updating the classifier memory according to one embodiment.

At the end of the signal END at the time $t_0$, the content of the memory 118 is represented by the distribution $R_0$. The end of the signal END starts the signal ETD whose duration is determined by the command generator 313. This signal ETD enables the calculation of the range in the memory 118 of the classifier.

The signals SP (Plus-direction) and SM (Minus-direction) comprised in RTD control, respectively, the processing in the positive direction (SP=1) and in the negative direction (SM=1) of the range of the distribution $R_0$ that becomes $R_1$ at $t_1$, $R_2$ at $t_2$ and $R_3$ at $t_3$, etc. Thus, the respective durations of SP and SM determine the range of the position of the distribution $R_5$ at the end of the signal ETD.

The multiplexer 207, which is controlled by the command T, has two inputs which are supplied respectively by the outputs of the expansion and erosion operators, and one output. Multiplexer 207 enables implementation of either of these operators in relation to the command T. The output of the multiplexer 207 is $OUT_1$:

$$OUT_1 = A_1 \times \bar{T} + B_1 \times T$$

Figure 21:
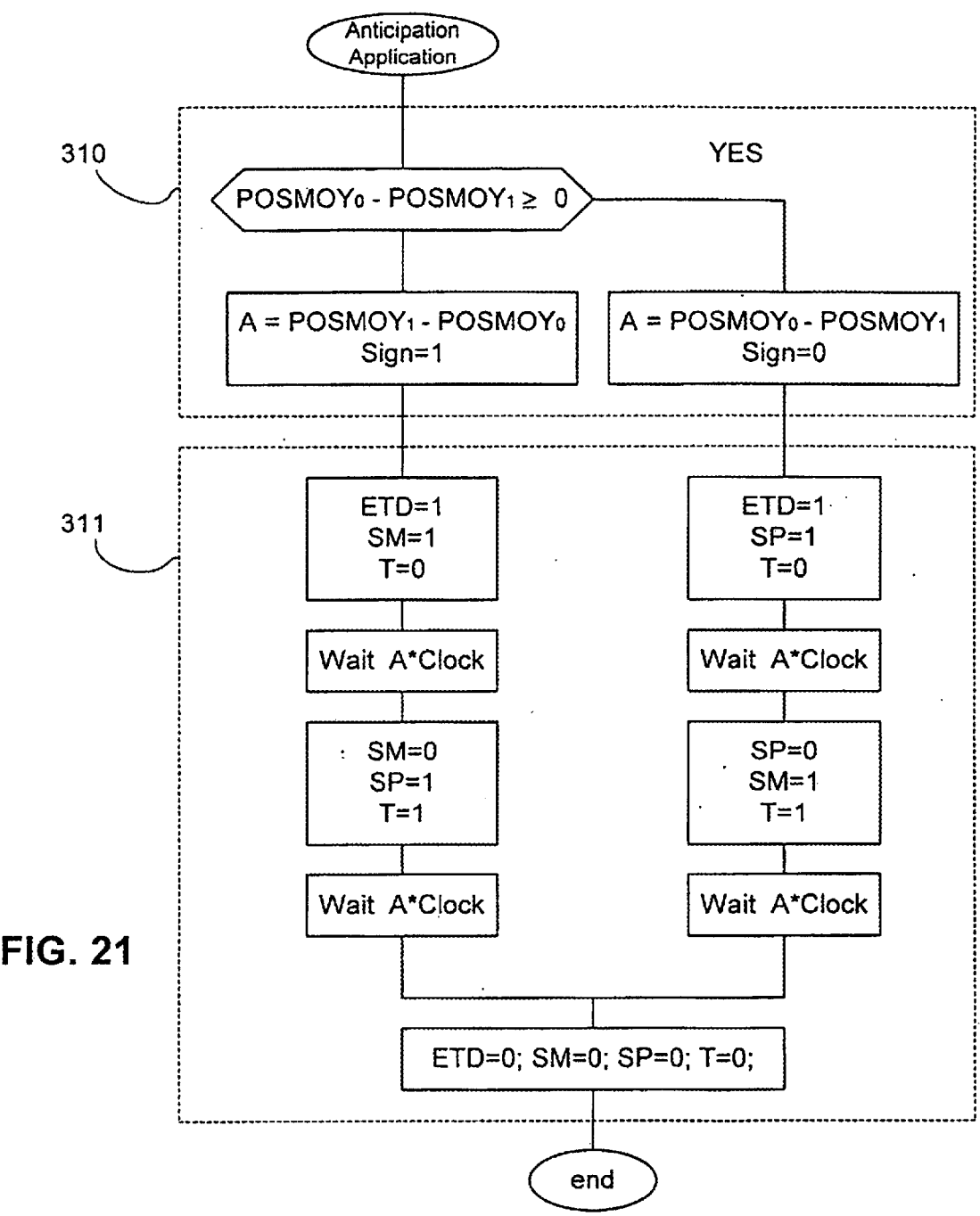
FIG. 21 is the flow chart of the anticipation implementation software according to one embodiment of the present invention.

FIG. 21 illustrates a flow chart for anticipation implementation software according to one embodiment of the invention.

XI. Time Coincidences

In a simplified embodiment described until now, the time coincidences block 102 comprises a single register contained a single time coincidences value making up the time coincidences criterion R.

A. Complex Time Coincidences Criteria

In a preferred embodiment, the time coincidences block is a memory that may contain several values forming together the time coincidences criterion R, any of which is capable of enabling the information carried by a pixel. Each of these values is stored in memory in its product term register 410 as shown in FIG. 22.

Figure 22:
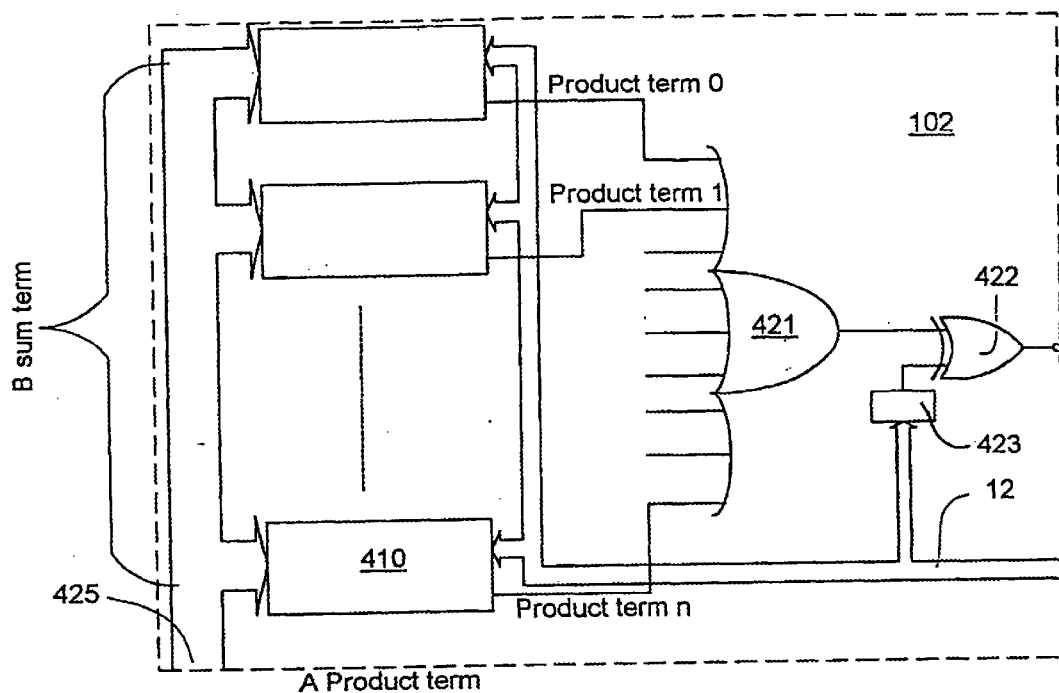
FIG. 22 is a representation of the time coincidences unit according to one embodiment of the present invention.

FIG. 22 represents a time coincidences block 102 according to one embodiment of the present invention, which includes a plurality of product terms registers 410 supplied by the bus 425 A 'PRODUCT TERM' and controlled by the bus Program Register 424.

Each of these product term registers 410 has one output that supplies an OR circuit 421 that provides as output a signal fed into one of the inputs of a controlled inverter 422. Inverter 422 receives on its second input the signals from the bus Program Register 424 via the register 423.

Figure 23:
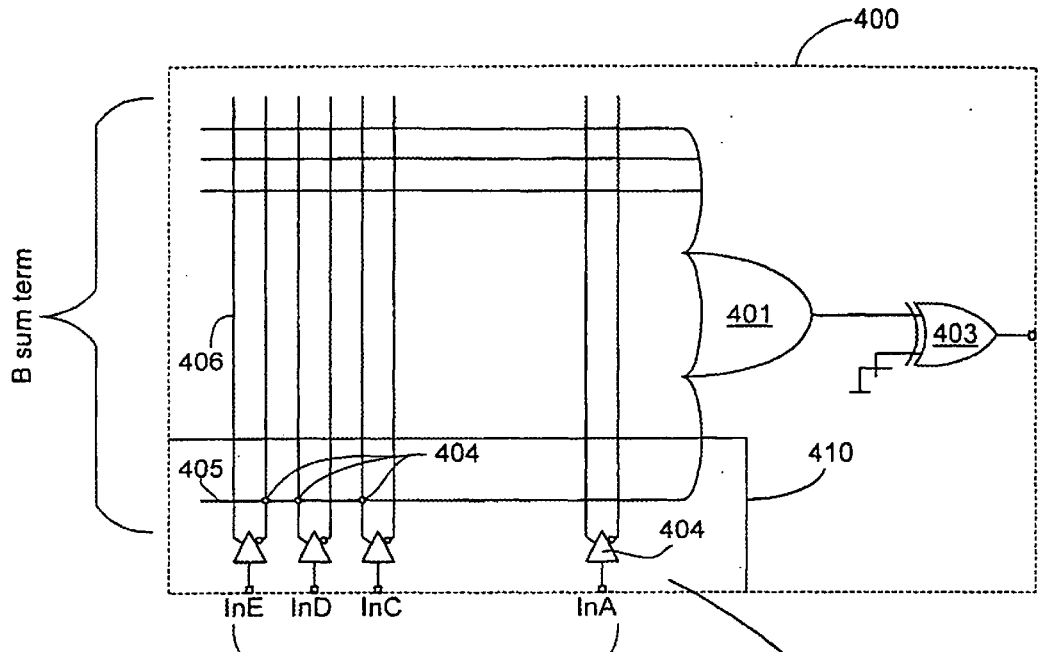
FIG. 23 is a flow chart representation of a field programmable gate array (FPGA) used as a time coincidences unit according to one embodiment of the present invention.
Figure 24:
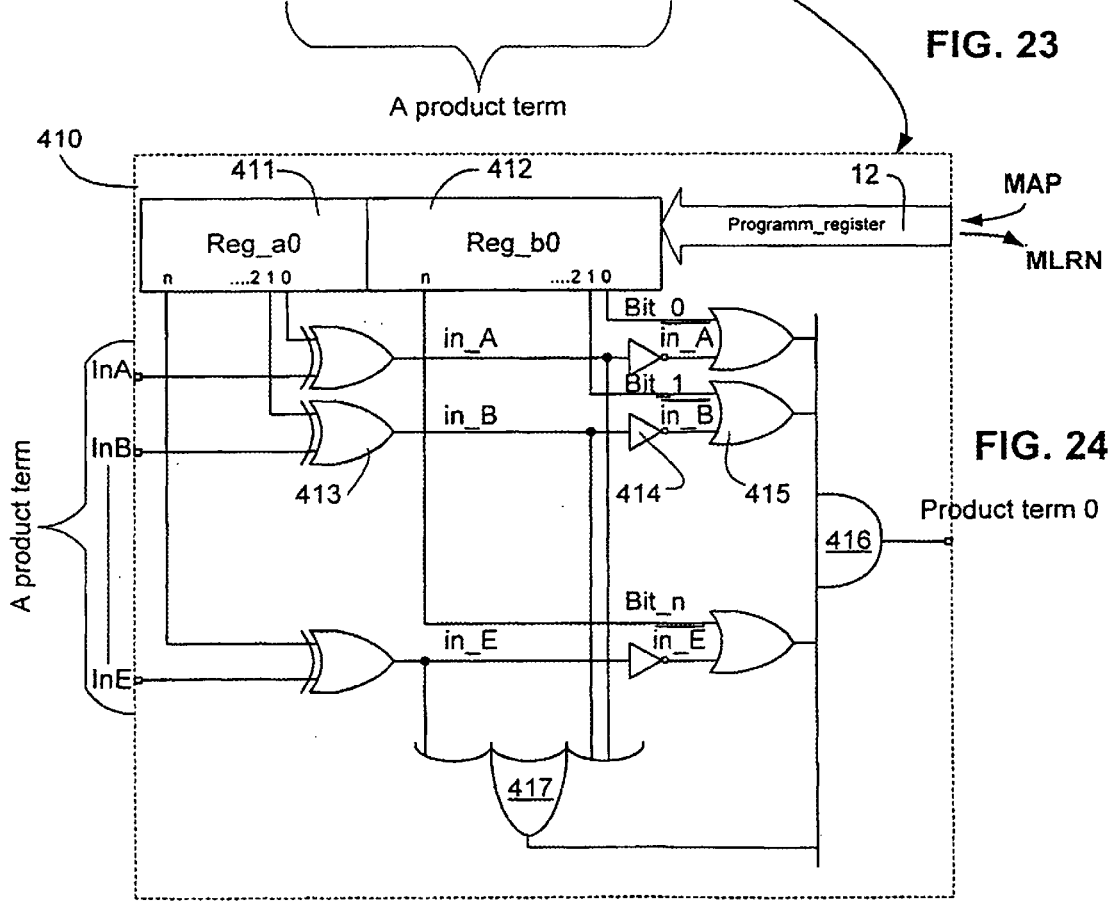
FIG. 24 is the register-based representation, limited to one row of the system, of FIG. 23.

FIGS. 23 and 24 illustrate time coincidences block 102 implemented in a Field Programmable Gate Area (FPGA) 400.

Such a memory comprises a controlled inverter 403 whose output is the output of the Field Programmable Gate Area 400 and one of whose inputs is connected to an output of an OR circuit 401. The inputs of Or circuit 401 are connected to the B lines 405, wherein these lines intersect the A columns 406 that are connected to amplifiers 402 supplying signals s and f.

The intersections 404 of the lines 405 and of the columns 406 are programmable connections enabling to determine the whole operation of the Field Programmable Gate Area 400.

FIG. 24 represents a single line 410 of such a Field Programmable Gate Area 400. Such a line 410 comprises registers 411 and 412 for receiving programming variables Reg-a0 and Reg-b0. This line 410 can be broken down into A elementary function blocks each of which comprises a controlled inverter 413, an OR circuit 415 and an inverter 414. One of the inputs of the controlled inverter 413 is connected to the corresponding input A and the other input to the corresponding bit i of the register Reg-a0, where i=0 to the number of columns.

The output of controlled inverter 413 is connected to the input of the inverter 414 that supplies, through its output, one of the inputs of the OR circuit 415. The other input of OR circuit 415 is supplied by the corresponding bit i of the register Reg-b0 as shown. The output of the controlled inverter 413 also supplies one of the inputs of an n+1 input OR circuit 417 that receives, additionally, all the corresponding signals produced by the remaining inverters 413 as shown.

An n+2 input AND circuit 416 whose output is product term 0 receives as one input the output of the OR circuit 417 and the outputs of the different elementary functions as the remaining inputs.

B. The Learning Mode

The time coincidences block 102 in one embodiment is externally programmed by an instruction given by an application management interface (API). This API loads the registers 411 and 412 of FIG. 24 as will be discussed below.

In a preferred embodiment, the histogram calculation unit 1, in addition to being configurable for updating the classifier and for anticipation, is configured for implementing a learning function.

Figure 25:
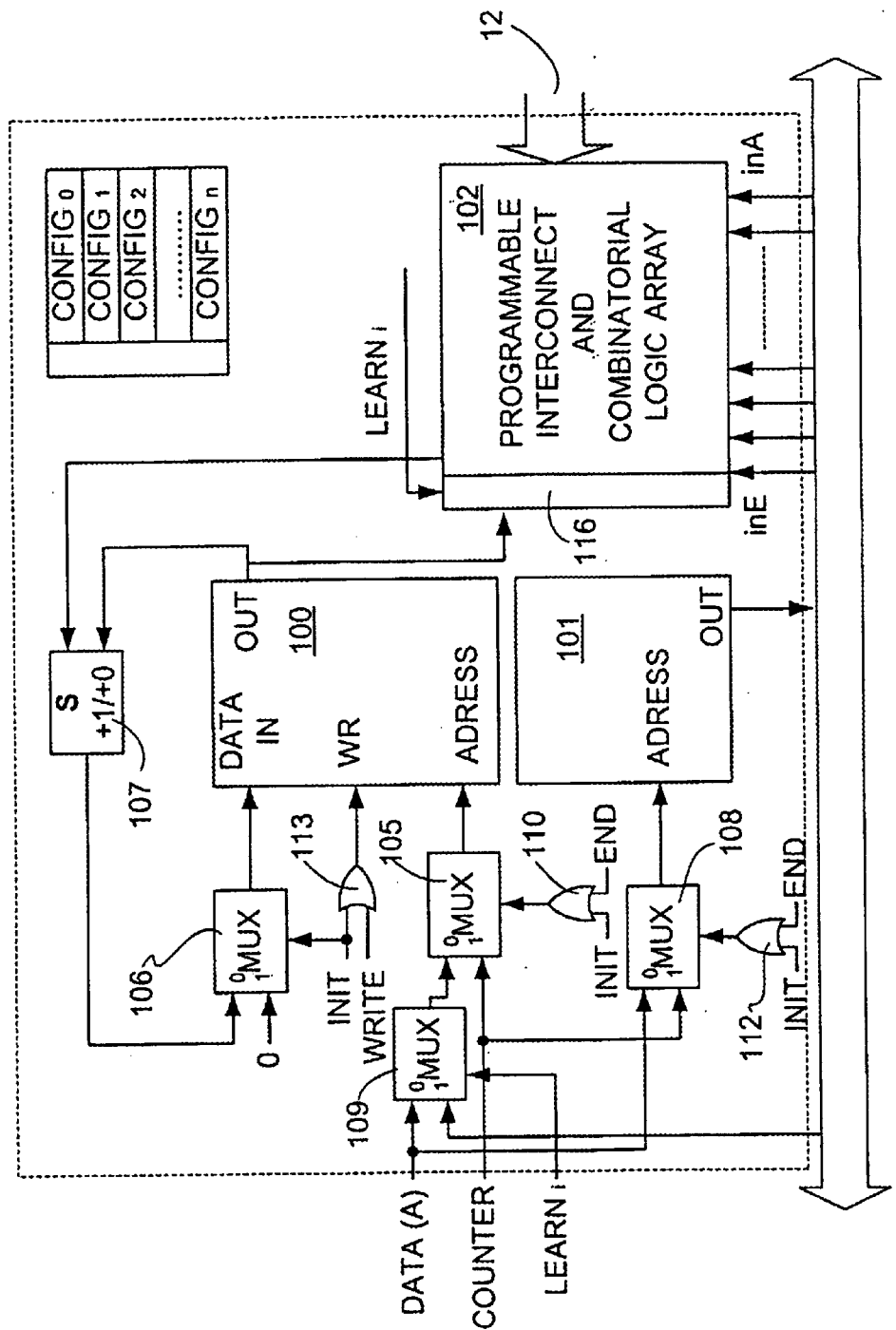
FIG. 25 is a representation of the elements of a histogram calculation unit with a learning functionality according to one embodiment of the present invention.

In one embodiment as shown in FIG. 25, the histogram calculation unit 1 comprises a learning multiplexer 109, which in one mode enables automatic programming of the time coincidences unit 102. The learning multiplexer 109 selects either of both possible operating modes (processing and learning). In the processing mode, the values contained in the register of the time coincidences unit 102 are set, and conversely, in the learning mode, these values are updated.

The Processing Mode

When operating in the processing mode, the learning multiplexer 109 transmits, on its output, a signal indicating that the values contained in the registers of the time coincidences block 102 are not modified during the operating sequence in processing mode. The values stored in these registers have therefore been selected and stored by the user, or they may have resulted from a previous learning phase as will be discussed below.

The time coincidences unit 102 also receives, from the other histogram calculation units co-operating with that described herewith, comparable signals inE . . . inA.

Fulfilling its role already described above, this time coincidences unit compares the values thus received to the values stored in its register(s) and outputs a signal 102s equal to 1 in case of coincidence and equal to zero in the reverse case. This enabling signal is sent to the incrementation enabling unit 107 and when its value is equal to 1, authorises taking into account the value of the parameter DATA(A) of the pixel affected in the analysis memory 100 and, conversely, when the value of the enabling signal is zero, processing proceeds to the following next.

The Learning Mode

Figure 5:
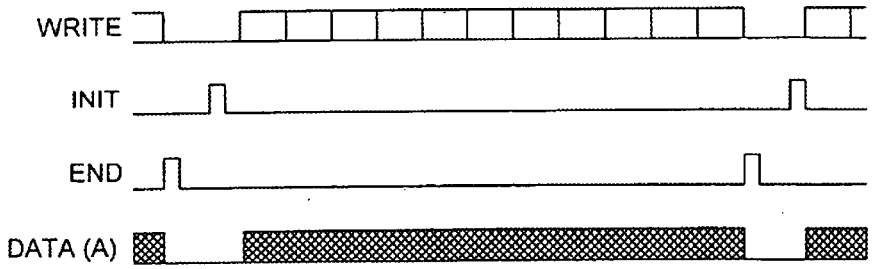
FIG. 5 is a diagram representing signals processed by the calculation unit of FIG. 4.

The operation of the histogram calculation unit is controlled by signals represented on FIG. 5, i.e. an initialisation signal (INIT), a writing signal (WRITE), that carry the information corresponding to each pixel in the frame (or the image) and an end signal END.

In the learning mode, the learning multiplexer 109 outputs the value of the time coincidences signal that is then used instead of DATA(A). In the learning mode of an i-order histogram calculation unit, a signal LEARN enables throughout a frame sequence the processing in the learning mode.

During this sequence, the learning registers 116 are updated. Simultaneously, the time coincidences block 102 ensures transparency of the signals, enabling the DATA(A), (equal to the time coincidences signal 111) as soon as at least one of the inputs inA, . . . , inE is active (=1).

At the end of the signal WRITE, the histogram memory 100 represents the distribution of the time coincidences signal. The test unit 103 then generates a classification of the occurrences by decreasing value equal in number to B 'SUM TERM'.

During the signal END, the values of the time coincidences signal thus selected are written into the registers 411 and 412 of each block 410 in the time coincidences block 102 (see FIG. 24). The register 412 corresponds to the value of the time coincidences signal and the register 411 corresponds to its complement. In practice, two outputs of the same register can be used, supplying both these values. Thus, automatic statistical elaboration of the key-parameters is performed in the frame studied.

The flow charts of the various software packages necessary to fulfil the self-adapting, anticipation and learning functions represented in FIGS. 6–11, 21 and 23 are self-explanatory and do not call for any digression to be understood by one skilled in the art. When, internally, these Figures refer to variables, the variables have been represented within a box. For certain functions that are realised in a particular component described herein, the numeric reference of this component has also been allocated to the function.

XII. The Spatial and Temporal Processing Unit

With reference to patent application WO-98/05002, already mentioned above, the spatial processing unit 6 preferably outputs various signals including, for example, the signals F, SR, V, VL, DI, and CO, each associated with each pixel in a synchronous fashion. These are preferably digital signals. The complex signal F comprises a number of output signals generated by the system preferably including signals outlining the presence and the location of a zone or a moving object, V is the velocity of the oriented direction of the displacement DI of each pixel in the image. Also, preferably, an output of the system includes the input digital video signal which is delayed (SR) in order to synchronise it with the output ZH of the frame, while taking into account the calculation time of the compound data signal F (for a frame). The delayed signal SR is used, for example, to represent the image received by the camera on a monitor or a television screen that may also be employed to represent the information contained in the compound signal ZH. The compound signal ZH can also be transmitted to a separate processing unit 10a for further processing.

XIII. Spatial Processing: Choice of Axes

The position of a pixel in space is represented with respect to a system of axes. According to the shape, the orientation, etc. of the objects in the scene, certain systems of axes supply better results than others.

Figure 26:
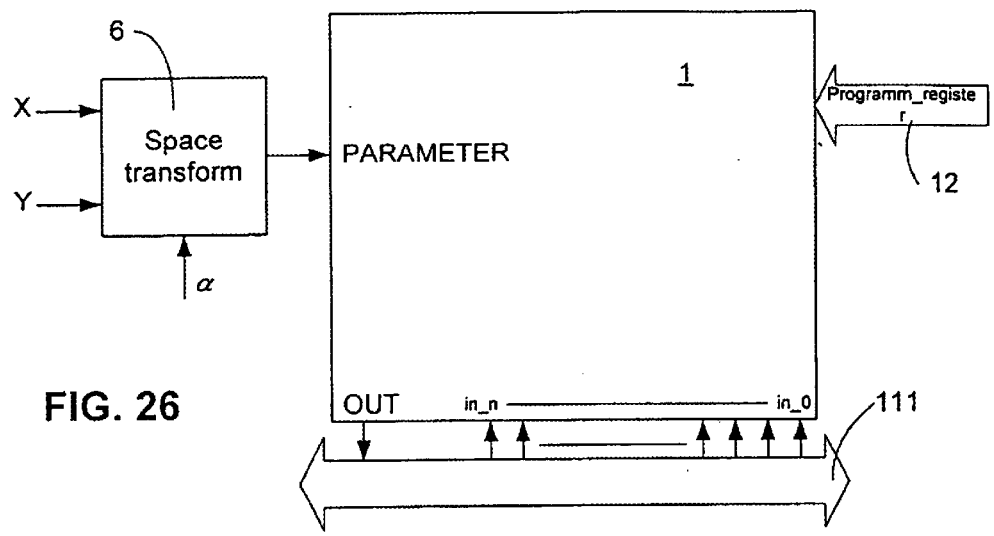
FIG. 26 is a schematic representation of axis selection circuitry according to one embodiment of the present invention.
Figure 27:
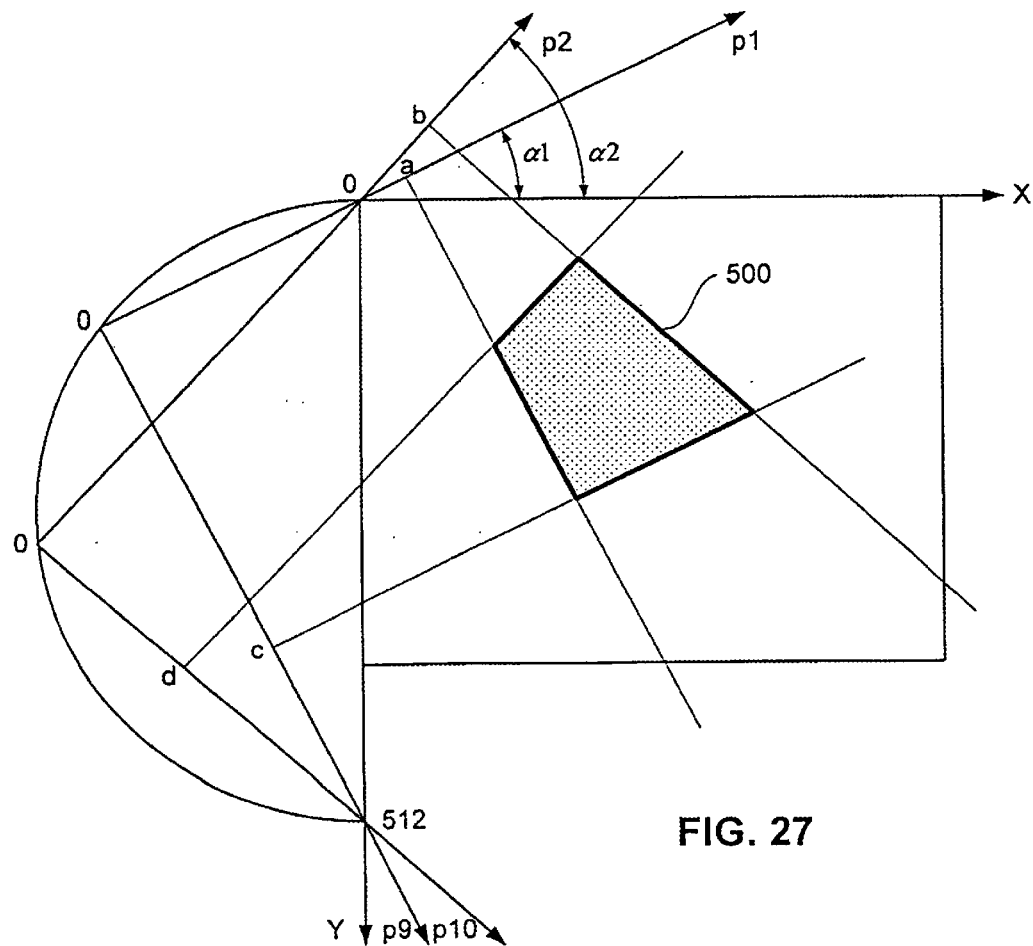
FIG. 27 illustrates various axes selectable by the circuitry of FIG. 26.

FIGS. 26 and 27 illustrate the procedure for choosing axes enabling to obtain optimised histograms, i.e. exhibiting a clearly defined maximum value. FIG. 26 is a schematic representation of axis selection circuitry according to one embodiment of the present invention, and FIG. 27 illustrates various axes selectable by the circuitry of FIG. 26.

The Space transform unit 60 receives as input the spatial data x and y that may be either Cartesian or polar data. This Space transform unit is controlled by a signal $\alpha$ and, for each value of $\alpha$, outputs a parameter that feeds a histogram constitution unit according to the invention.

The program controlling this histogram calculation unit launched by the Program Register 424 enables selection of the value $\alpha$ so as to produce an optimised histogram.

Such a method for selecting the appropriate axes has been described in detail in the application PCT WO-98/05002 (see FIG. 11 and the corresponding description, here the 'Space Transform' unit is referred to as 37), the entire contents of which are hereby incorporated by reference for all purposes.

XIV. Temporal Processing

The colorimetric processing of the values given by the tone (hue), saturation and luminance signals, as well as the velocity, direction and intensity signals can be added a spatial filtering function that produces a spatial resolution parameter (the Gabor method) and a binocular function that, via a distance calculation automaton, supplies a depth parameter.

Complete applications can be realized while processing, in whole or in part, these various parameters.

XV. Visualization of the Statistical Curve

Figure 8:
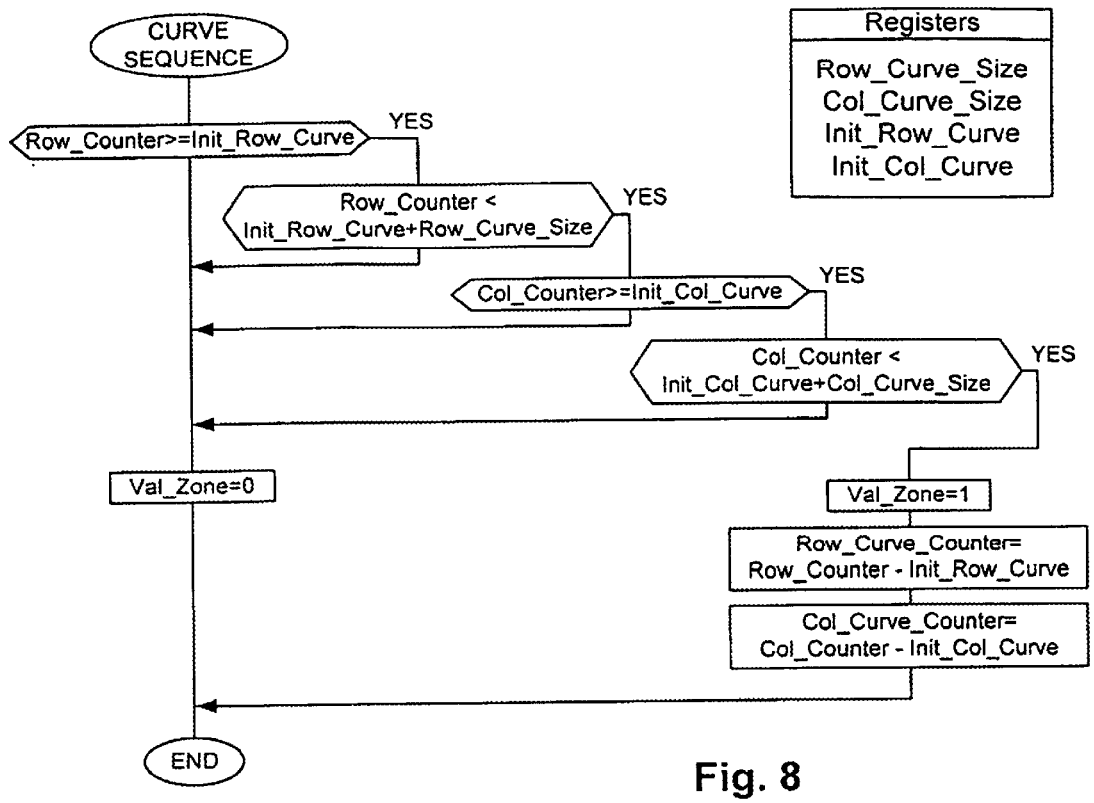
FIG. 8 is the flow chart of the insertion software of the curve zone.
Figure 28:
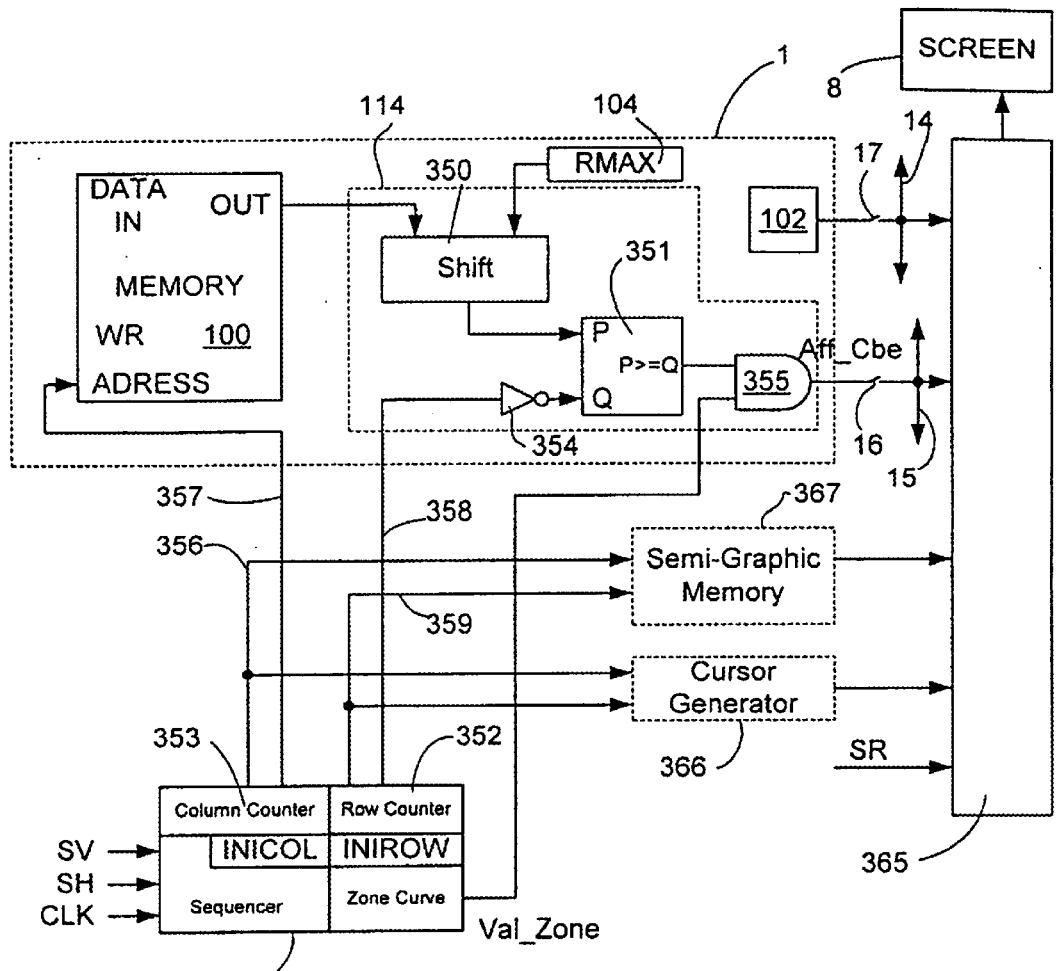
FIG. 28 is a schematic representation of a statistical visualization device according to one embodiment of the present invention.
Figure 29:
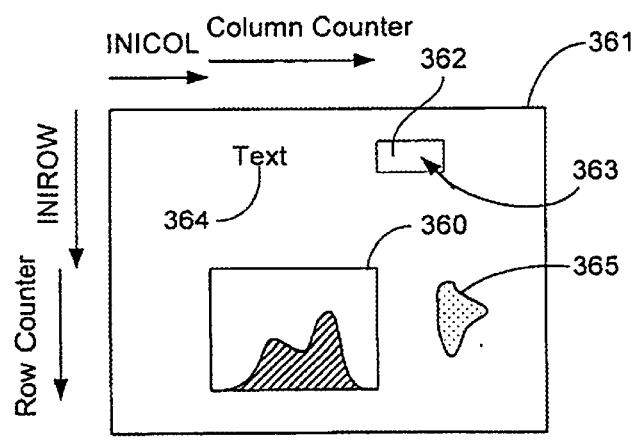
FIG. 29 is an example of the result obtained using the visualization produced by the device of FIG. 28.

FIGS. 28 and 29 describe more precisely the means for visualising the histogram curve. FIG. 28 is a schematic representation of a statistical visualisation device according to one embodiment of the present invention, and FIG. 29 is an example of a result obtained using the visualisation produced by the device of FIG. 28. FIG. 8 is a flow chart for generating curves and producing overlays according to one embodiment of the present invention.

According to a preferred embodiment, a curve generator 114 enables on screen-overlay of a curve of the values DATA for the frame processed previously. Similarly, a screen overlay of the time coincidences signal is possible. These overlays are sent respectively by the lines 14 and 15 to a screen 8. Switches 16 and 17 enable selection of a particular histogram calculation unit from among the various histogram processing units. It will be apparent that two or more overlays for different histogram calculation units and/or different parameters can be simultaneously displayed on screen 8.

The memory 100 addressed by the value of the column counter 353 feeds one input of a shift register 350 whose other input is supplied by the parameter RMAX generated by the analysis register 104. The output of shift register 350 supplies one input of a comparator 351 whose other input is fed by a row counter 352 via an inverter 354. An AND circuit 355 receives the result of the comparison $P \geqq Q$ as one input, the variable Val_Zone as the other input, and supplies as output the variable Aff_Cbe.

The column counter 353, which generates the variables 'Col_Counter' 356 and 'Col_Curve_Counter' 357, the row counter 352, which generates the variables 'Row_Curve_Counter' 358 and 'Row_Counter' 359, and the generator of the variable Val_Zone constitute a sub-assembly 91 of the sequencer 9.

Moreover, the visualisation control block 365 of the screen 8 receives the delayed video signal SR, a cursor command produced by the cursor block 366, and a command produced by the semi-graphic memory 367.

The FIG. 29 is the result of the stamp obtained 360 and enabled by the switch 16 that transfers the curve validation signal to the overlay command 15 n the screen 361 that comprises moreover a command box 362, a cursor 363 and a text box 364.

Thus, this screen and the associated mouse constitute a graphic user interface (GUI) enabling the user to generate and to command the application.

Similarly, the time coincidences function can be visualised, dynamically, in the form of pixels 368, by actuating the switch 17 on the time coincidences overlay command 14.

XVI. Applications

Figure 30:
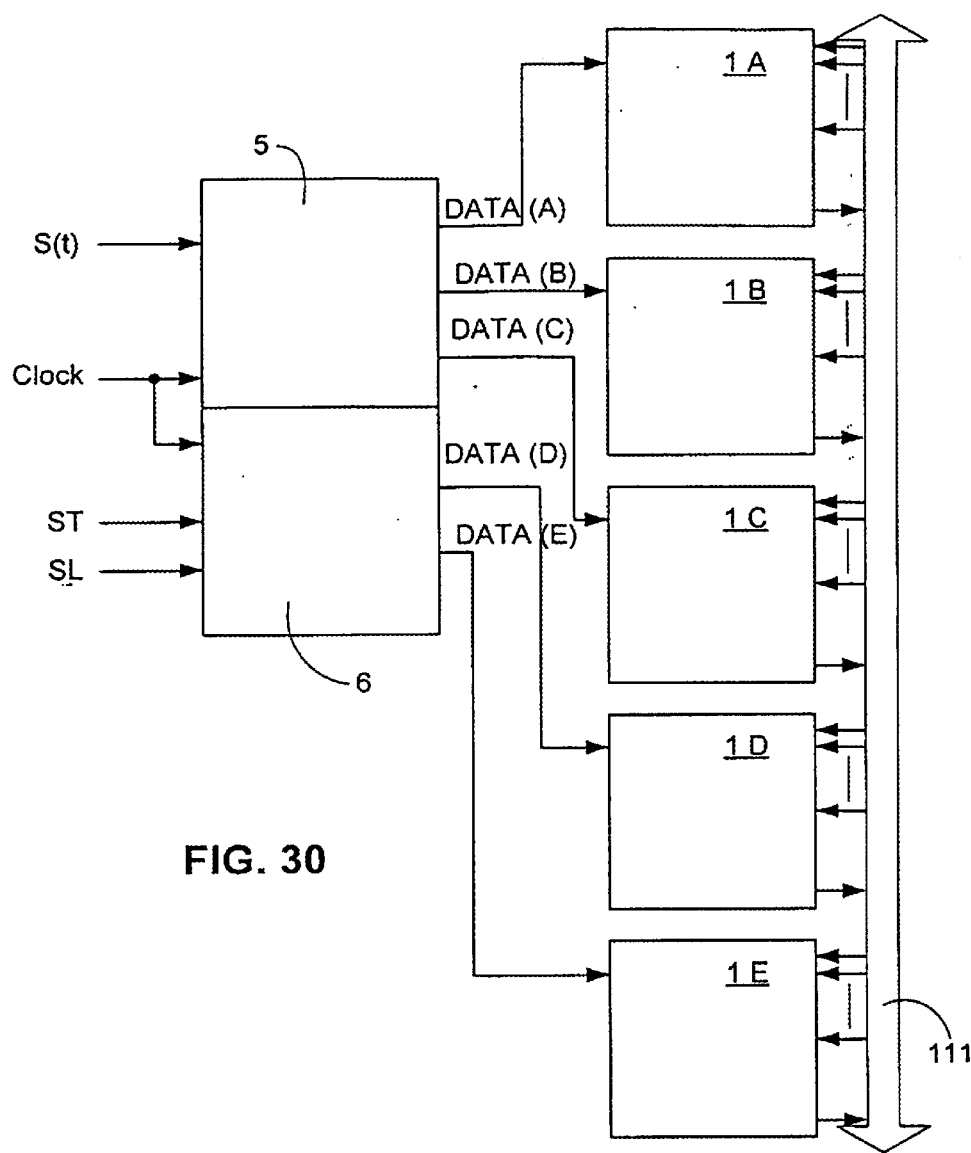
FIG. 30 is the representation of an implementation of a number of histogram calculation units according to one embodiment of the present invention.

FIG. 30 illustrates the implementation of a set of histogram calculation units 1 enabling the management of any number of parameters A, B, C, D, E . . . Although only 5 histogram processing units 1 are shown, it will be apparent that any number may be used as is necessary. The association of spatial (generally two in number) as well as temporal (at least one) parameters enables modelling a spatial-temporal neurone. The temporal processing unit 5 receives the signal S(t) and the CLOCK signal, and spatial processing unit 6 receives the CLOCK and synchronisation ST signals (ST) and (SL).

Figure 4:
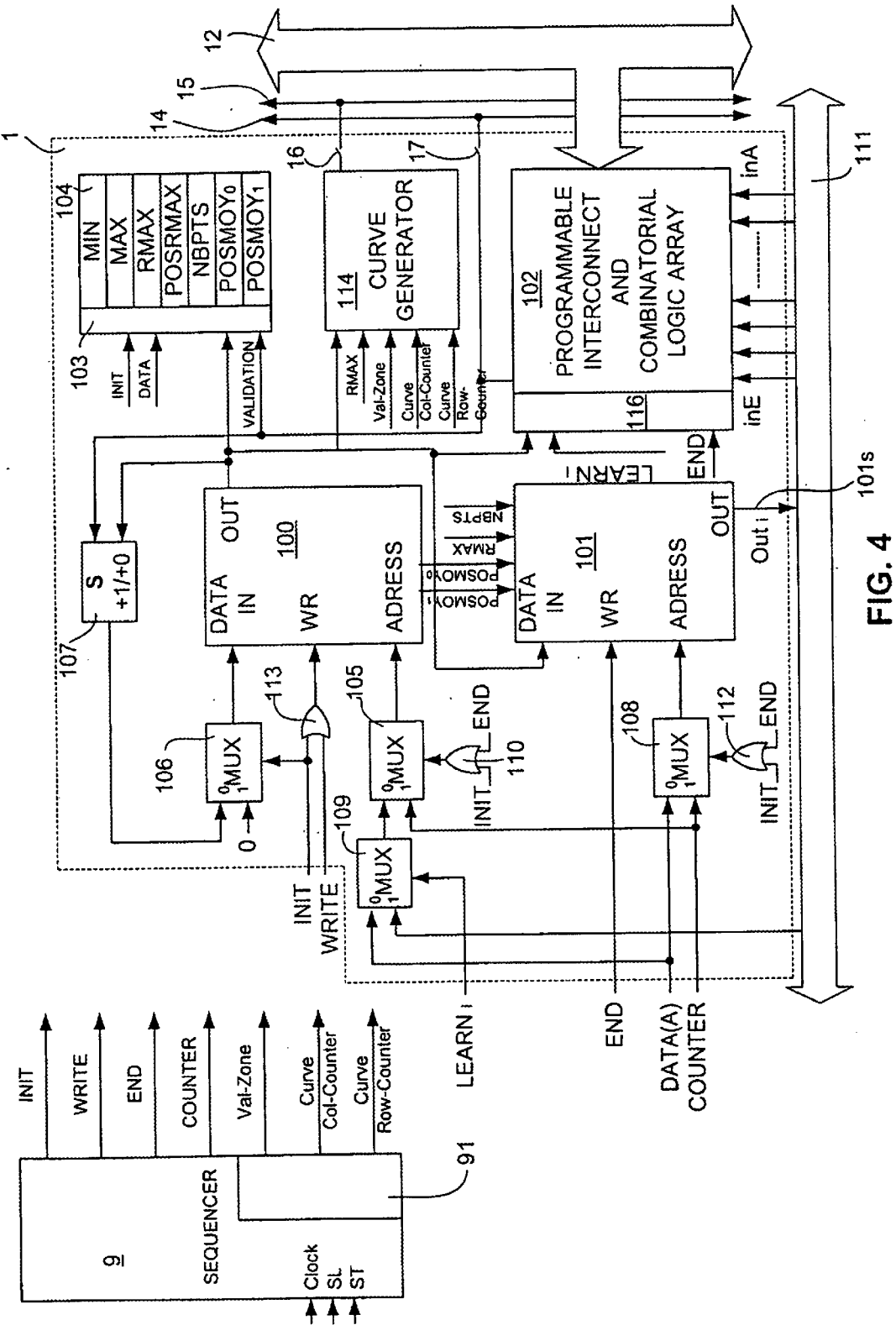
FIG. 4 is a diagram representing a self-adapting histogram calculation unit according to the invention with the anticipation and learning functionalities.

As represented in FIGS. 4 and 30, each parameter A, B, C, D, E . . . coming from temporal and spatial processing units 5 and 6 feeds a histogram calculation unit, respectively $1_A, 1_B \ldots 1_E$. The time coincidences generated by the set of classifiers 102 is available on the bus 111 and used as a whole by each of the histogram calculation units, respectively $1_A, 1_B \ldots 1_E$.

For exemplification purposes, in one embodiment, A, B, and C can represent respectively the colour components of the input pixel (e.g., luminance L, tone T and saturation S), and D and E can represent the co-ordinates $P_1$ and $P_2$ of the pixel considered in an optimised axis system.

Figure 31A:
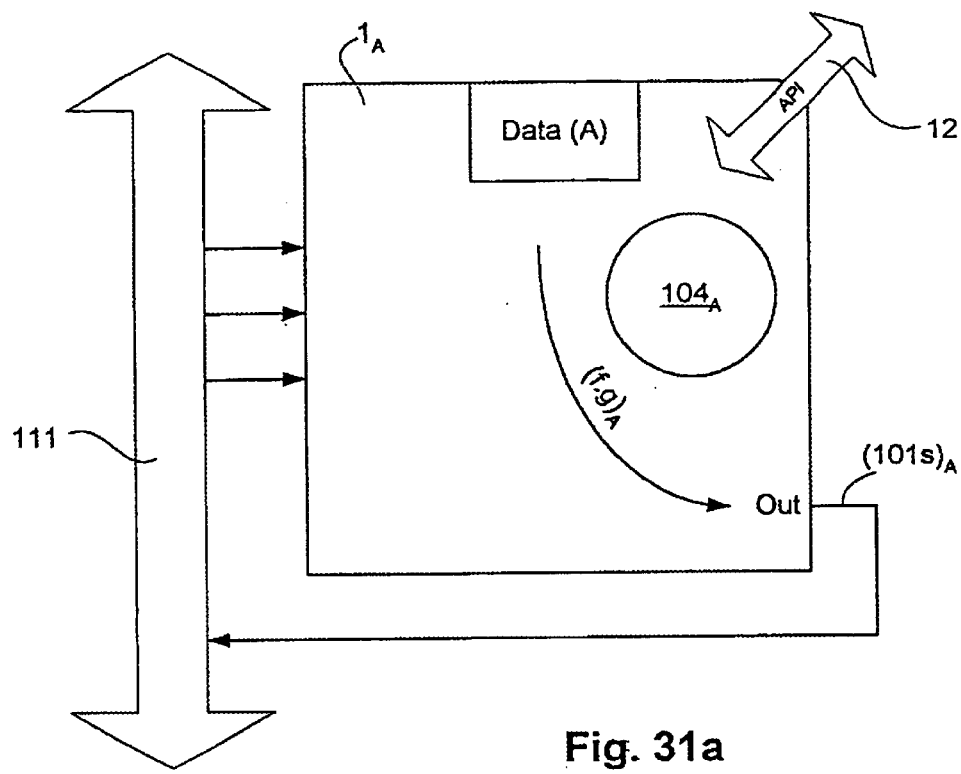
FIG. 31a is a representation of a histogram calculation unit called as well an electronic spatio-temporal neuron.

In summary, as represented on FIG. 31a, for the parameter A, each histogram calculation unit $1_A, 1_B, \ldots, 1_E$ processes one of the data DATA(A), DATA(B), . . . , DATA(E) by the corresponding function $(fog)_A \ldots$ to produce individually an output value $(1015)_A \ldots$ and all together, the time coincidence available on the bus 111. At the same time, the analysis output register $104_A$ is fed.

The choice of the parameter processed by each histogram calculation unit, the contents of the analysis output register 104 and the function fog are determined by the A.P.I.

Figure 31:
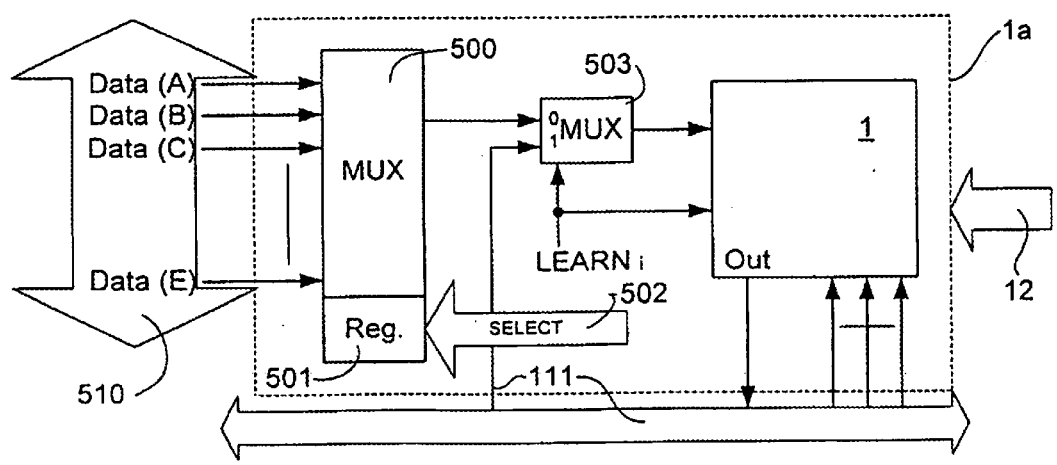
FIG. 31 is the representation of the use of a single programmable histogram calculation unit with a multiplexer enabling the calculation unit to process any of a number of parameters according to one embodiment of the present invention.
Figure 40:
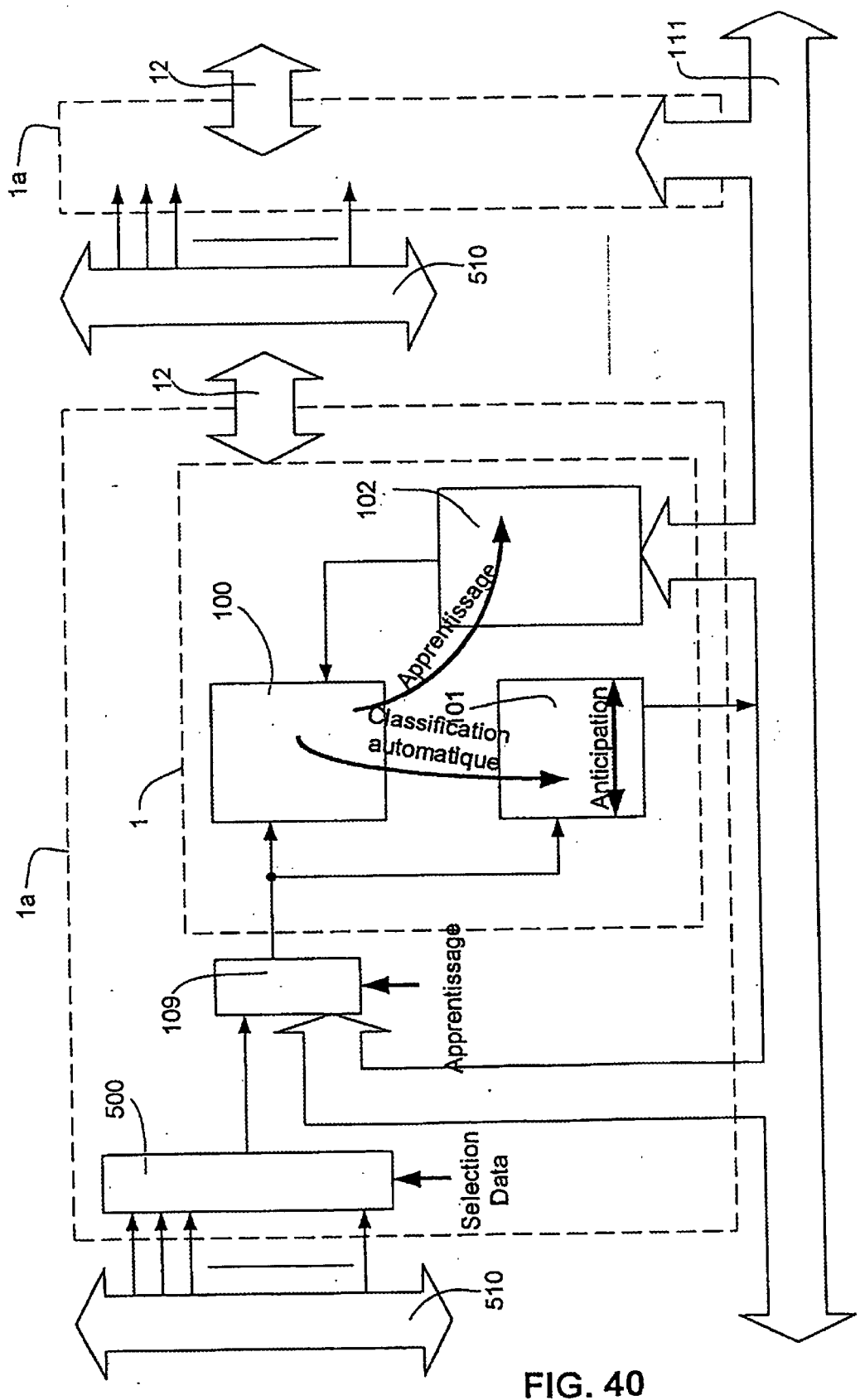
FIG. 40 is a simplified representation of a device according to an embodiment of the present invention.

In the embodiment shown on FIG. 31, the different parameters DATA(A) . . . DATA(E) feed an input multiplexer 500 that is controlled by a register 501. The register 501 is updated by the command SELECT 502. In one embodiment, a learning multiplexer 503 is optionally provided for implementing the learning function as previously described. In this embodiment, It is thus possible to use a single histogram calculation unit 1 to process any of the different parameters A, B, C . . . E that are addressed by a bus 510 in relation to the SELECT command 502. The controlled learning multiplexer 503 receives, according to the status of the learning command of the histogram calculation unit i, LEARNi, either the time coincidences information transmitted by the bus 111, or the information originating from the input multiplexer 500. FIG. 40 illustrates a functional block diagram of multiple histogram calculation units 1a (e.g., from FIG. 31) according to an embodiment of the present invention. As shown, each histogram calculation unit 1a is connected to data bus 510, which provides the various parameters for processing, and to bus 11 which provides the classification signals 101s and the learning function signals to the various units 1a. Each histogram calculation unit 1a includes memory 100, classifier 101 and time coincidences unit 102, and each unit 1a is capable of implementing the automatic classification, anticipation and/or learning functionality as previously described herein. It will be apparent that multiple histogram calculation units 1 can be operating in the operation mode while one or several of the remaining histogram calculation units 1 are operating in the learning mode.

In one embodiment, a histogram calculation unit is time-shared among different parameters during each frame. For example, with reference to FIG. 31, histogram calculation unit 1 according to this embodiment calculates histograms and associated statistics for two or more parameters (e.g., Data (A) and Data (C)) during each frame. Multiplexer 500, in this embodiment, is capable of time multiplexing the various parameters. In this manner, fewer histogram calculation units are needed for processing the desired parameters, thereby reducing the amount of silicon required for producing the required number of histogram calculation units.

According to the status of the learning command LEARN, The histogram calculation unit will operate either in the processing mode or in the learning mode.

The assembly 1a thus formed by a histogram calculation unit 1, an input multiplexer 500, its associated register 501, and optionally a learning multiplexer 503, constitutes a polyvalent histogram calculation unit.

Figure 32:
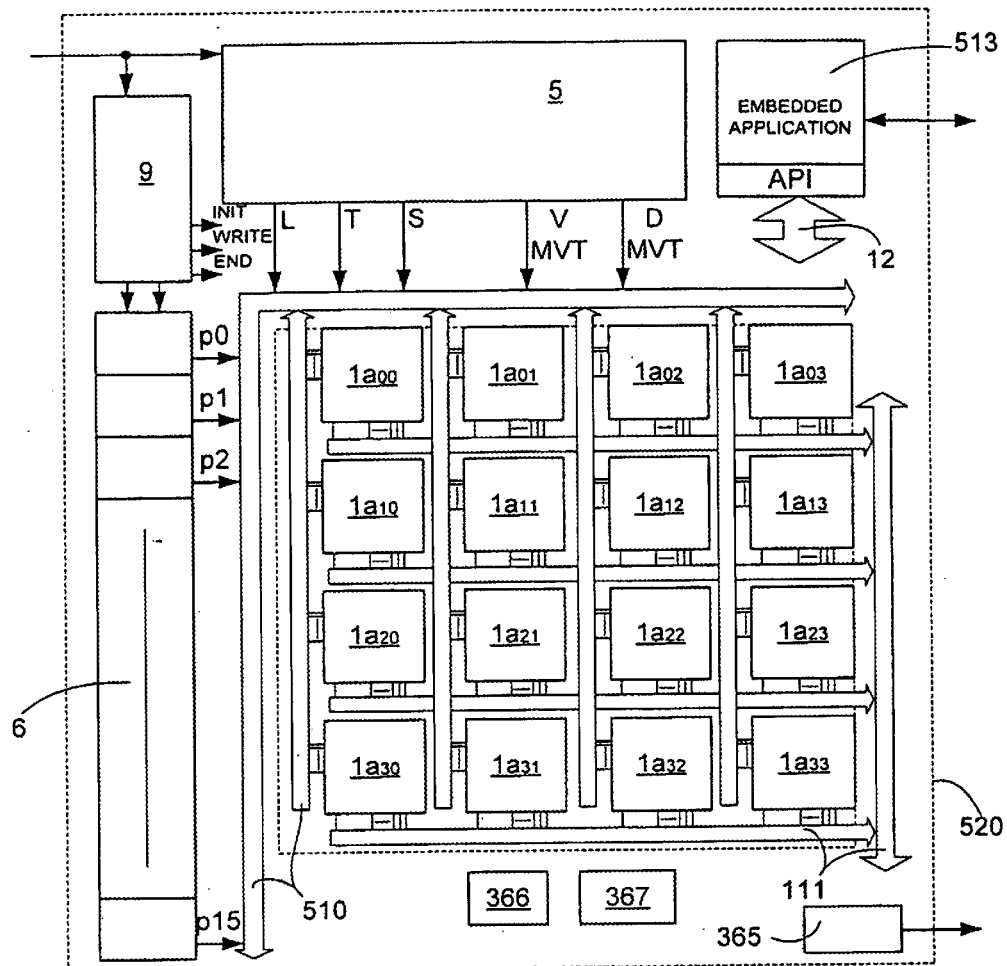
FIG. 32 represents a set of histogram calculation units with programmable input control in their context of usage thereby constituting a functional entity according to one embodiment of the present invention.

FIG. 32 represents a complete device comprising, for exemplification purposes, a set of sixteen such polyvalent histogram calculation units. These units 1a constitute a matrix, and are connected to a bus 510 on which the parameters D, V, S, T, L, p0, p1, . . . , p15 are available (p0, p1, p2, . . . , p15 in one embodiment are slopes of reference axes). The bus 111 carries the time coincidences information. In this embodiment, control unit 513 provides overall control and determines which of the parameters L, T, S, V, D, p0, p1, . . . , p15 are to be processed at a given time by one or several dedicated polyvalent histogram unit(s) and by the sequencer 9. A processor 520 thus constituted can be integrated on a single solid state substrate. The number of polyvalent histogram calculation units 1a depends on the application and on the solid state components manufacturing technologies available. For example, using 0.5 μm technology currently available the integration of 32 histogram processing units 1a is economically feasible. With advances in semiconductor processing technology, it becomes possible to fabricate more and more histogram calculation blocks (e.g., blocks 1a in FIG. 32) on the same chip, and to perform more calculations on more samples (i.e., larger and larger numbers of samples per parameter. Such an increase in processing capability can be realised without an increase in complexity of the API, which is discussed below and illustrated in Appendix A in detail. For example, the same instruction set can operate a 20 block device as well as a 200 or a 2000 block device without any added complexity required.

Figure 39:
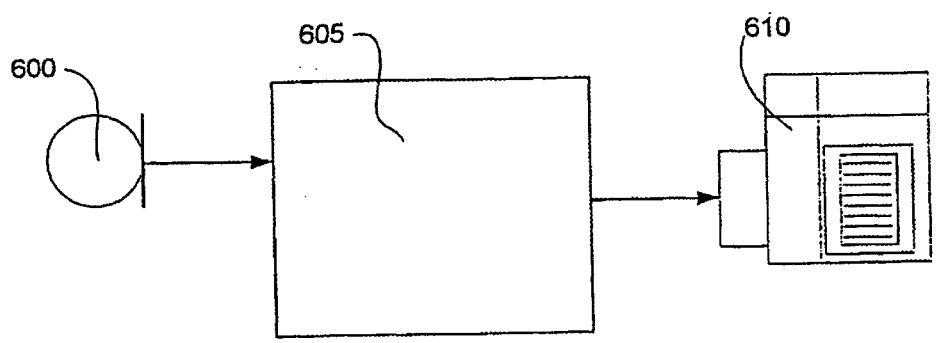
FIG. 39 illustrates a system for processing signals in the sound perception domain according to one embodiment of the present invention.

In another embodiment, with reference to FIG. 39, a processor 605 according to the present invention, e.g., similar to processor 520 of FIG. 32, is implemented to process parameters associated with a perception domain other than the visual perception domain. As illustrated in FIG. 39, the techniques of the present invention can be applied to analysing aural, or sound, parameters for applications such as voice recognition and voice-to-text. In FIG. 39, a sound signal generating device provides sound signals to processor 605, which then provides output signals to. In one embodiment signal generating device includes a microphone, but it may include any device capable of providing analog or digital signals, for example, a CD or DVD player, tape player, etc. Signal generating device preferably provides digital signals, and may operate in a slave mode or a master mode similar to signal generator assembly 2 of FIG. 1. Processor 605 receives the signals and processes various parameters of the sound signal. Such parameters include frequency, amplitude and phase. The phase and amplitude parameters are analogous to the visual spatial and temporal parameters, respectively. Processor 605, provides signals to device 610 so as to enable device 610 to display desired results. For example, in one embodiment, device 610 includes a printer for printing out text associated with signals provided by signal generating device 600. Likewise, device 610 may include a monitor or any other text generating device.

Figure 33:
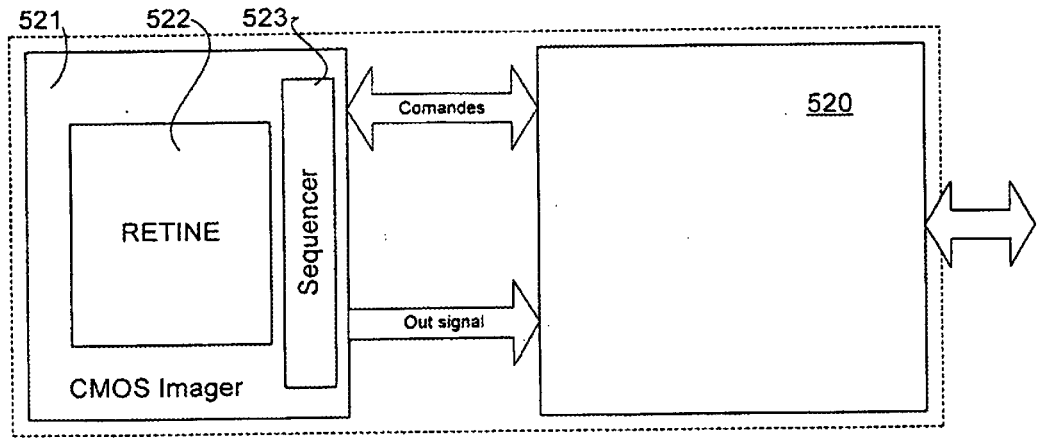
FIG. 33 is a synthetic representation of a functional unit with an associated signal generator according to one embodiment of the present invention.

FIG. 33 is the representation of a generic visual perception processor 520 (or 530) receiving information from a CMOS imaging device 521 including a retina 522 and a sequencer 523.

Figure 34:
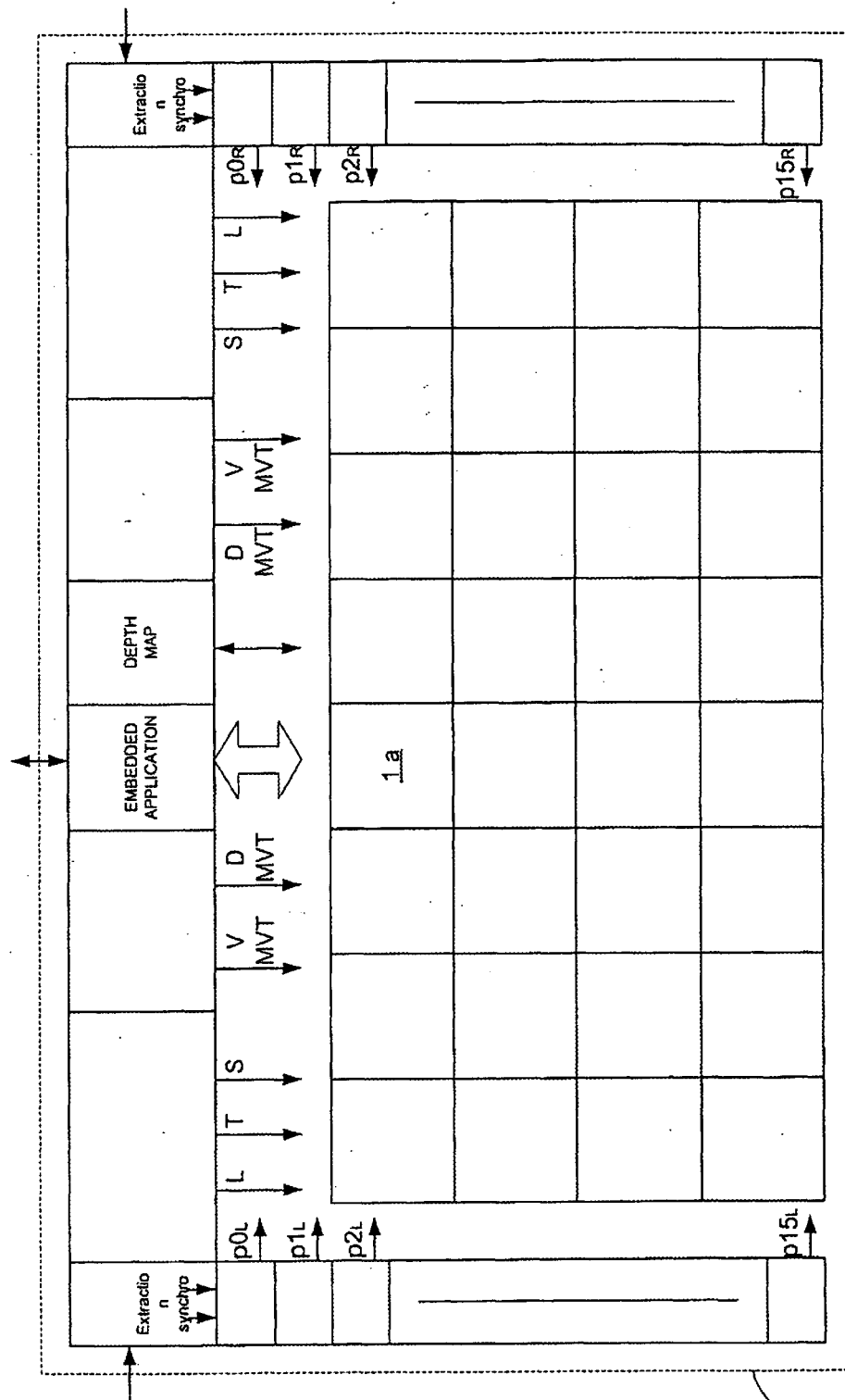
FIG. 34 corresponds to FIG. 32 in the case of a two-source acquisition.
Figure 35:
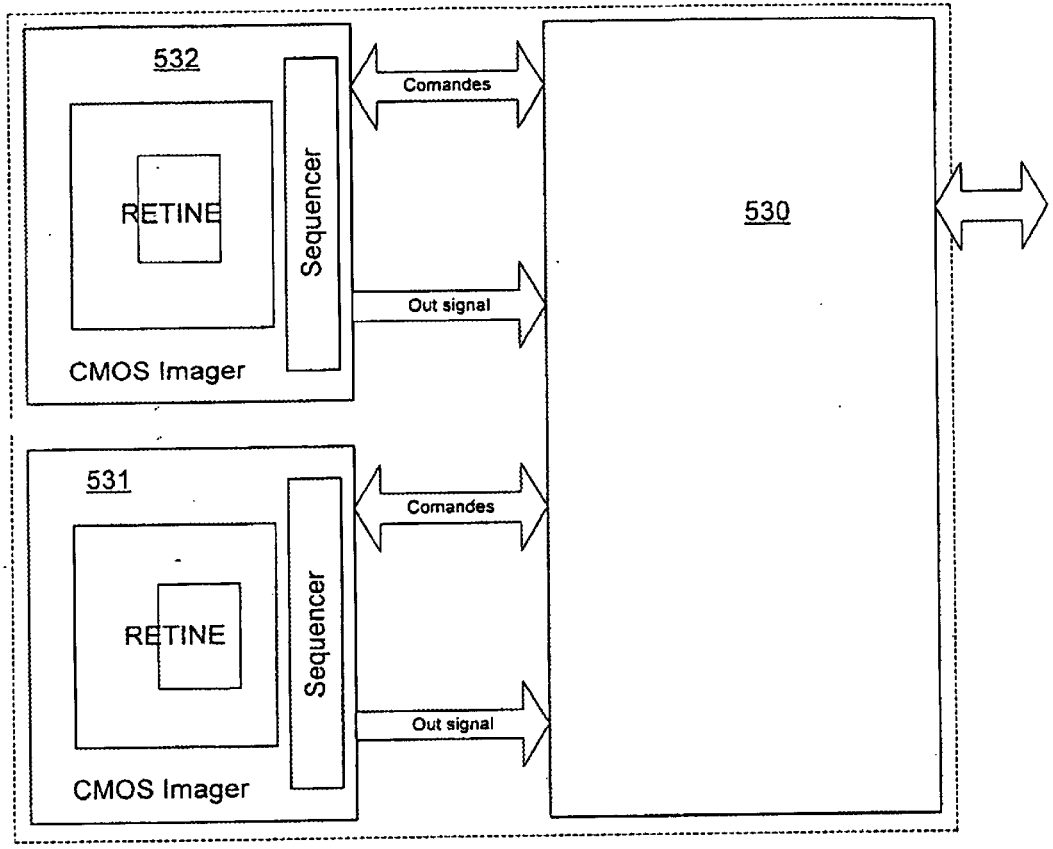
FIG. 35 corresponds to FIG. 33 in the case of a binocular acquisition.

FIG. 34 represents a system including a plurality of histogram calculation units 1a capable of operating with several CMOS imaging devices according to one embodiment. For example, the association of two CMOS imaging devices 531, 532 represented on FIG. 35 enables acquisition of information on the depth in the scene observed.

Figure 36:
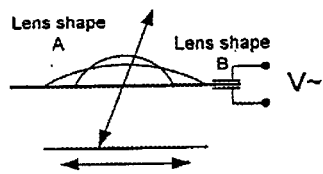
FIG. 36 is a schematic representation of a signal generator fitted with controlled optics according to one embodiment of the present invention.

In certain uses, it is desirable to be able to observe certain shots of a scene, in depth. Accordingly, in one embodiment, the retina is fitted with a variable focal device as represented on FIG. 36.

Figure 37:
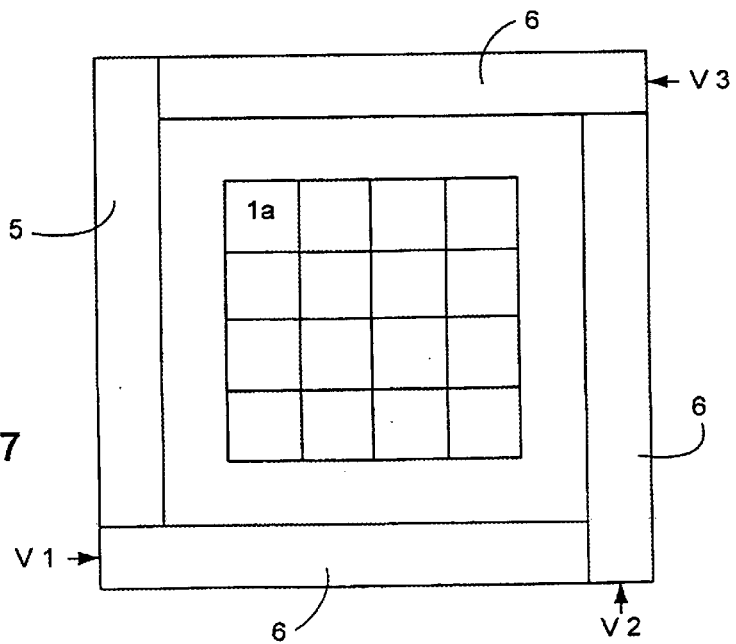
FIG. 37 shows the case of a three-source acquisition according to one embodiment of the present invention.

FIG. 37 is a schematic representation of a system composed of a set of polyvalent histogram calculation units, capable of processing information originating from three directions, respectively V1, V2 and V3 that can represent a three-dimensional space. It is thus possible to manage volume perception data, for example, for use in robotics applications.

XVII. Application Program Interface (A.P.I.)

Figure 38:
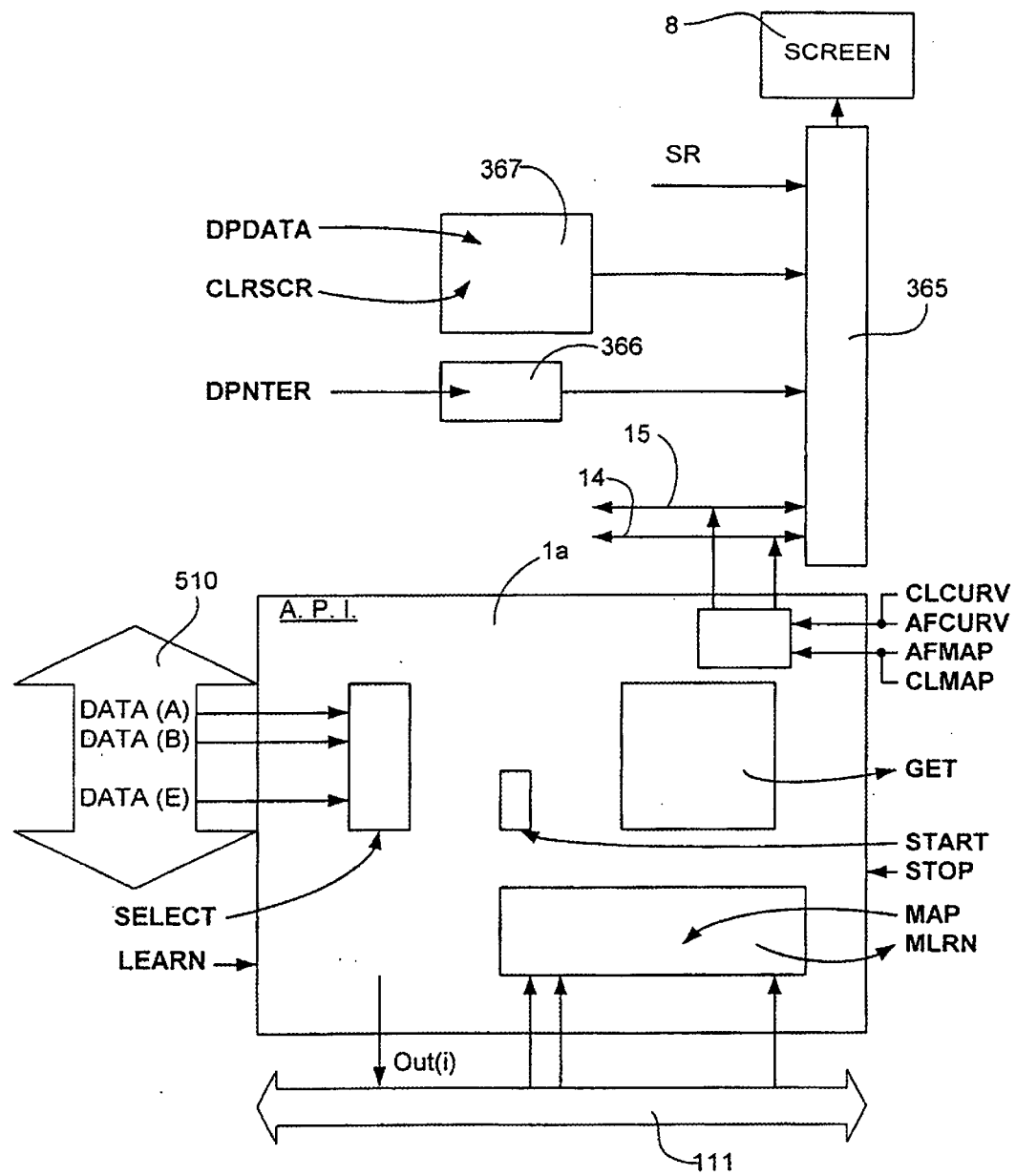
FIG. 38 is a representation of the application management interface (API) according to one embodiment of the present invention.

The application program interface (A.P.I.) represented on FIG. 38 enables to provide a complete system including any number of polyvalent histogram calculation units, with the set of external parameters that it requires. Its dynamic configuration is thus ensured. Appendix A, which is provided as an integral part of this document, includes a functional block diagram of the Spatial-temporal API, the graphical user interface (GUI) API, the mouse API and the I/O API, as well as the various API commands associated therewith, according to one embodiment of the present invention.

Each command mnemonic is associated with an index i corresponding to the number of the polyvalent histogram calculation unit for which it is intended. Each mnemonic can be accompanied by configuration parameters. Each mnemonic enables allocating the parameters DATA(A) . . . DATA(E) to real parameters of the scene observed. Certain of the commands are as follows:

SELECT enables to allocate a parameter DATA(A) to a determined unit.

LEARNi enables to perform the learning function for a polyvalent histogram calculation unit i.

START ensures initialisation of a polyvalent histogram calculation unit. This command configures the memory 118 of the classifier 101.

STOP stops the polyvalent histogram calculation unit. It is used as soon as a histogram calculation unit is inactive. The overall energy consumption is thereby reduced.

AFCURV is the curve validation command that controls the switch 16 represented on FIG. 4. Its inverted command is CLCURV.

AFMAP is the validation command of the time coincidences controlling the switch 17. Its inverted command is CLMAP.

MAP is the writing command of the registers 411 and 412 of the time coincidences unit 102.

MLRN is the command ensuring collection of the content of the time coincidences registers 411 and 412 after the learning process.

These and other commands are explained in more detail in Appendix A.

XVIII. Adaption

Figure 41:
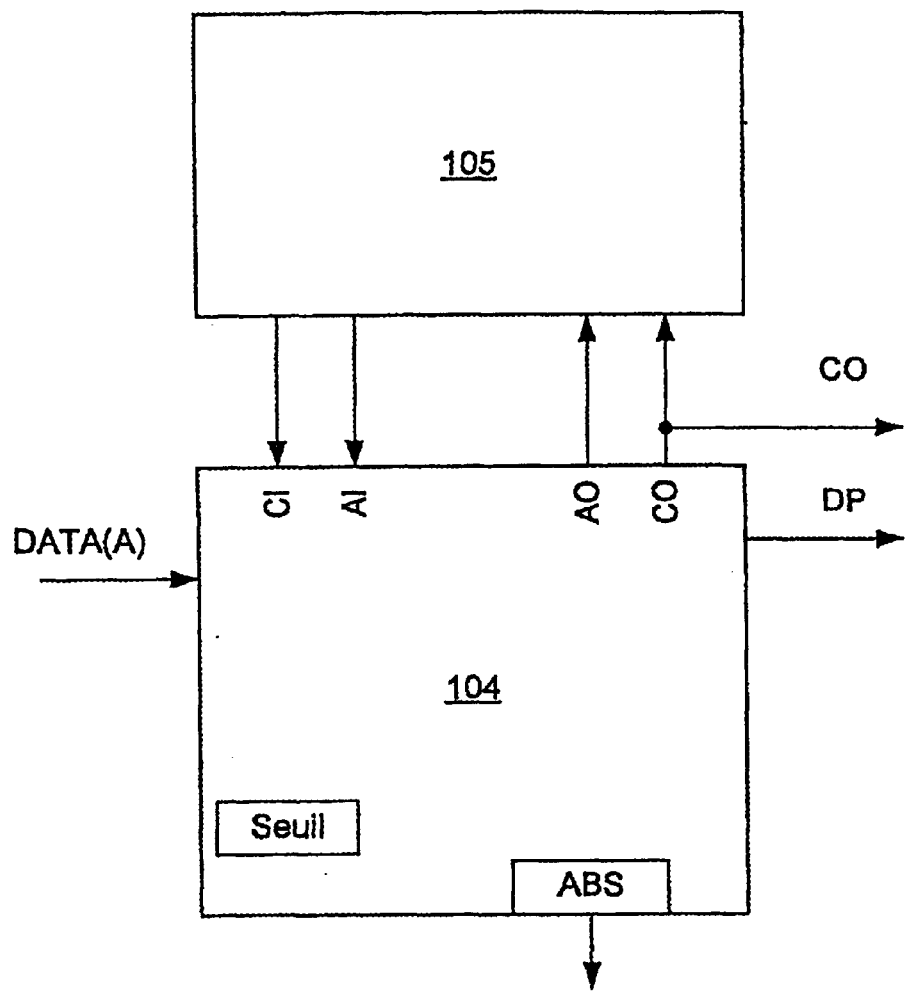
FIG. 41 is the representation of a CO-time constant and DP-overshoot calculation unit of the previous art.

The detection of the movement of an object is performed using a device as represented in FIG. 41 that comprises a "CO and DP" calculation unit 104. Unit 104, the operation of which will now be described, works with a time delay unit 105.

The CO and DP calculation unit 104 receives a digital signal DATA(A) composed of a sequence of $A_{ijt}$ of binary numbers of n bits representing a given parameter A corresponding to the points or pixels of an image. In one embodiment, for example, parameter A is luminance.

The CO and DP calculation unit 104 co-operates with histogram calculation units generating the distribution of the values of the parameter A for an image. The CO and DP calculation unit generates a smoothed value $A_{ijt}$ of the parameter A in every point i, j depending on the values $A_{ij}$ of the parameter A at the points i, j previously received ($AI_{ij}$).

It is known and it has been described in particular in the patent application PCT WO-98/05002, and corresponding U.S. patent application Ser. No. 09/230,502, mentioned above, both previously incorporated by reference, that it is advantageous to compare the deviation $ABS_{ijt}=|A_{ijt}-AI_{ijt}|$ with a threshold S. If $ABS_{ijt}$ is smaller than S, the parameter $DP_{ijt}$ is ascribed the value 0 (false), conversely if $ABS_{ijt}$ is greater than $S_{ijt}$, the parameter $DP_{ijt}$ is ascribed the value 1 (true).

As in any smoothing method or device, the values $AI_{ijt}$ depend on a time constant, designated here as $CO_{ijt}$, which is calculated with respect to the previous value $CI_{ijt}$ of the same parameter in the following manner:

$CO_{ijt}=CI_{ijt}+1$ for $DP_{ijt}$ false $CO_{ijt}=CI_{ijt}-1$ for $DP_{ijt}$ true where $0 \leq CO_{ijt} \leq CO_{Max}$, and where $CO_{Max}$ is a predetermined value, e.g., by the A.P.I.

The time delay unit 105 enables making available for the CO and DP calculation unit 104, the time constant CO and the smoothed value $AO_{ijt}$, as well as the values of these same parameters during the previous cycle, i.e. for the previous frame noted respectively AI, CI.

$AO_{ijt}$ is connected to $AI_{ijt}$ by the formula $$AO_{ijt} = AI_{ijt} + \frac{A_{ijt} - AI_{ijt}}{2^{CO_{ijt}}}$$

Such devices generate satisfying results and enable perception of the position and tracking of an object, even under difficult conditions. According to the present invention, such devices are further improved by including circuitry for adapting the offset and the gain in detection sensitivity of the parameter A to ensure its normalization and circuitry for adapting the detection sensitivity to the variation of the said parameter.

In one embodiment, the value $ABS_{ijt}$ produced by the CO and DP calculation unit 104 is provided to a histogram calculation unit 103 that controls the level of the threshold S via the module 108, as shown in FIG. 43. The histogram calculation unit ABS 103 generates a histogram 10 as shown in FIG. 44. The histogram calculation unit 103 is controlled, for example, by the user via an "A.P.I." that determines a ratio, k, of points for which $ABS_{ijt}$ may be greater than the threshold S. Thus, the threshold S is adapted via the control module 108 so that the distribution of the number of points with values respectively greater than or smaller than the threshold S is equal to k.

In one embodiment, the CO and DP calculation unit 104 includes one or more memory units for storing several thresholds, e.g., $S_0$, $S_1$, $S_2$, $S_3$ each corresponding to a different coefficient $k_0$ . . . . $k_3$, respectively, and each regulated via the control module 108, as stated above.

Each of these thresholds is used and adapted for a complete frame. A demultiplexer 11 receiving the incoming signal DATA(A) determines which of the thresholds $S_0$, $S_1$, $S_2$, $S_3$ should be used.

Advantageously, the histogram calculation unit ABS 103 is connected to an input bus 109 and to a classification bus 110. The input bus 109 supplies unit 103 with the sequence of values $ABS_{ijt}$ and unit 103 receives, via the classification bus 110, the values of the classifiers of other histogram calculation units (e.g., units 101 and 102).

A histogram calculation unit 102 processes a sequence of data $A_{ijt}$ representing luminance. The histogram and associated statistical data generated by histogram calculation unit 102 is used for regulation, via the control module 107 and the amplifier 106, of the mean level and the sensitivity of the sequence $A_{ijt}$ leading to normalization of $A_{ijt}$. In this manner, the threshold and the gain in detection sensitivity of the parameter A are adapted.

Figure 42:
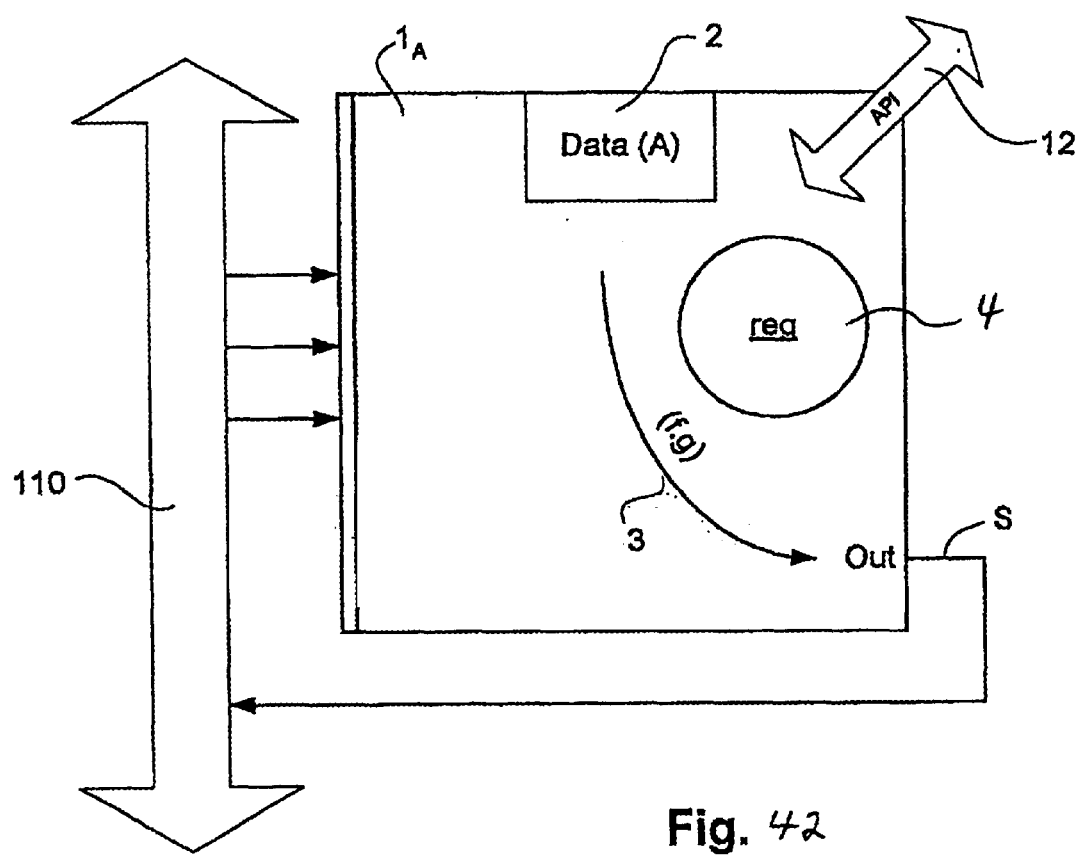
FIG. 42 is the representation of a histogram calculation unit of the previous art.

FIG. 42 illustrates a block diagram of a histogram processing unit $1_A$ according to the present invention. In FIG. 42, the parameter DATA(A) is processed by the histogram calculation unit $1_A$ by applying the function $(f_o g)$ 3 thereto. Histogram calculation unit $1_A$ comprises an analysis output register reg 4 containing values representing the statistical distribution of the parameter DATA(A).

Histogram processing unit $1_A$ is controlled by the API 12 that determines at the same time which parameter, e.g., DATA(A), that the unit processes, the content of the register 4 and the function 3 $(f_o g)$, and supplies the bus 110 with an output value S, which in one embodiment, as described above, is a classification value. Histogram calculation unit $1_A$ typically receives as input, from bus 110 the classification values from the other histogram calculation units to which bus 110 is connected.

In another embodiment, a $P_X$–$P_Y$ histogram calculation unit 101 is coupled with the histogram calculation units 102 of the parameter A and 103 of ABS, wherein $P_X$–$P_Y$ histogram calculation unit 101 provides for selection within the image of a region xy in relation to specific criteria managed by the API. The histogram calculation units 101, 102, 103 communicate via the bus 110 and are controlled by the API 12 via the bus 109.

It is also understood that the operation of the devices presented can be described sequentially (whereas in reality, the different functions are conducted in parallel) as follows:

a) a region xy is selected within the image by the histogram calculation unit 101, b) the level and the gain of the signal DATA(A) are adapted by the histogram calculation unit 102 in order to maximize the operation of the device described here and of any device implemented downstream, c) the histogram calculation unit 103 adapts the detection sensitivity for the parameter $A_{ijt}$.

The system as a whole, besides the data that it generates and which is available either on the bus 110, or in the different registers reg of the histogram calculation units, supplies at the output of the CO and DP calculation unit, the values of both these parameters CO and DP for any subsequent use.

While the invention has been described by way of example and in terms of the specific embodiments, it is to be understood that the invention is not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A method of adjusting a signal used for the detection of a parameter carried by a signal, wherein the parameter is represented by a set of data $A_{ij}$, associated with pixels forming a multidimensional space i, j, evolving with time, and represented at a succession of instants T, wherein the data are associated with the parameter A in the form of a digital signal DATA(A), composed of a sequence $A_{ijt}$ of binary numbers of n bits associated with synchronization signals defining the instant T of the space, and the position i, j, in the space, in which the signals $A_{ijt}$ are received, the method comprising:

receiving the signal $A_{ijt}$ from a signal amplifier;

comparing each value $A_{ijt}$ with a smoothed value $AI_{ijt}$ so as to determine the variation of the signal $A_{ijt}$ at a given point in the space i, j, wherein $AI_{ijt}$ is derived from the previous values of $A_{ijt}$ in relation to a time constant $CO_{ijt}$;

generating a signal $ABS_{ijt}=|A_{ijt}-AI_{ijt}|$;

generating binary threshold values $DP_{ijt}$ of $A_{ijt}$ in relation to a threshold S;

modifying the time constant values $CO_{ijt}$ based on the corresponding overshoot threshold $DP_{ijt}$;

calculating histograms for $ABS_{ijt}=|A_{ijt}-AI_{ijt}|$;

calculating histograms for $A_{ijt}$; and adjusting the threshold S based on the calculated histograms of ABS so as to adjust the detection sensitivity of the variation of the parameter A; and adjusting the gain of the amplifier based on the calculated histograms of $A_{ijt}$ so as to adjust the amplitude of the received signal $A_{ijt}$.

2. The method according to claim 1, wherein $DP_{ijt}$ is false if $ABS_{ijt}$ is smaller than S, wherein $DP_{ijt}$ is true if $ABS_{ijt}$ is greater than S, wherein modifying includes calculating $CO_{ijt}$ with respect to a previous value $CI_{ijt}$ wherein $CO_{ijt}=CI_{ijt}+1$ for $DP_{ijt}$ false $CO_{ijt}=CI_{ijt}-1$ for $DP_{ijt}$ true wherein $0 \leq CO_{ijt} \leq CO_{Max}$, and wherein $CO_{Max}$ is a predetermined value.

3. The method according to claim 2, wherein an A.P.I. provides the predetermined $CO_{Max}$ value.

4. The method according to claim 2, wherein a smoothed value $AO_{ijt}$ is related to its previous value $AI_{ijt}$ by the formula:

$$AO_{ijt} = AI_{ijt} + \frac{A_{ijt} - AI_{ijt}}{2^{CO_{ijt}}}.$$

5. The method according to claim 2, wherein adaptation to the threshold is made with reference to a classification of the value $ABS_{ijt}$ of ABS and to an overshoot ratio k.

6. The method according to claim 2, wherein the overshoot values of $ABS_{ijt}$ are generated in relation to a plurality of thresholds $S_0$, $S_1$, $S_2$, $S_3$ each adjusted for a complete frame.

7. The method according to claim 1, wherein the parameter A is luminance.

8. The method according to claim 1, wherein the region of the space i, j affected is adjusted.

9. A device for adjusting a signal used for the detection of the movement of an object in a space represented by a set of data $A_{ij}$ associated with pixels forming a multidimensional space i, j, evolving with time, and represented at a succession of instants T, wherein the data are associated with the parameter A in the form of a digital signal DATA(A), composed of a sequence $A_{ijt}$ of binary numbers of n bits associated with synchronization signals defining the instant T of the space and the position i, j, in the space in which the signals $A_{ijt}$ are received, the device comprising:

an amplifier that provides the signals $A_{ijt}$;

a processing unit including an input that receives the signals $A_{ijt}$ from the amplifier, wherein the processing unit determines the values of a time constant $CO_{ijt}$ and an overshoot value $DP_{ijt}$ by comparing each value $A_{ijt}$ with a smoothed value $AI_{ijt}$ derived from previous values of $A_{ijt}$ in relation to the time constant $CO_{ijt}$, wherein the comparison generates an overshoot value $DP_{ijt}$ of $A_{ijt}$ in relation to a threshold value, wherein $CO_{ijt}$ is modified in relation to $DP_{ijt}$, and wherein the processing unit generates a sequence $ABS_{ijt}=|A_{ijt}-AI_{ijt}|$;

a first histogram calculation unit that receives and processes the sequence $A_{ijt}$ and controls the amplifier to adjust the amplitude of the parameter A; and a second histogram calculation unit that receives and processes the sequence $ABS_{ijt}$ and controls the threshold value used by the processing unit so as to adjust the detection sensitivity of the variation of the parameter A.

10. A device according to claim 9, further comprising a third histogram calculation unit that receives and processes the sequence $A_{ijt}$ so as to adjust the region of the space i, j affected.

11. A device according to claim 9, further comprising a data input bus coupled to inputs of each histogram calculation unit and a classification bus coupling each histogram calculation unit to the other histogram units, wherein classification values generated by each histogram unit are provided to the other histogram calculation units over the classification bus.

12. The device according to claim 9, wherein the processing unit includes a memory for storing one or more threshold values.

13. The device according to claim 12, further including a multiplexer that determines, based on the received signal A, which of the one or more stored threshold values is used.

14. The device according to claim 9, wherein histogram calculation units are controlled by an A.P.I. software.

* * * * *

UNITED STATES PATENT AND TRADEMARK OFFICE
CERTIFICATE OF CORRECTION

| | |
|---|---|
| PATENT NO. | : 7,136,842 B2 |
| APPLICATION NO. | : 09/877337 |
| DATED | : November 14, 2006 |
| INVENTOR(S) | : Patrick Pirim |

It is certified that error appears in the above-identified patent and that said Letters Patent is hereby corrected as shown below:

Cover page of the patent, in the Foreign Application Priority Data section, please add the following -- Feb. 24, 2000 (FR) ...................................... 00 02355 --.

After the specification at Column 24, line 46, before the Claims, please add the attached Appendix A.

Signed and Sealed this

Sixteenth Day of November, 2010

David J. Kappos
*Director of the United States Patent and Trademark Office*

APPENDIX A
API Specifications
4 sub division for GVPP :
- Spatio-temporal computation API
- Graphic GUI API
- Mouse GUI API
- Communication and input-output API
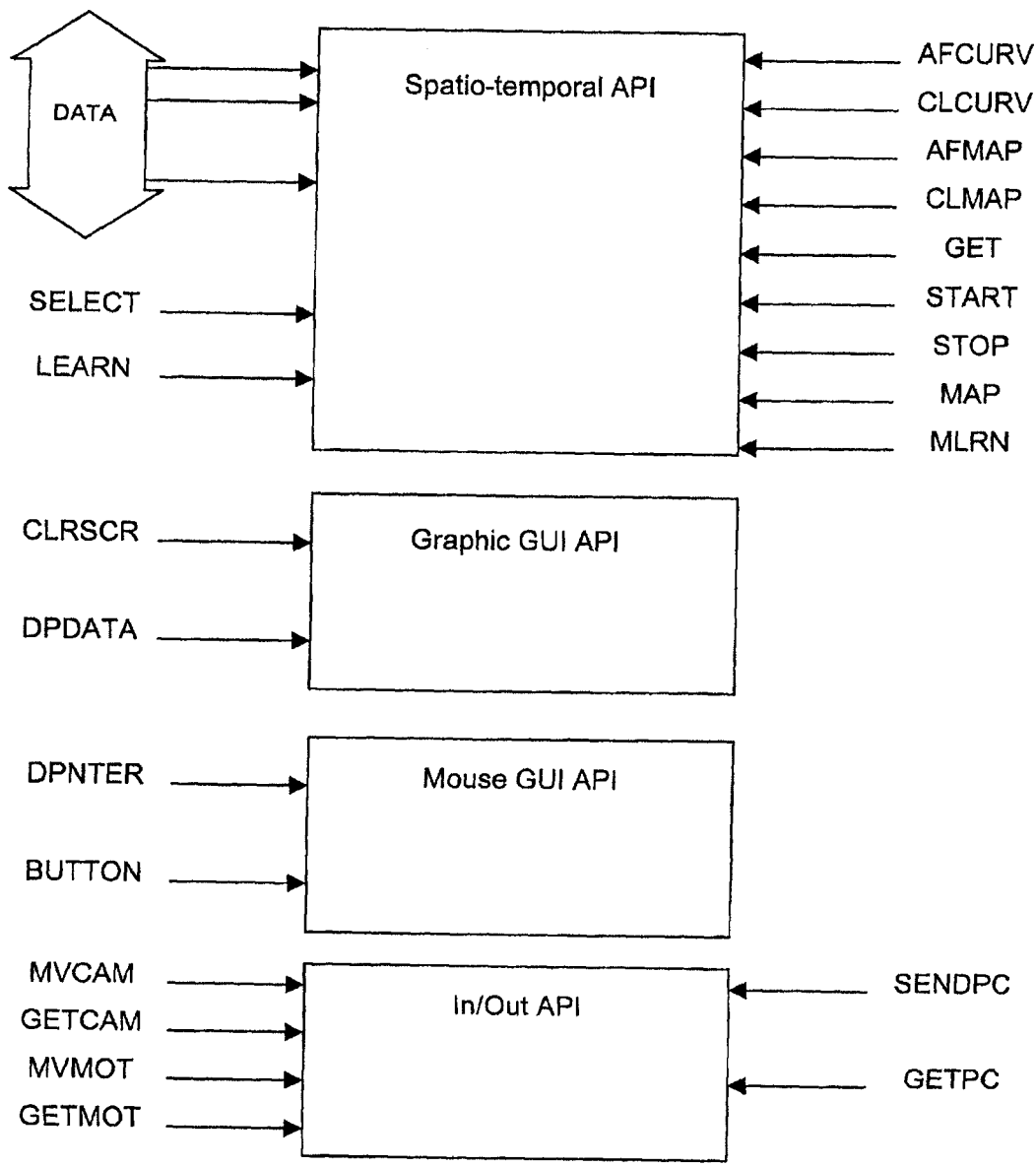

Spatio-temporal API Bloc

This group enables all instructions to run the generic spatio-temporal computations and to get the results.

Functions :

*START* :
Goal:     Initialisation of one bloc for the classification.
Parameter :  index bloc, MIN value, MAX value.

Prototype :

```
        Bloc3  equ  03
        MIN    equ  10
        MAX    equ  100

START Bloc3 MIN MAX
        Input  -   R0   :    index bloc
                   R1   :    MIN value
                   R2   :    MAX value
        Output -
```

*STOP* :
Goal :     end of computation.
Parameter :  index bloc.

Prototype :

```
        Bloc3  equ  03

STOP Bloc3
        Input  -   R0   :    index bloc
        Output -
```

*SELECT* :
Goal      : Progammation of input parameter bloc(lum, hue, motion, line orientation).
Parameter  : Index bloc, type of input parameter.

Prototype :

```
        Bloc3  equ  03
        LUM    equ  00

SELECT Bloc3 LUM

Input  -   R0   :    Index bloc
                   R1   :    Input parameter
        Output-
```

*GET*:
Goal : Get the result computation of one parameter.
Parameter : Index bloc, Load result parameter.

Prototype :

Bloc3     equ   03
    MIN       equ   00
    MAX      equ   01
    RMAX     equ   02
    POSRMX   equ   03
    POSMOY   equ   04
    NBPTS    equ   05
    .........

GET Bloc3 NBPTS
    Input -    R0   :   Index bloc
                 R1   :   Index parameter
    Output-   R0   :   result value of this parameter

*LEARN* :
Goal : Learn the association-context of a bloc .
Parameter : Index bloc.

Prototype :

Bloc3     equ   03

LEARN Bloc3
    Input -    R0   :   Index bloc
    Output-

*MAP* :
Goal : Put on the time coincidences fonction the result of previous learning.
Parameter : Index bloc,summ of product-terms.

Prototype :

Bloc3     equ   03

MAP Bloc3 0F3 1AB 007
    Input -    R0   :   Index bloc
                 R1   :   First product terms
                 R2   :   Second product terms
                 R3   :   ...........suite
    Output-

*MLRN* :
Goal : Get the result of learning.
Parameter : Index Bloc.

Prototype :
```
        MLRN
        Input  -    R0    :    Index bloc
        Output-     R0    :    MIN classification
                    R1    :    MAX Classification
                    R2    :    First main association (product terms)
                    R3    :    Second association
                    R4    :    ..........suite
```

*AFCURV* :
Goal         : Histogram curve drowing of one bloc.
Parameter    : Index Bloc.

Prototype :
```
        Bloc3        equ    03

AFCURV Bloc3
        Input  -     R0     :     Index bloc
        Output-
```

*CLCURV* :
Goal         : Clear curve of one bloc.
Parameter    : Index Bloc.

Prototype :
```
        Bloc3        equ    03

CLCURV Bloc3
        Input  -     R0     :     Index bloc
        Output-
```

*AFMAP* :
Goal         : Learning Bloc drowing.
Parameter    : Index Bloc.

Prototype :
```
        Bloc3        equ    03

AFMAP Bloc3
        Input  -     R0     :     Index bloc
        Output-
```

*CLMAP* :
Goal : Clear the learning bloc drowing.
Parameter : Index Bloc.

Prototype :

Bloc3      equ    03

CLMAP Bloc3
    Input -    R0    :    Index bloc
    Output-

Graphic GUI API

*CLRSCR* :
Goal : Clear Screen.
Parameter : No.

Prototype :

CLRSCR
    Input -
    Output-

*DPDATA* :
Goal : Display ASCII code on screen.
Parameter : ASCII code, row position, column position.

Prototype :

DPDATA
    Input -    R0    :    ASCII code
                R1    :    row position
                R2    :    column position
    Output-

Mouse GUI API

*DPNTER* :
Goal : Mouve and display the pointer.
Parameter : row position, column position.

Prototype :

DPNTER
    Input -    R0    :    row position
                R1    :    column position
    Output-

*BUTTON* :
Goal : get the action of button.
Parameter : Button.

Prototype :

BUTTON
    Input -
    Output-    R0  :  new position of buttons

API E/S

*MVCAM* :
Goal : Move the camera.
Parameter : X Position, Y Position, Focus.

Prototype :

MVCAM
    Input -    R0  :  X position
                   R1  :  Y position
                   R2  :  Focus
    Output-

*GETCAM* :
Goal : Get the camera's parameters.
Parameter : No.

Prototype :

GETCAM
    Input -
    Output-    R0  :  X position
                   R1  :  Y position
                   R2  :  Focus

*MVMOT* :
Goal : Action motor.
Parameter : Sens+steps.

Prototype :

MVCAM
    Input -    R0  :  Sens+steps
    Output-

*GETMOT* :
Goal        : Get the actual position of motor.
Parameter   : No.

Prototype :

GETMOT
    Input -
    Output-    R0    :    position

*SENDPC* :
Goal        : Send one information to the PC.
Parameter   : information pointer.

Prototype :

SENDPC
    Input -    R0    :    information pointer
    Output-

*GETPC* :
Goal        : Get an information from PC.
Parameter   : No.

Prototype :

GETPC
    Input -
    Output-    R0    :    information